(12) United States Patent
Utykanski et al.

(10) Patent No.: US 9,876,372 B2
(45) Date of Patent: Jan. 23, 2018

(54) BARCODE READER AND DOCKING STATION FOR CHARGING THE BARCODE READER

(71) Applicant: The Code Corporation, Draper, UT (US)

(72) Inventors: Phil Utykanski, Saratoga Springs, UT (US); Ryan Hoobler, Salt Lake City, UT (US)

(73) Assignee: The Code Corporation, Draper, UT (US)

( * ) Notice: Subject to any disclaimer, the term of this patent is extended or adjusted under 35 U.S.C. 154(b) by 95 days.

(21) Appl. No.: 14/814,423

(22) Filed: Jul. 30, 2015

(65) Prior Publication Data

US 2016/0036257 A1 Feb. 4, 2016

Related U.S. Application Data

(63) Continuation-in-part of application No. 14/717,112, filed on May 20, 2015, and a continuation-in-part of application No. 14/741,213, filed on Jun. 16, 2015, now Pat. No. 9,679,177, and a continuation-in-part of application No. 14/641,305, filed on Mar. 7, 2015, now Pat. No. 9,355,291.

(60) Provisional application No. 62/031,226, filed on Jul. 31, 2014.

(51) Int. Cl.
*G06K 7/10* (2006.01)
*H02J 7/00* (2006.01)
*G06F 1/16* (2006.01)
*G06F 3/0354* (2013.01)

(52) U.S. Cl.
CPC ............ *H02J 7/0044* (2013.01); *G06F 1/163* (2013.01); *G06F 1/1632* (2013.01); *G06K 7/10821* (2013.01); *G06K 7/10881* (2013.01); *G06K 7/10891* (2013.01); *H02J 7/0054* (2013.01); *G06F 3/03545* (2013.01)

(58) Field of Classification Search
CPC .. G06K 9/00; G06K 9/00006; G06K 7/10881; G06K 7/10891; G06K 7/10821; G06F 3/03545

See application file for complete search history.

(56) References Cited

U.S. PATENT DOCUMENTS 6,581,837 B1 *   6/2003  Hattersley ................ G06K 7/10
                                                          235/462.43
2007/0154074 A1 * 7/2007  Schneider .......... G06K 9/00006
                                                          382/126

* cited by examiner

*Primary Examiner* — Ernest Unelus
(74) *Attorney, Agent, or Firm* — Timothy P. O'Hagan; Ray Quinney & Nebeker

(57) ABSTRACT

A barcode reader and a docking station for charging the barcode reader are disclosed. The barcode reader may be an elongated pen-shaped device that includes a capacitive tip for use as a stylus against a capacitive touch screen and a barcode reader for reading a barcode. The barcode reader may be docked in the docking station for charging. The docking station may include a magnetic structure for holding the barcode reader to the docking station, and a positioning structure for aligning the charging contacts of the barcode reader and the docking station. The docking station may include a battery such that the barcode reader may be charged from the battery while being docked in the docking station.

39 Claims, 38 Drawing Sheets

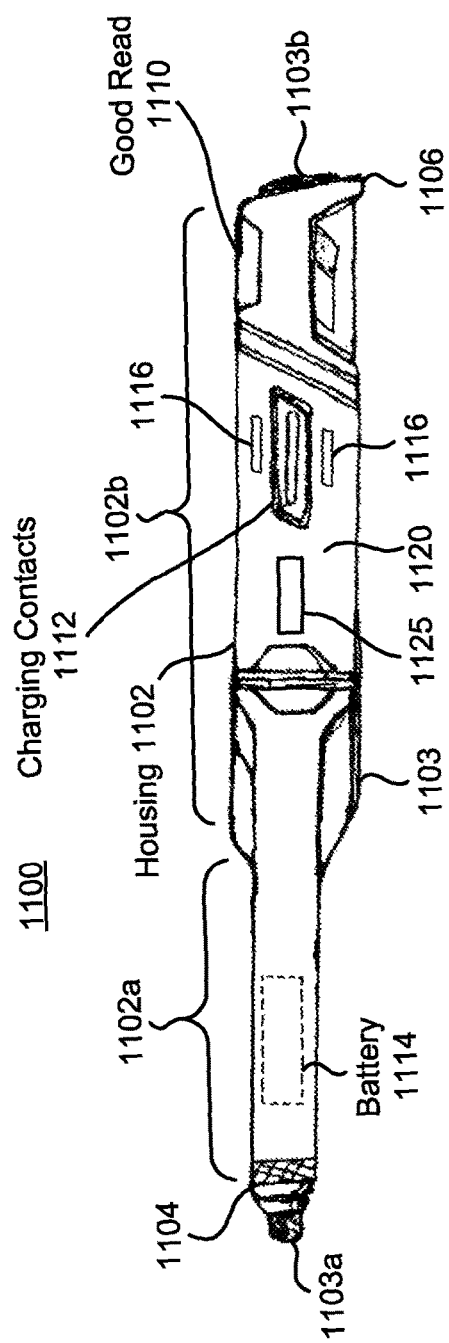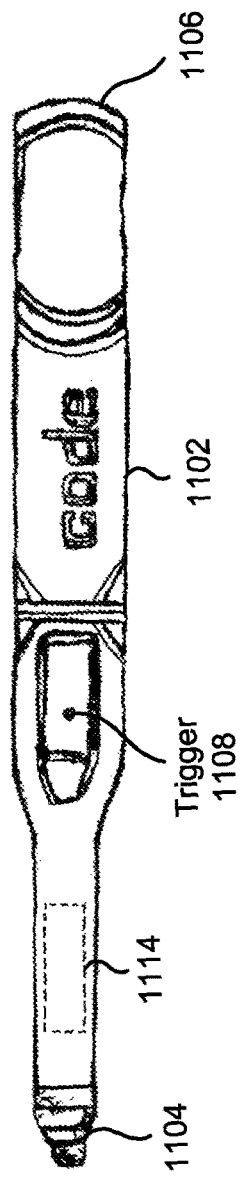
FIG. 1A
FIG. 1B

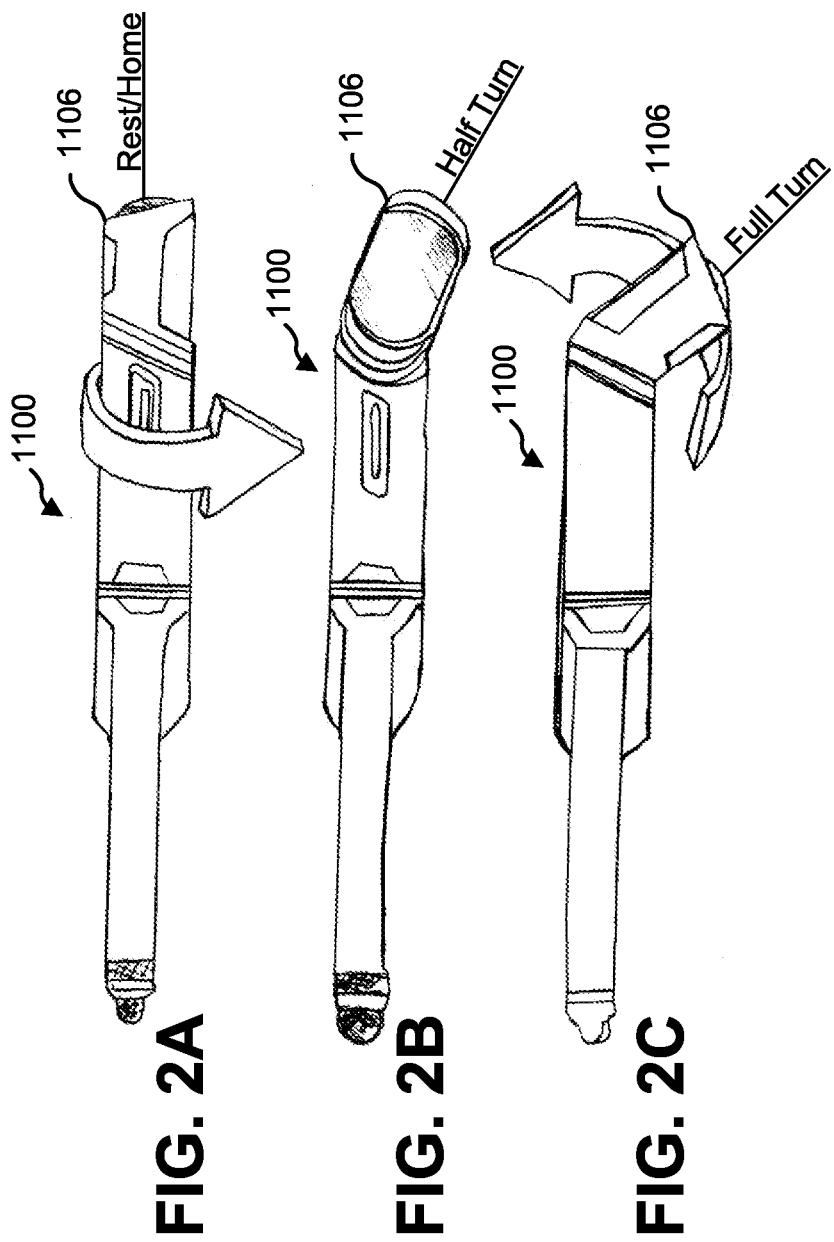

BARCODE READER AND DOCKING STATION FOR CHARGING THE BARCODE READER

CLAIM OF PRIORITY

This application claims priority to U.S. Provisional Patent Application No. 62/031,226, titled "Next Generation Barcode Scanner Systems," filed Jul. 31, 2014, with inventor Phil Utykanski, which is incorporated herein by reference as if fully set forth. This application is a continuation in part of: i) U.S. patent application Ser. No. 14/717,112, filed May 20, 2015, and entitled "BARCODE READER"; ii) U.S. patent application Ser. No. 14/741,213, filed Jun. 16, 2015, and entitled "BARCODE READER AND ACCESSORY FOR THE BARCODE READER"; and iii) U.S. patent application Ser. No. 14/641,305, filed Mar. 7, 2015, and entitled "BARCODE READER AND ACCESSORY FOR THE BARCODE READER". Each of the foregoing patent applications is hereby incorporated by reference in its entirety.

TECHNICAL FIELD

The present disclosure relates generally to a barcode reader. More specifically, the present disclosure relates to a barcode reader and a docking station for charging the barcode reader.

BACKGROUND

A barcode is an optical machine-readable representation of information. Devices for identifying or extracting information from barcodes are generally referred to as barcode readers or barcode scanners. An image-based barcode reader includes a camera for capturing an image of a barcode to be read. The camera includes a focusing lens that focuses light reflected from a target area onto a photo sensor array. Once an image of a barcode has been captured by the camera, a decoder processes the image and extracts the information contained in the barcode.

SUMMARY

According to one embodiment, there is provided a docking station for charging a barcode reader. The docking station may include a mating surface, a plurality of charging contacts, a magnetic structure, and a positioning structure. The barcode reader is positioned against the mating surface for charging. The charging contacts, including at least one charging contact for power and at least one charging contact for ground, are coupled to mating contacts on the barcode reader when the barcode reader is positioned against the mating surface. The magnetic structure is for holding the barcode reader against the mating surface. The positioning structure aligns the barcode reader against the mating surface when the barcode reader is positioned against the mating surface.

The docking station may include a battery, master charging contacts, a master charging circuitry, and a barcode reader charging circuitry. The master charging circuitry is coupled between the battery and the master charging contacts and configured to charge the battery when the master charging contacts are coupled to a power source. The barcode reader charging circuitry is coupled between the battery and the charging contacts and configured to provide charging power from the battery to the barcode reader when the charging contacts are coupled to the mating contacts on the barcode reader.

According to another embodiment, there is provided a docking station for charging a barcode reader. The docking station may include a plurality of charging contacts, a docking surface, and a magnetic structure. The docking surface may include a positioning structure shaped to correspond with a mating shape of at least a portion of a housing of the barcode reader and position mating contacts on the barcode reader with the charging contacts when the mating shape of at least a portion of the housing of the barcode reader is positioned adjacent to the docking surface. The magnetic structure is configured to secure the mating shape of at least a portion of the housing of the barcode reader in a position adjacent to the docking surface. The docking station may include a base for securing the docking station on a horizontal or vertical surface. The docking station may include a battery, master charging contacts, a master charging circuitry, and a barcode reader charging circuitry.

According to another embodiment, there is provided a docking station for charging an elongated barcode reader. The docking station may include a cavity, charging contacts, and a magnetic structure. The barcode reader is positioned in the cavity for charging. The charging contacts, including at least one charging contact for power and at least one charging contact for ground, are positioned about a periphery of the cavity for coupling to mating contacts on the barcode reader when the barcode reader is positioned in the cavity. The magnetic structure is for holding the barcode reader at a position within the cavity such that the mating contacts on the barcode reader are in contact with the charging contacts. The docking station may also include a positioning structure configured to position the barcode reader within the cavity to align the mating contacts on the barcode reader in contact with the charging contacts as the barcode reader is inserted into the cavity. The docking station may include a battery, master charging contacts, a master charging circuitry, and a barcode reader charging circuitry.

According to another embodiment, there is provided a docking station for charging an elongated barcode reader. The docking station may include a cavity, charging contacts, and a holding structure. The barcode reader is positioned in the cavity for charging. The charging contacts positioned about a periphery of the cavity are for coupling to mating contacts on the barcode reader when the barcode reader is positioned in the cavity. The holding structure is for holding the barcode reader at a position within the cavity with each charging contact in contact with a corresponding mating contact on the barcode reader. The docking station may also include a positioning structure configured to position the barcode reader within the cavity to align the mating contacts on the barcode reader in contact with the charging contacts as the barcode reader is inserted into the cavity. The docking station may include a battery, master charging contacts, a master charging circuitry, and a barcode reader charging circuitry.

According to another embodiment, there is provided a barcode reader. The barcode reader may include a barcode scanning unit for reading a barcode, a battery for supplying operating power for the barcode reader, a mating surface, charging contacts, and a magnetic structure. The mating surface is configured to position against a corresponding mating surface of a docking station when the barcode reader is positioned on the docking station for charging the battery. The charging contacts, including at least one charging contact for power and at least one charging contact for ground, are coupled to mating contacts on the docking station when the barcode reader is positioned against the mating surface of the docking station. The magnetic structure is for holding the barcode reader against the mating surface of the docking station. The barcode reader may also include a positioning structure for aligning the barcode reader against the mating surface of the docking station when the barcode reader is positioned against the mating surface of the docking station.

According to another embodiment, there is provided a barcode reader. The barcode reader may include a mouse-shaped housing with a flat bottom surface, a barcode scanning unit for reading a barcode, a battery for supplying operating power for the barcode reader, charging contacts, and a magnetic structure. The charging contacts are on the bottom surface of the housing. The charging contacts are coupled to mating contacts located on a flat top surface of a docking station when the barcode reader is positioned on the docking station for charging the battery. The magnetic structure is for securing the charging contacts of the barcode reader in contact with the mating contacts of the docking station. The barcode reader may also include a positioning structure for aligning the barcode reader against the top surface of the docking station when the barcode reader is positioned on the docking station. The mouse-shaped barcode reader may include a track ball and/or a roller wheel for scrolling and moving a cursor as in conventional computer mouse, and may also have two push buttons. This mouse-shaped barcode reader may function as a handheld barcode reader and may be used on a flat surface like a traditional computer mouse.

According to another embodiment, there is provided a pen-shaped barcode scanning device. The pen-shaped barcode scanning device may include a housing with a generally cylindrical portion sized to be held in an individual's hand in a writing position, a capacitive tip positioned at one end of the housing for use as a stylus against a capacitive touch screen, and a barcode reader positioned at another end of the housing for reading a barcode. The barcode scanning device may include a mating surface configured to position against a corresponding mating surface of a docking station when the barcode scanning device is positioned for charging, charging contacts, and a magnetic structure. The charging contacts, including at least one charging contact for power and at least one charging contact for ground, are coupled to mating contacts on the docking station when the barcode scanning device is positioned against the mating surface of the docking station. The magnetic structure is for holding the barcode scanning device against the mating surface of the docking station. The barcode scanning device may also include a positioning structure for aligning the barcode scanning device against the mating surface of the docking station when the barcode scanning device is positioned against the mating surface of the docking station. The barcode scanning device may include a battery for supplying operating power for the barcode scanning device, and a charging circuitry configured to charge the battery when the barcode scanning device is coupled to an external power source.

According to another embodiment, there is provided a barcode reading system. The system may include a barcode scanning device and a host computer. The barcode scanning device may include a housing with a generally cylindrical portion sized to be held in an individual's hand in a writing position, a capacitive tip positioned at a first end of the housing for use as a stylus against a capacitive touch screen, a barcode reader positioned at a second end of the housing for reading a barcode, and a radio frequency (RF) system for providing a result of reading a barcode to a host computer. The host computer may include an RF system for receiving the result of reading the barcode from the barcode reader, and a touch panel user interface for receiving data input via contact of the capacitive tip against the capacitive touch screen, wherein the data input is related to the result of reading the barcode. The host computer may include a docking station for charging the barcode scanning device. The docking station may include charging contacts and a holding structure. The charging contacts, including at least one charging contact for power and at least one charging contact for ground, are coupled to mating contacts on the barcode scanning device when the barcode scanning device is connected with the docking station. The holding structure is for holding the barcode scanning device.

According to another embodiment, there is provided a case for a hand-held computing device. The case may include a body for accommodating the hand-held computing device, a battery for providing operating power to the hand-held computing device, and a docking mount for securing a barcode reader to the body. The docking mount may include a mating surface against which the barcode reader is positioned for charging, charging contacts, a magnetic structure, and a positioning structure. The charging contacts, including at least one charging contact for power and at least one charging contact for ground, are coupled to mating contacts on the barcode reader when the barcode reader is positioned against the mating surface. The magnetic structure is for holding the barcode reader against the mating surface. The positioning structure is for aligning the barcode reader against the mating surface when the barcode reader is positioned against the mating surface.

According to another embodiment, there is provided a barcode reading system. The system may include a ring, a wrist watch, and a connection between the ring and the wrist watch. The ring may include a scan head for scanning a barcode in a field of view of the scan head. The wrist watch is in communication with the ring and configured to process data received from the ring. The wrist watch may include a battery for providing operating power for the scan head through the connection.

According to another embodiment, there is provided a ring-type barcode reader, comprising a ring-shaped body, a scan head included in the ring-shaped body for reading a barcode in a field of view of the scan head, and a connection for sending data to, and receiving operating power from, a wrist watch.

According to another embodiment, there is provided a wrist watch, comprising a connection for communication with a ring-type barcode reader and receiving data from the ring-type barcode reader, a battery, and a wireless interface for communicating with a host computer.

According to another embodiment, there is provided a mobile computing device. The mobile computing device may include a touch screen, a battery for providing operating power for the mobile computing device, and a docking station for securing a barcode reader. The docking station may include a second battery, master charging contacts, a master charging circuitry, and a barcode reader charging circuitry. The master charging contacts include at least one master charging contact for power and at least one master charging contact for ground. The master charging circuitry is coupled between the second battery and the master charging contacts and configured to charge the second battery when the master charging contacts are coupled to a power source. The barcode reader charging circuitry is coupled between the second battery and the charging contacts and configured to provide charging power from the second battery to the barcode reader when the charging contacts are coupled to the mating contacts on the barcode reader. The docking station may include a mating surface against which the barcode reader is positioned for charging, charging contacts, a magnetic structure, and a positioning structure. The charging contacts including at least one charging contact for power and at least one charging contact for ground are coupled to mating contacts on the barcode reader when the barcode reader is positioned against the mating surface. The magnetic structure is for holding the barcode reader against the mating surface. The positioning structure is for aligning the barcode reader against the mating surface when the barcode reader is positioned against the mating surface.

According to another embodiment, there is provided a barcode reader. The barcode reader may include an eyeglass frame, a barcode reader including a camera installed on the eyeglass frame for reading a barcode in a field of view of the camera, and a battery for providing operating power for the barcode reader. The barcode reader may include a pointing device for aiding a user to aim the camera at the barcode.

A number of features are described herein with respect to embodiments of the invention. It will be appreciated that features described with respect to a given embodiment may also be employed in connection with other embodiments.

The invention includes the features described herein, including the description, the annexed drawings, and, if appended, the claims, which set forth in detail certain illustrative embodiments. These embodiments are indicative, however, of but a few of the various ways in which the principles of the invention may be employed.

BRIEF DESCRIPTION OF THE DRAWINGS

FIGS. 1A and 1B illustrate an example of a stylus barcode reader in accordance with one embodiment of the present disclosure.

FIGS. 2A-C illustrate an example of a stylus barcode reader with a barcode reader rotatably secured at one end of the stylus barcode reader.

DETAILED DESCRIPTION

FIGS. 1A and 1B illustrate an example of a barcode reader 1100 in accordance with one embodiment of the present disclosure, the barcode reader being in the form of a stylus barcode reader.

The stylus barcode reader 1100 includes an elongated housing 1102. The elongated housing 1102 includes a first portion 1102a extending from a central point 1103 of the housing to a first end 1103a and a second portion 1102b extending from the central point 1103 to a second end 1103b. The first portion 1102a may be generally cylindrical with a diameter on the order of 5 to 10 mm that is approximately the diameter of a pen and is configured to be held by an operator in the same manner as an operator would hold a pen for writing. The second portion 1102b may also be generally cylindrical but may be of a larger diameter such that its interior region may be of sufficient size to accommodate the components of a barcode reader as discussed herein. The barcode reader 1100 may include a capacitive tip 1104 positioned at the first end 1103a of the housing 1102 for use as a stylus against a capacitive touch screen when an operator is holding the housing 1102 (holding the first portion 1102a) in a writing position.

A barcode reader 1106 may be positioned at the second end 1103b of the housing 1102 and may be used for reading barcodes. The barcode reader 1106 may be a laser reader or an imaging-based barcode reader which includes illumination light-emitting diodes (LEDs), targeting LEDs, a lens for focusing an image onto a photo sensor, readout circuitry and circuitry to deliver image data to a decoder, which will be explained in detail below.

The housing 1102 of the stylus barcode reader 1100 may also include a trigger button 1108, a good read signal indicator 1110, a battery 1114 within the housing 1102, and a plurality of charging contacts 1112.

The trigger button 1108, if pressed by a user, triggers reading of a barcode presented in a field of view of a camera of the barcode reader 1106. The good read signal indicator 1110 indicates successful reading and decoding of the barcode.

Figure 4:
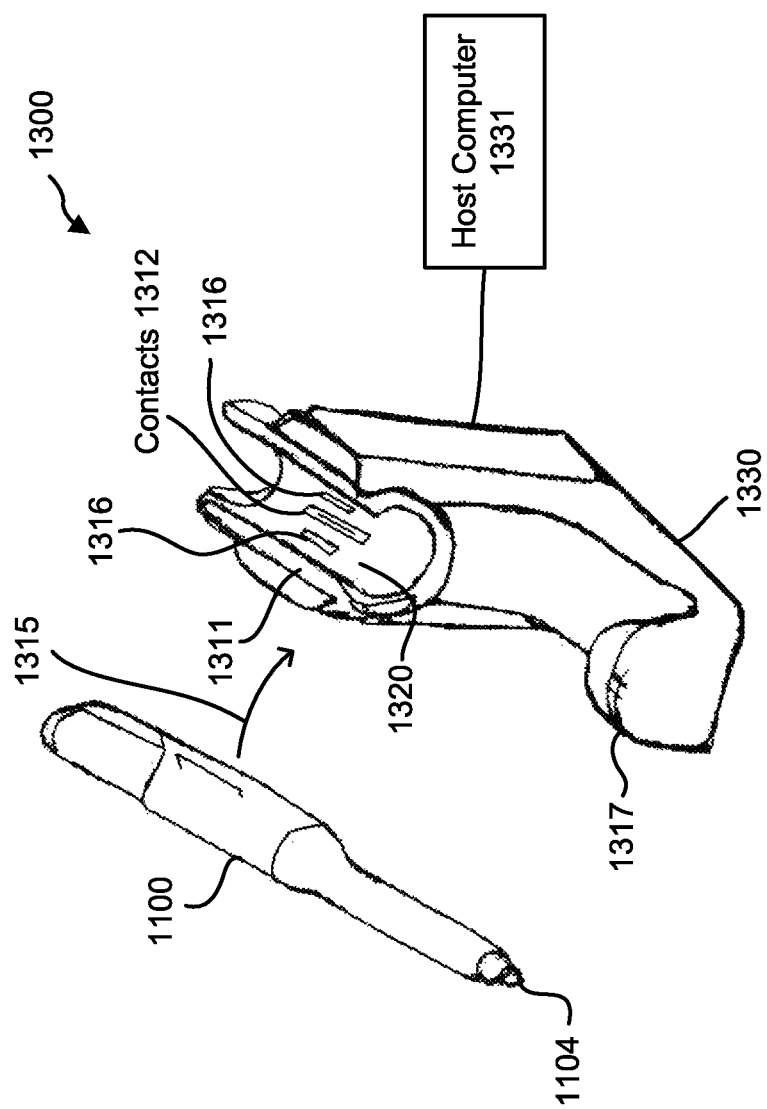
FIG. 4 shows the stylus barcode reader of FIGS. 1A and 1B and an example of a docking station for charging the stylus barcode reader.

The charging contacts 1112 are for providing charging power to the battery 1114 when coupled to mating contacts (e.g., charging contacts 1312 in FIG. 4) on a docking station (e.g., the docking station 1300 in FIG. 4). The charging contacts 1112 include at least one charging contact for power and at least one charging contact for ground. The charging contacts 1112 are coupled to mating contacts on the docking station when a mating surface 1120 of the stylus barcode reader 1100 is positioned against a corresponding mating surface (e.g., the surface 1320 in FIG. 4) of the docking station.

In one embodiment the battery 1114 may be a rechargeable battery such as a lithium ion battery which provides operating power for the barcode reader 1100 (including any wireless communication systems therein) for extended operation of the barcode reader 1100. Extended operation means that an operator may utilize the barcode reader 1100 for multiple scans during work flow that may last several hours.

In another embodiment, the battery 1114 may be a rechargeable battery or a super capacitor which provides operating power for the barcode reader 1100 for a limited number of barcode reads and storage of decoded data within the barcode reader 1100 for subsequent transfer to a docking station. The limited number of barcode reads may be less than 10 barcode reads, at which time the battery 1114 may have insufficient power for additional barcode reads. Transfer of decoded data to the docking station may require power coupled from the docking station to the barcode reader upon docking.

In each case, the battery 1114 may be charged through the charging circuitry included in the stylus barcode reader 1100 when the stylus barcode reader 1100 is coupled to a docking station.

The charging contacts 1112 may be power/data contacts which also provide power/data connectivity to a host device, for example, by using two or four contacts. The terms charging contacts and power/data contacts are used interchangeably. Data related to decoding of a barcode may be transferred via the charging contacts 1112. The power/data connectivity may be in compliance with a Universal Serial Bus (USB) protocol. The stylus barcode reader 1100 may include radio frequency (RF) circuitry for sending image data or decoded data of a barcode to a remote host.

The stylus barcode reader 1100 may further include a magnetic structure 1116 (e.g., one or more magnets) for holding the stylus barcode reader 1100 against a mating surface (e.g., the surface 1320 in FIG. 4) of the docking station when docked for charging. The charging contacts 1112 may be associated with the magnetic structure 1116 to provide a sharp snap when the stylus barcode reader 1100 is mated to the docking station as will be discussed in more detail herein.

The barcode reader 1106 may have a field of view extending along a longitudinal axis of the housing 1102. Alternatively, the barcode reader 1106 may have a field of view adjustable with respect to the housing 1102. As shown in FIGS. 2A-2C, the barcode reader 1106 may be rotatable about a longitudinal axis of the housing 1102 to adjust the field of view. FIG. 2B shows the barcode reader 1106 with a half turn and FIG. 2C shows the barcode reader 1106 with a full turn. The barcode reader 1106 may be connected to the housing 1102 with a swivel part and the connecting surfaces of the barcode reader 1106 and the housing 1102 are slanted such that the field of view of the barcode reader 1106 may be adjusted by rotating the barcode reader 1106 about the axis of the housing 1102.

Figure 11:
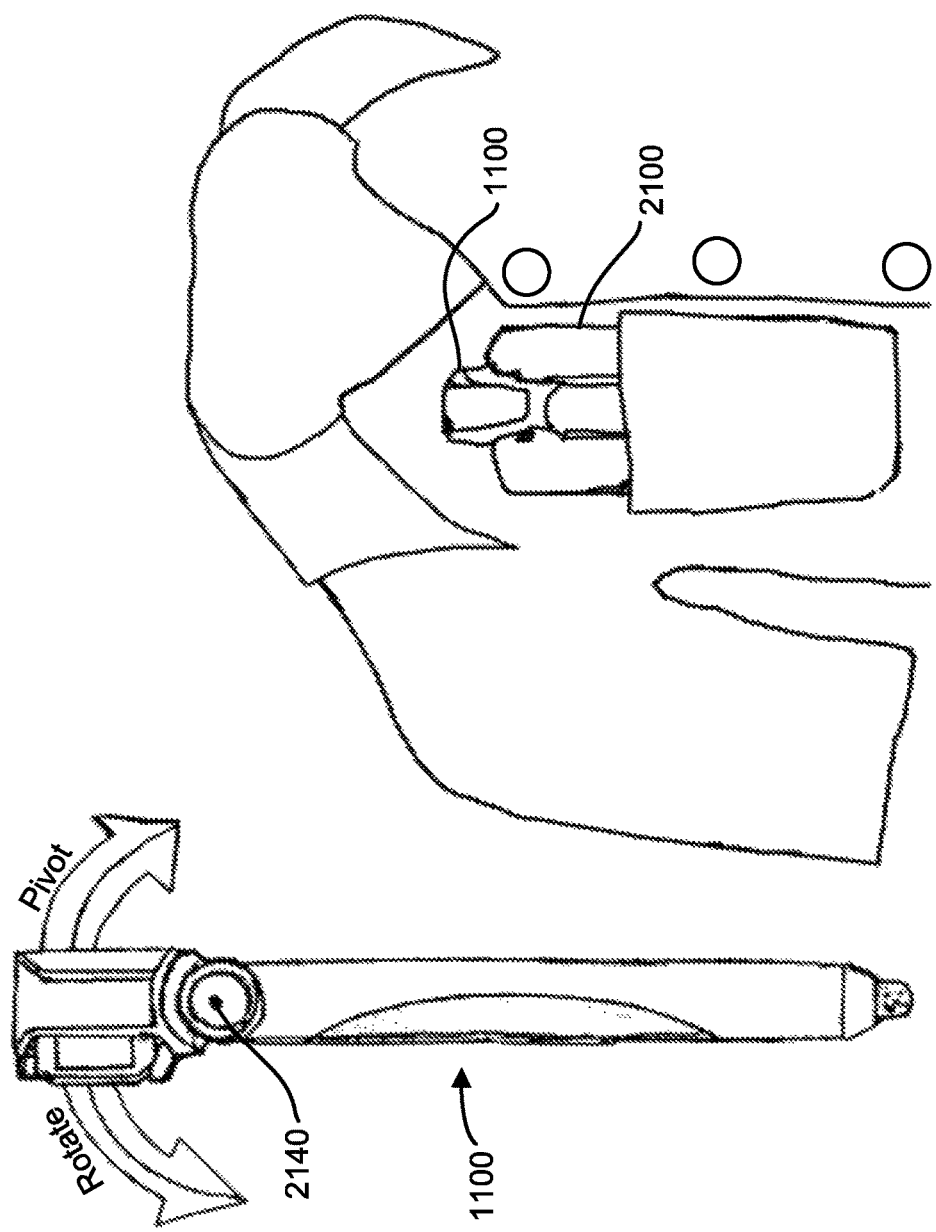
FIG. 11 illustrates an example of a stylus barcode reader and a docking station secured in a chest pocket of a shirt with the stylus barcode reader docked in for charging.

Alternatively, the barcode reader 1106 may be rotatable about an axis different from a longitudinal axis of the housing 1102 to adjust the field of view. The barcode reader may be rotatable about an axis perpendicular to a longitudinal axis of the housing 1102. The barcode reader 1106 may be connected to the housing 1102 with a hinge 2140 as shown in FIG. 11.

Figure 3A:
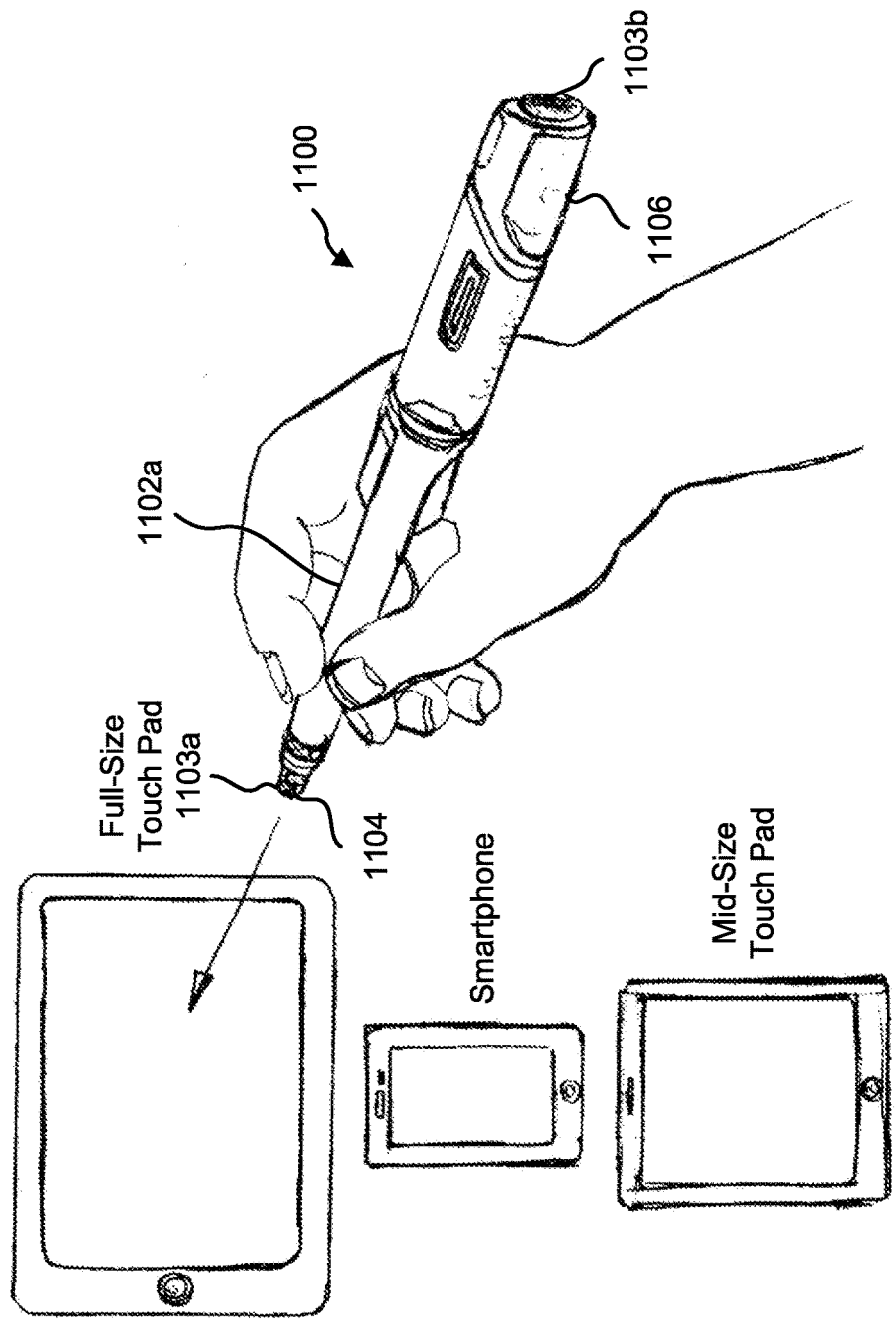
FIG. 3A depicts use of the stylus barcode reader shown in FIGS. 1A and 1B against a touch screen of a tablet or a smart phone.

FIG. 3A depicts using the stylus barcode reader 1100 in use with a touch screen of a computing device, such as a tablet, a smart phone, or the like. The stylus barcode reader 1100 may be gripped by an operator (i.e., gripping the first portion 1102a in the same manner as gripping a pen) and used as a stylus with the capacitive tip 1104 against the touch screen as shown in FIG. 3A. The capacitive tip 1104 may be replaceable and may be replaceable in different sizes depending on an application.

Figure 3B:
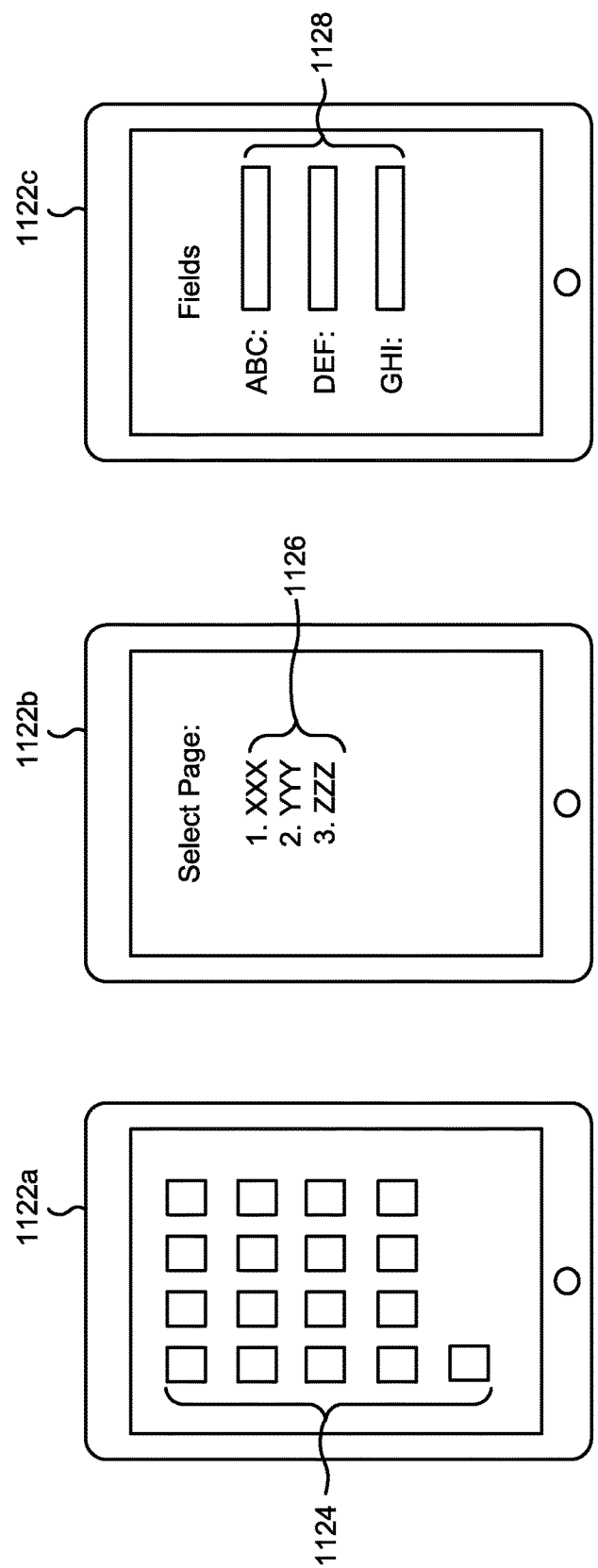
FIG. 3B depicts various ways in which the capacitive tip of the stylus barcode reader may be used to select applications, workflow screens and data fields.

Turning to FIG. 3B in conjunction with FIG. 3A, the capacitive tip 1104 at the first end 1103a may be utilized to, any of: i) select one of multiple applications 1124 into which barcode data is to be input as depicted on the display screen of a computing device 1122a; ii) select one of multiple workflow screens or pages 1126 within an application into which barcode data is to be input as depicted on the display screen of a computing device 1122b; and iii) select one of multiple data fields 1128 within an application into which barcode data is to be input as depicted on the display screen of a computing device 1122c.

Docking Station

FIG. 4 depicts a first embodiment of a docking station 1300 in accordance with an embodiment of the present disclosure, structured as a cradle style docking station for the stylus barcode reader 1100. The docking station 1300 may provide for charging the stylus barcode reader 1100 and/or interfacing data between the stylus barcode reader 1100 and a host computer 1331.

The cradle style docking station 1300 includes a partially open barrel-shaped component 1311 and a base 1330. The partially open barrel-shaped component 1311 may have a diameter being of the same size as the diameter of the second portion 1102b of the barcode reader 1100. The open portion of the barrel-shaped component 1311 may be at least 180 degrees (e.g. the spacing of the open portion is at least the diameter of the second portion 1102b of the barcode reader 1100) such that the barcode reader 1100 may be inserted into the open portion in the direction of arrow 1315. The base 1330 supports the partially open barrel-shaped component 1311 and supports a tip component 1317. The tip component 1317 supports the capacitive tip 1104 when the barcode reader 1100 is positioned within the partially open barrel-shaped component 1311 and ensures that the reader 1100 is correctly positioned within the partially open barrel-shaped component 1311 in the longitudinal direction.

The interior of the barrel-shaped component 1311 may include a plurality of charging/data contacts 1312. The charging/data contacts 1312 may include at least one charging contact for power and at least one charging contact for ground. If the docking station 1300 is further utilized for communication between the barcode reader 1100 and a host computer 1331 the charging/data contacts 1312 may further include two data contacts and the combination of the two data contacts and the power and ground contacts may comply with the USB standard.

The charging/data contacts 1312 are coupled to corresponding charging contacts 1112 on the stylus barcode reader 1100 when the stylus barcode reader 1100 is positioned within the partially open barrel-shaped component 1311, against a mating surface 1320 of the partially open barrel-shaped component 1311, and longitudinally positioned with the capacitive tip 1104 positioned within the tip component 1317.

The base 1330 may be configured to place the docking station 1300 on a horizontal surface (e.g., on a desk). In this case, the stylus barcode reader 1100 is positioned on top of the docking station 1300 when the docking station 1300 is positioned on the horizontal surface. Alternatively, the base 1330 may be configured to secure the docking station 1300 to a vertical surface. In that case, the mating surface 1320 may be generally vertical when the docking station 1300 is secured to the vertical surface, and a shape of the mating surface 1320 or the positioning structure may be adapted to support a weight of the stylus barcode reader 1100 when the stylus barcode reader 1100 is held against the mating surface 1320, for example, by the magnetic structure 1316.

The docking station 1300 may include a positioning structure for generally guiding alignment of the stylus barcode reader 1100 towards the mating surface 1320 of the docking station and, more specifically, generally guiding alignment of the stylus barcode reader 1100 towards the mating surface 1320 to a point where the magnetic fields (described herein) are able to take effect and provide precise alignment of the stylus barcode reader 1100 with the mating surface 1320 in a manner in which the charging contacts 1112 of the stylus barcode reader 1100 align with, and are in contact with, the charging/data contacts 1312 of the docking station 1300.

The positioning structure may be the sides of the partially open barrel-shaped component 1311 and the distance between the partially open barrel-shaped structure 1131 and the tip component 1317 which, in combination, guide the barcode reader 1100 into general alignment (in both the lateral and longitudinal directions) between the charging contacts 1112 of the stylus barcode reader 1100 and the charging/data contacts 1312 of the docking station 1300. In more detail, general alignment is a position wherein the stylus barcode reader 1100 is attracted to the mating surface 1320 by the magnetic field of the first magnet of the stylus barcode reader 1100 being attracted to the magnetic field of the first magnet of the docking station 1300 and the magnetic field of the second magnet of the stylus barcode reader 1100 being attracted to the magnetic field of the second magnet of the docking station 1300. The magnetic field may rotate and/or displace the stylus barcode reader 1100 (laterally or longitudinally) into alignment with the mating surface 1320 of the docking station 1300.

The positioning structure may include a cross section at a base end of the positioning structure adjacent to the mating surface 1320 that is larger than a cross section at a distal end of the positioning structure spaced away from the mating surface 1320. When the barcode reader is imprecisely aligned with the distal end, the positioning structure guides the barcode reader into precise alignment with the base end when the barcode reader is positioned against the mating surface 1320.

Referring to FIG. 1A in conjunction with FIG. 4, magnetic polarity may be used to ensure that correct charging contacts on the stylus barcode reader 1100 align with correct charging/data contacts 1312 on the docking station 1300 and provide the sharp snap to indicate that the stylus barcode reader 1100 is correctly mated to the docking station 1300.

The barcode reader 1100 may include a magnetic structure 1116, which may be two magnets, positioned adjacent to at least one of the charging contacts 1112. A first magnet may have a first polarity directed towards the mating surface 1320 of the docking station 1300 when the stylus barcode reader 1100 is positioned against the mating surface 1320 of the docking station 1300, and a second magnet may have an opposing polarity directed towards the mating surface 1320 of the docking station 1300 when the stylus barcode reader 1100 is positioned against the mating surface 1320 of the docking station.

The docking station 1300 may also include a corresponding magnetic structure 1316 (e.g., a first magnet with the opposing polarity and a second magnet with the first polarity), such that the stylus barcode reader 1100 may be i) attracted to and positioned against the mating surface 1320 of the docking station 1300 when a magnetic field of the first magnet of the stylus barcode reader 1100 is attracted to a magnetic field of the first magnet of the docking station 1300 and a magnetic field of the second magnet of the stylus barcode reader 1100 is attracted to a magnetic field of the second magnet of the docking station 1300, and ii) repelled from being positioned against the mating surface 1320 of the docking station 1300 when the magnetic field of the first magnet of the stylus barcode reader 1100 is repelled from the magnetic field of the second magnet of the docking station 1300 and the magnetic field of the second magnet of the stylus barcode reader 1100 is repelled from the magnetic field of the first magnet of the docking station 1300. This attraction/repulsion dynamic provides for the magnetic field to position (both laterally and rotationally) the barcode reader 1100 within the docking station with the charging contacts 1112 of the barcode reader properly aligned, and in contact with, the charging contacts 1312 of the docking station 1300.

One (or one set) of a plurality of charging contacts (for example charging contacts 1112 on the barcode reader 1100) may be flat and the other (or the other set) of a plurality of charging contacts (for example charging contacts 1312 on the docking station 1300) may be pins on a spring to apply pressure to the flat surface and maintain contact. The springs may have less power than the magnets such that the magnets may hold the two devices together while the springs hold the contacts together.

Figure 5A:
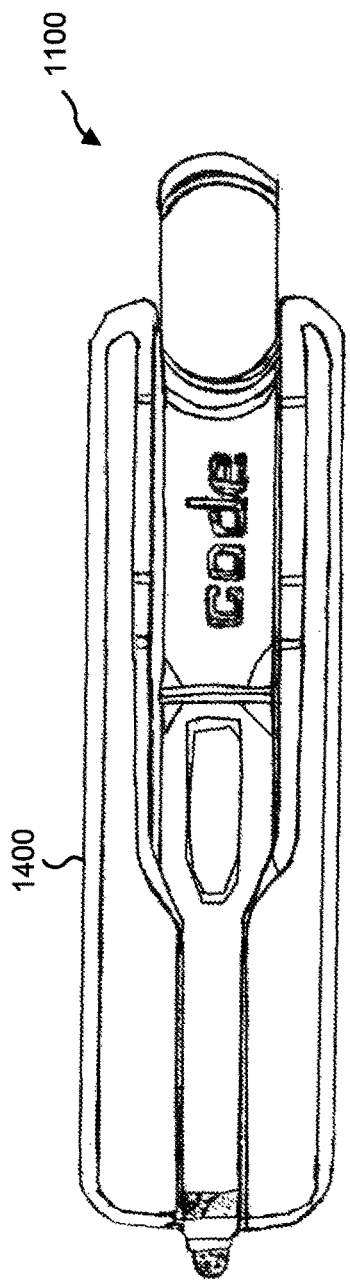
FIGS. 5A and 5B illustrate top and side views of another exemplary docking station with a stylus barcode reader docked in for charging.
Figure 5B:
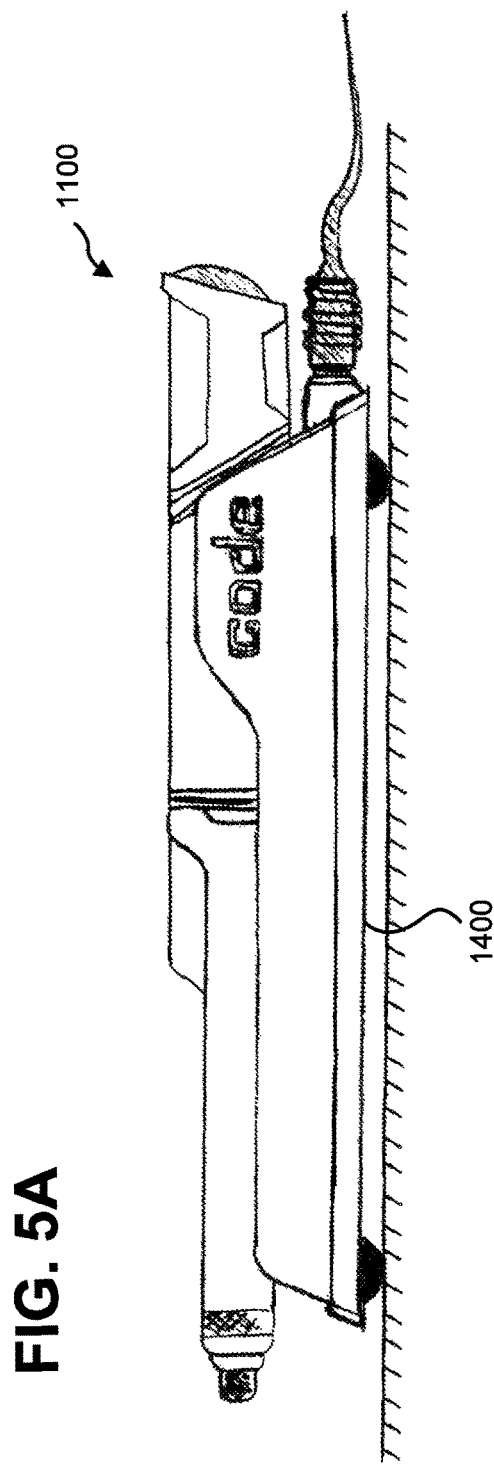

FIGS. 5A and 5B illustrate top and side views of another exemplary cradle style docking station 1400 with a stylus barcode reader 1100 docked in for charging. The docking station 1400 may be placed on a flat horizontal surface and the stylus barcode reader 1100 may be charged by an external power source when docked in the docking station 1400.

Figure 6:
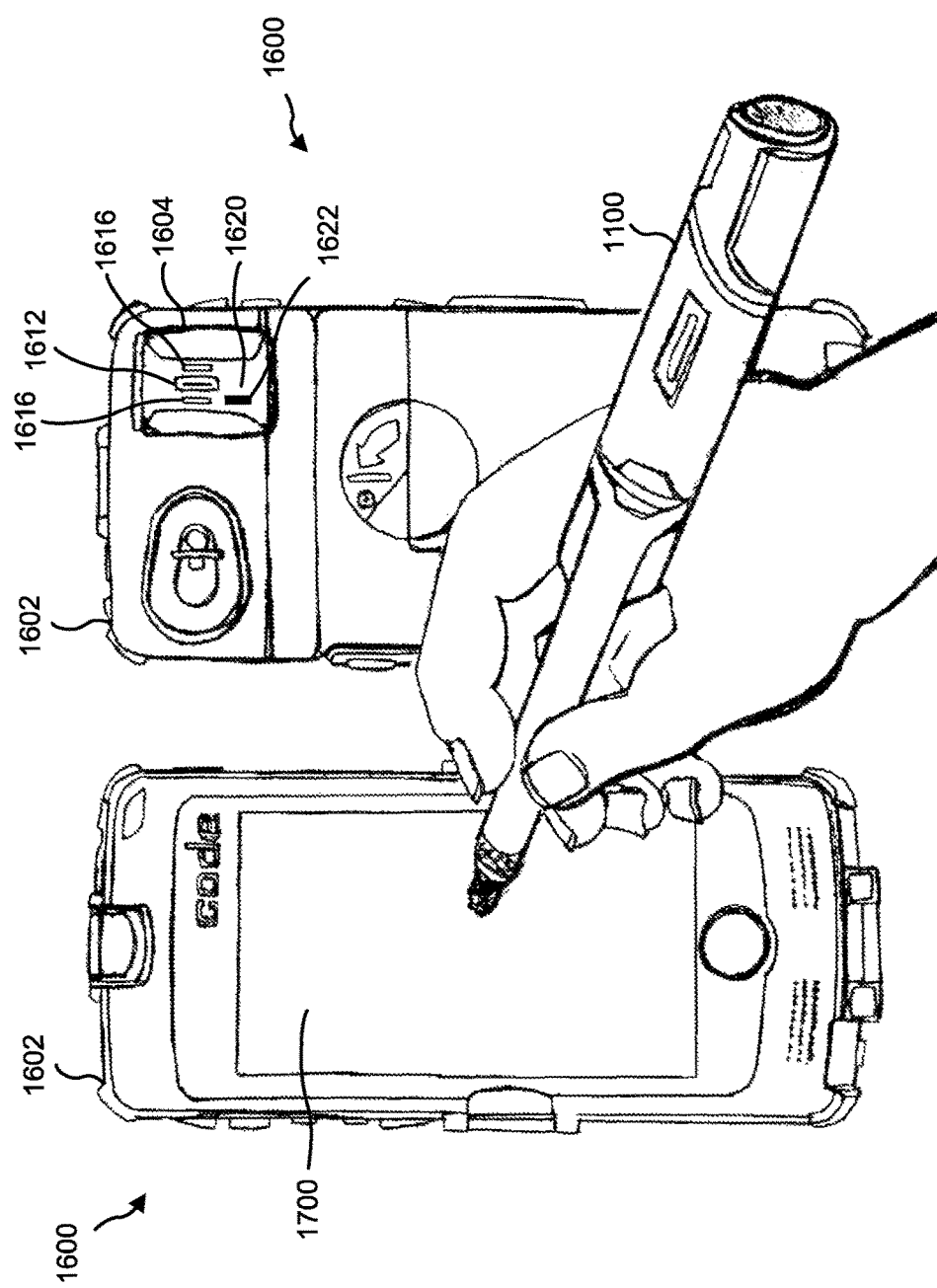
FIG. 6 illustrates front and rear views of an example of a case for a hand-held computing device with a docking mount to hold a stylus barcode reader on the back surface of the case.

FIG. 6 illustrates front and rear views of yet another exemplary docking station 1600 in accordance with the present disclosure. The docking station 1600 is configured as a case for a hand-held computing device. The docking station 1600 (i.e., case) may enclose, either partially or fully, a hand-held computing device 1700 (such as a smart phone, a tablet, or the like). The stylus barcode reader 1100 may be used with a computing device 1700 (similar to computing devices depicted in FIGS. 3A and 3B) having a touch screen while held in the case 1600 as shown in FIG. 6.

Figure 9:
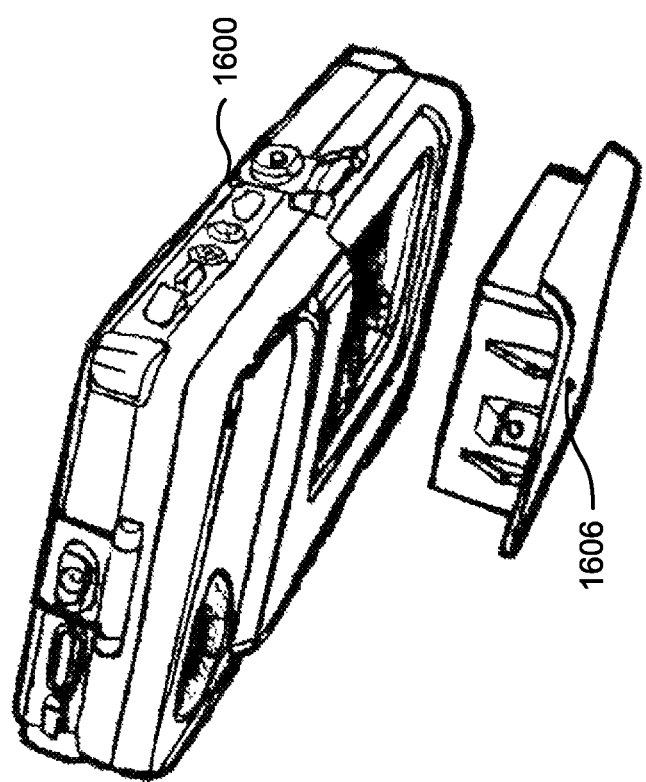
FIG. 9 illustrates an example of an electronic device case with a detachable battery.

The docking station 1600 may include a body 1602 and a battery 1606 (shown in FIG. 9). The body 1602 accommodates a hand-held computing device 1700.

The docking station 1600 includes a partially open barrel-shaped docking mount 1604 to hold a stylus barcode reader 1100 on the rear side of the case. Alternatively, the docking mount 1604 may be arranged on a side of the case 1600. The docking mount 1604 functions as a docking station for the stylus barcode reader 1100 and may include some or all of the features of the docking station 1300 disclosed above.

In more detail, the docking mount 1604 may include at least two charging contacts 1612 including at least one for power and at least one for ground. The charging contacts 1612 of the docking mount 1604 are coupled to charging contacts 1112 on the stylus barcode reader 1100 when the stylus barcode reader 1100 is positioned against a mating surface 1620 of the docking mount 1604 in a similar manner as described with respect to the docking station 1300 of FIG. 4.

Similar to the docking station 1300 of FIG. 4, the docking mount 1604 may include a positioning structure for generally guiding alignment of the stylus barcode reader 1100 towards the mating surface 1620 of the docking mount 1604 and, more specifically, generally guiding alignment of the stylus barcode reader 1100 towards the mating surface 1620 to a point where the magnetic fields (described herein) are able to take effect and provide precise alignment of the stylus barcode reader 1100 with the mating surface 1620 in a manner in which the charging contacts 1112 of the stylus barcode reader 1100 align with, and are in contact with, the charging contacts 1612 of the docking mount 1604.

Similar to the docking station 1300 in FIG. 4, the positioning structure may be the sides of the partially open barrel-shaped structure extending outward from the backside of the docking station 1600 (or side of the docking station 1600) which guides the barcode reader 1100 into general alignment between the charging contacts 1112 of the barcode reader 1100 and the charging contacts 1612 of the docking mount 1604.

Further, for general longitudinal and rotational alignment, the positioning structure may further include a ridge 1622 extended outward from the mating surface 1620 and may be configured to engage with a cavity or a recess 1125 formed in a housing 1102 of the stylus barcode reader 1100. The ridge 1622 may be smaller than the cavity to provide general alignment. Alternatively, the positioning structure may be a cavity extending into the mating surface 1620 of the docking mount 1604, and a corresponding ridge may be formed on the mating surface 1120 of the stylus barcode reader 1100.

The positioning structure may include a cross section at a base end of the positioning structure adjacent to the mating surface 1620 which is larger than a cross section at a distal end of the positioning structure spaced away from the mating surface 1620 such that when the barcode reader is imprecisely aligned with the distal end the positioning structure guides the barcode reader into precise alignment with the base end when the barcode reader is positioned against the mating surface 1620.

The docking mount 1604 may include a magnetic structure 1616 for holding the stylus barcode reader 1100 against the mating surface 1620. The magnetic structure 1616 may include one or more magnets. For example, the magnetic structure 1616 may include a first magnet with a north polarity directed towards the stylus barcode reader 1100 when the stylus barcode reader 1100 is positioned against the mating surface 1620, and a second magnet with a south polarity directed towards the stylus barcode reader 1100 when the stylus barcode reader 1100 is positioned against the mating surface 1620. The magnetic structure 1616 and the magnetic structure 1116 in the stylus barcode reader 1100 result in the stylus barcode reader 1100 i) being attracted to and positioned against the mating surface 1620 when a magnetic field of the first magnet of the stylus barcode reader 1100 is attracted to a magnetic field of the first magnet of the docking mount 1604 and a magnetic field of the second magnet of the stylus barcode reader 1100 is attracted to a magnetic field of the second magnet of the docking mount 1604, and ii) being repelled from being positioned against the mating surface 1620 when the magnetic field of the first magnet of the stylus barcode reader 1100 is repelled from the magnetic field of the second magnet of the docking mount 1604 and the magnetic field of the second magnet of the stylus barcode reader 1100 is repelled from the magnetic field of the first magnet of the docking mount 1604.

Figure 10:
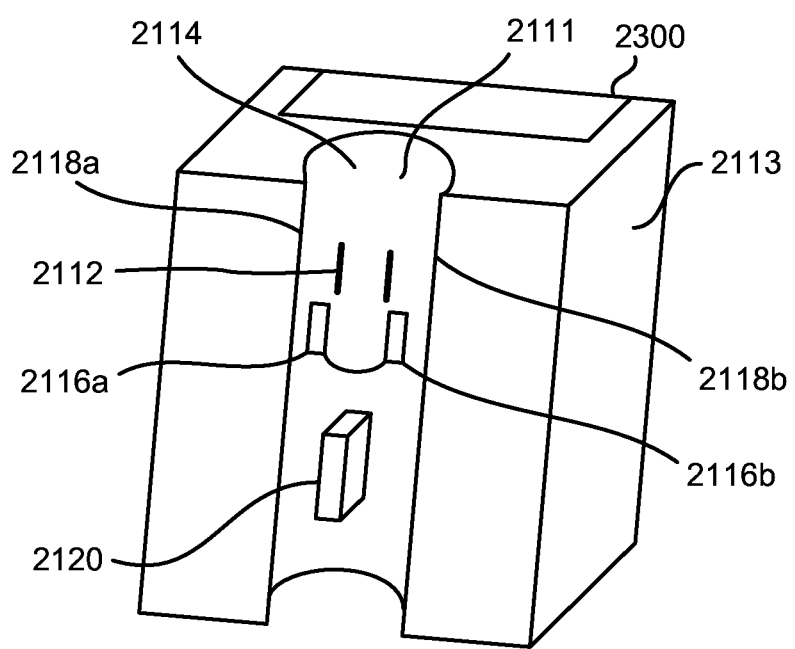
FIG. 10 illustrates an example of a docking station having a well for docking a stylus barcode reader.
Figure 12:
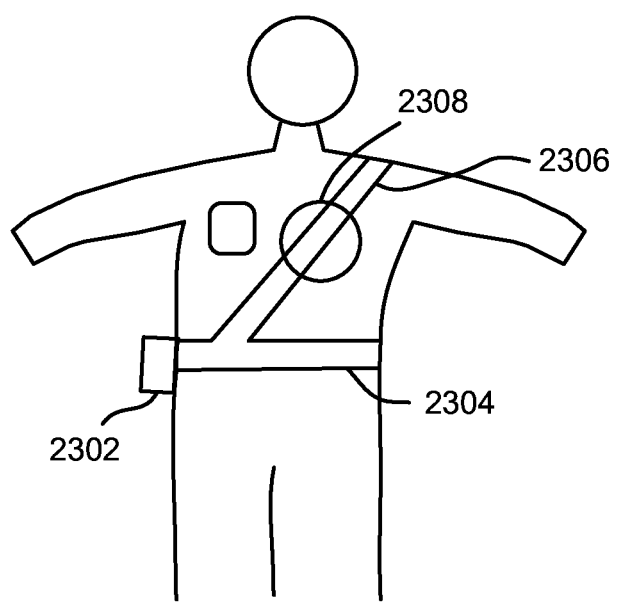
FIG. 12 illustrates, as an example, a docking station secured to an individual using a belt.

FIG. 10 illustrates yet another exemplary docking station 2100 in accordance with the present disclosure. The docking station 2100 is configured as a wearable docking station sized to fit within a typical chest pocket of a shirt, or to be mounted in zone 2308 of a shoulder belt 2306 or zone 2302 of a waste belt 2304, both as depicted in FIG. 12.

The docking station 2100 may include a body 2113 which includes a battery 2300 and a partially open barrel-shaped docking mount 2114 to hold a stylus barcode reader 1100 on one of the sides of the case (shown from the front side, facing away from the user when worn in a chest pocket). The docking mount 2114 functions as a docking station for the stylus barcode reader 1100 and may include some or all of the features of the docking station 1300 disclosed above.

In more detail, the docking mount 2114 may include at least two charging contacts 2112 including at least one for power and at least one for ground. The charging contacts 2112 of the docking mount 2114 are coupled to charging contacts 1112 on the stylus barcode reader 1100 when the stylus barcode reader 1100 is positioned against a mating surface 2111 of the docking mount 2114 in a similar manner as described with respect to the docking station 1300 of FIG. 4.

Similar to the docking station 1300 of FIG. 4, the docking mount 2114 may include a positioning structure for generally guiding alignment of the stylus barcode reader 1100 towards the mating surface 2111 of the docking mount 2114 and, more specifically, generally guiding alignment of the stylus barcode reader 1100 towards the mating surface 2111 to a point where the magnetic fields (described herein) are able to take effect and provide precise alignment of the stylus barcode reader 1100 with the mating surface 2111 in a manner in which the charging contacts 1112 of the stylus barcode reader 1100 align with, and are in contact with, the charging contacts 2112 of the docking mount 2114.

The positioning structure is similar to that described with respect to docking station 1300 and may include the sides 2118a, 2118b of the partially open barrel-shaped structure which guides the barcode reader 1100 into general alignment between the charging contacts 1112 of the barcode reader 1100 and the charging contacts 2112 of the docking mount 2114.

Further, for general longitudinal and rotational alignment, the positioning structure may further include a ridge 2120 extended outward from the mating surface 2111 and may be configured to engage with a cavity or a recess 1125 formed in a housing 1102 of the stylus barcode reader 1100. The ridge 2120 may be smaller than the cavity or recess 1125 to provide general alignment. Alternatively, the positioning structure may be a cavity extending into the mating surface 2111 of the docking mount 2114, and a corresponding ridge may be formed in the housing 1102 of the stylus barcode reader 1100.

The docking mount 2114 may include a magnetic structure 2116 similar to that described with respect to the docking station 1300 of FIG. 4 for holding the stylus barcode reader 1100 against the mating surface 2111. The magnetic structure 2116 may include one or more magnets. For example, the magnetic structure 2116 may include a first magnet 2116a with a north polarity directed towards the stylus barcode reader 1100 when the stylus barcode reader 1100 is positioned against the mating surface 2111, and a second magnet 2116b with a south polarity directed towards the stylus barcode reader 1100 when the stylus barcode reader 1100 is positioned against the mating surface 2111. The magnetic structure 2116 and the magnetic structure 1116 in the stylus barcode reader 1100 result in the stylus barcode reader 1100 i) being attracted to and positioned against the mating surface 2111 when a magnetic field of the first magnet of the stylus barcode reader 1100 is attracted to a magnetic field of the first magnet of the docking mount 2114 and a magnetic field of the second magnet of the stylus barcode reader 1100 is attracted to a magnetic field of the second magnet of the docking mount 2114, and ii) being repelled from being positioned against the mating surface 2111 when the magnetic field of the first magnet of the stylus barcode reader 1100 is repelled from the magnetic field of the second magnet of the docking mount 2114 and the magnetic field of the second magnet of the stylus barcode reader 1100 is repelled from the magnetic field of the first magnet of the docking mount 2114.

Figure 13:
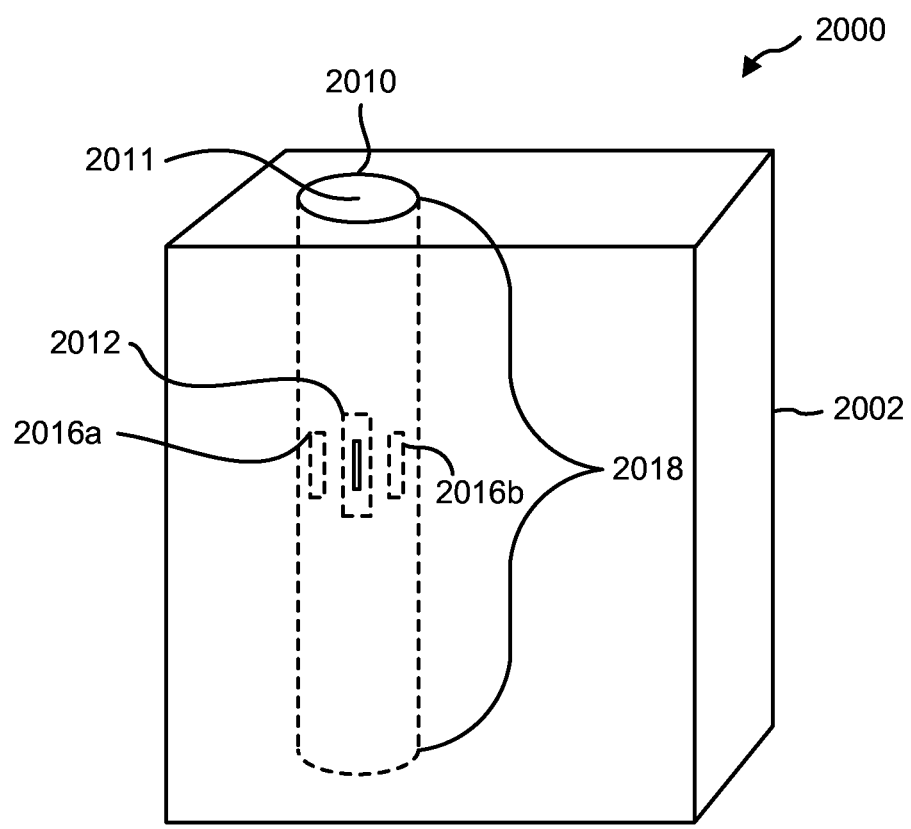
FIG. 13 shows an example of a case for a hand-held computing device with a well for charging a stylus barcode reader.

FIG. 13 depicts yet another embodiment of a docking station 2000 in accordance with the present disclosure. Like docking station 2100 of FIG. 10, docking station 2000 is configured as a wearable docking station sized to fit within a typical chest pocket of a shirt, or to be mounted in zone 2308 of the shoulder belt 2306 or zone 2302 of the waste belt 2304, both as depicted in FIG. 12.

The docking station 2000 includes a docking well 2010 which may be formed in the body 2002 of the docking station 2000. The stylus barcode reader 1100 may be inserted into the well 2010. The well 2010 includes charging contacts 2012 for charging the stylus barcode reader 1100 when the stylus barcode reader 1100 is inserted into the well 2010.

The well 2010 includes a cavity 2011 and a plurality of charging contacts 2012 on the interior periphery of the cavity 2011. A stylus barcode reader 1100 is inserted into the cavity 2011 for charging. The charging contacts 2012 include at least one contact for power and at least one contact for ground. The charging contacts 2012 are configured for coupling to charging contacts 1112 on the stylus barcode reader 1100 when the stylus barcode reader 1100 is positioned in the cavity 2011 at a correct depth and with a correct rotation.

The well 2010 and the stylus barcode reader 1100 may include positioning structure for generally guiding alignment of the stylus barcode reader 1100 towards the well 2010 of the docking station 2000, more specifically, guiding generally alignment of the charging contacts 1112 of the stylus barcode reader 1100 towards the charging contacts 2012 of the well 2010 to a point where the magnetic fields (described herein) are able to take effect and provide precise alignment of the stylus barcode reader 1100 within the well 2010 such that the charging contacts 1112 of the stylus barcode reader 1100 align with, and are in contact with, the charging contacts 2012 of the well 2010.

The positioning structure may be: i) the sides of the perimeter of the cavity 2011 (with a cross section larger than the diameter of the first portion 1102a of the barcode reader 1100) and the depth 2018 of the cavity 2011; and the external housing of the barcode reader 1100 as well as the distance between the capacitive tip 1104 and the charging contacts 1112. In combination, the positioning structure guides the barcode reader 1100 into general alignment into the cavity 2011 to a depth at which the capacitive tip 1104 touches the bottom of the cavity and at which point the charging contacts 1112 of the barcode reader 1100 are aligned (in the depth dimension) with the charging contacts 2012 on the well 2010 of the docking station 2000.

The well 2010 may further include a magnetic structure 2016 for rotating into rotational position, and holding the stylus barcode reader 1100 at a position within the cavity 2011 such that the charging contacts 1112 on the stylus barcode reader 1100 are in contact with the charging contacts 2012. The magnetic structure 2016 may include one or more magnets. For example, the magnetic structure 2016 may include a first magnet 2016a with a north polarity directed towards the stylus barcode reader 1100 when the stylus barcode reader 1100 is positioned within the cavity 2011, and a second magnet 2016b with a south polarity directed towards the stylus barcode reader 1100 when the stylus barcode reader 1100 is positioned within the cavity 2011. Corresponding magnets within the stylus barcode reader 1100, including a first magnet with a south polarity and a second magnet with a north polarity, may result in the stylus barcode reader 1100 i) being attracted to and positioned within the cavity 2011 with the charging contacts 1112 on the stylus barcode reader 1100 in contact with the charging contacts 2012 when a magnetic field of the first magnet of the stylus barcode reader 1100 is attracted to a magnetic field of the first magnet of the well 2010 and a magnetic field of the second magnet of the stylus barcode reader 1100 is attracted to a magnetic field of the second magnet of the well 2010, and ii) being repelled from being positioned within the cavity 2011 with the charging contacts 1112 on the stylus barcode reader 1100 in contact with the charging contacts 2012 when the magnetic field of the first magnet of the stylus barcode reader 1100 is repelled from the magnetic field of the second magnet of the well 2010 and the magnetic field of the second magnet of the stylus barcode reader 1100 is repelled from the magnetic field of the first magnet of the well 2010. As such, the attraction/repulsion forces will rotate the stylus into alignment and provide the sharp snap as the magnets make contact.

In other embodiments, the positioning structure may be a structure extending outward from a surface defining an entrance to the cavity 2011. The structure may be configured to engage with a corresponding positioning structure of the stylus barcode reader 1100.

Alternatively, the positioning structure may be a recess extending inward from a surface defining an entrance to the cavity 2011. The recess may be configured to engage with a corresponding positioning structure of the stylus barcode reader 1100.

The positioning structure may further be configured to rotate the stylus barcode reader 1100 within the cavity 2011 when the stylus barcode reader 1100 is inserted into the cavity 2011 such that the charging contacts 1112 on the stylus barcode reader 1100 are generally aligned with the charging contacts 2012.

The docking stations 1600, 2000 may be secured to an individual using an attachment feature. The attachment feature may be a waist belt, a shoulder belt, a flexible band, or a flexible strap. Alternatively, the attachment feature may be one of a clip, a safety pin and clasp combination, a flange for being sewn into an article of clothing, or any other means.

Figure 7:
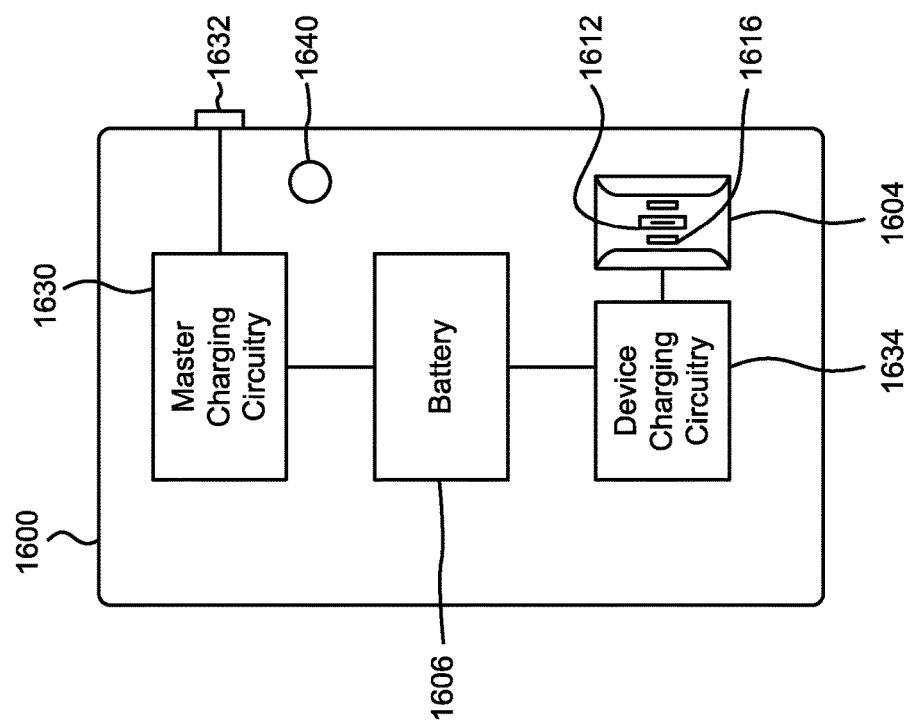
FIG. 7 shows a diagram of a case for a hand-held computing device in accordance with one embodiment.
Figure 8A:
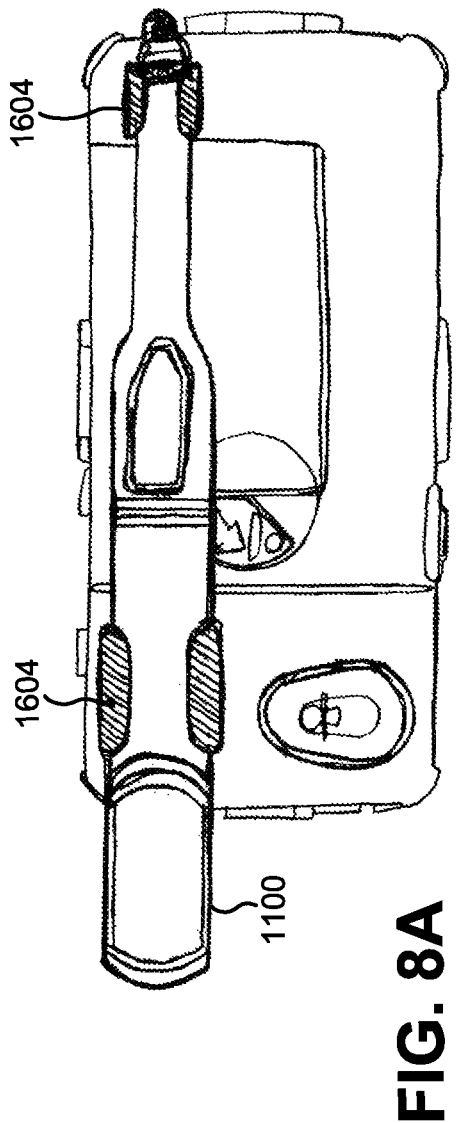
FIGS. 8A and 8B illustrate rear and side views of an example of a case with a stylus barcode reader held in a docking mount on the rear surface of the case.
Figure 8B:
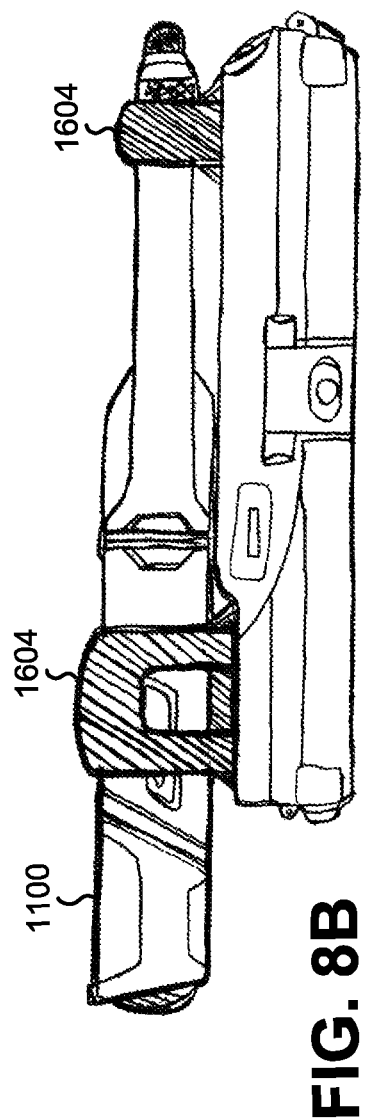
Figure 14:
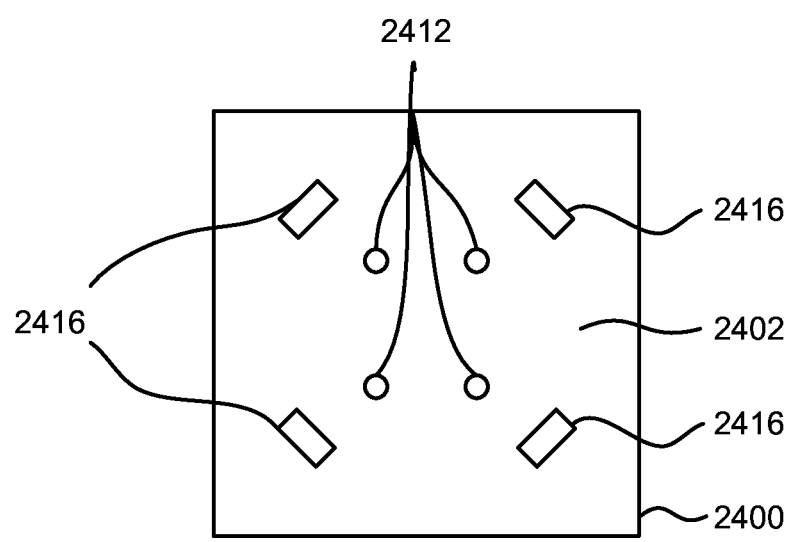
FIG. 14 illustrates an example of a flat docking station.

Referring to FIG. 7, the docking station 1600 (i.e., a case) and each of the wearable docking stations 2000, 2100, and 2400 (as shown in FIG. 14) may include structure depicted in FIG. 7. FIG. 7 depicts the structure embodied in the docking station 1600 for illustration purposes and the structure will be explained hereafter with reference to the docking station 1600. However, it should be noted that the docking stations 2000, 2100 and 2400 may also have a similar structure as depicted in FIG. 7. The docking station 1600 may include a master battery 1606 (also represented as 2300 in FIG. 10), master charging contacts 1632, a master charging circuitry 1630, and a device charging circuitry 1634.

The master charging contacts 1632 may include at least one master charging contact for power and at least one master charging contact for ground.

The master charging circuitry 1630 is coupled between the master battery 1606 and the master charging contacts 1632 and is configured to charge the master battery 1606 when the master charging contacts 1632 are coupled to an external power source (e.g., AC power through a wall outlet or a docking station for the case).

The master battery 1606 included in the docking station 1600 may: i) supply power to the other systems of the docking station as described in more detail in FIGS. 20A, 20B, 21A and 21B; and/or ii) supply power to the stylus barcode reader 1100 when docked to the docking station 1600. The master battery 1606 may be rechargeable and may be detachable and replaceable as shown in FIG. 9.

The device charging circuitry 1634 is coupled between the master battery 1606 and the charging contacts 1612 in the docking mount 1604 and may provide charging power from the master battery 1606 to the stylus barcode reader 1100 when the stylus barcode reader 1100 is docked in the docking mount 1604 (i.e., when the charging contacts 1612 are coupled to corresponding charging contacts 1112 on the stylus barcode reader 1100).

The case 1600 may further include a trigger button 1640 on the body 1602 to trigger scanning of a barcode when the stylus barcode reader 1100 is docked in the docking mount 1604.

Figure 15A:
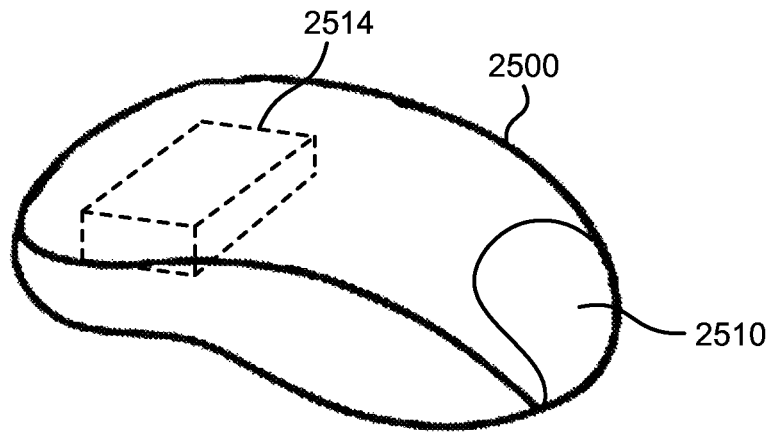
FIG. 15A illustrates an example of a mouse-shaped barcode reader with charging contacts on a bottom surface.
Figure 15B:
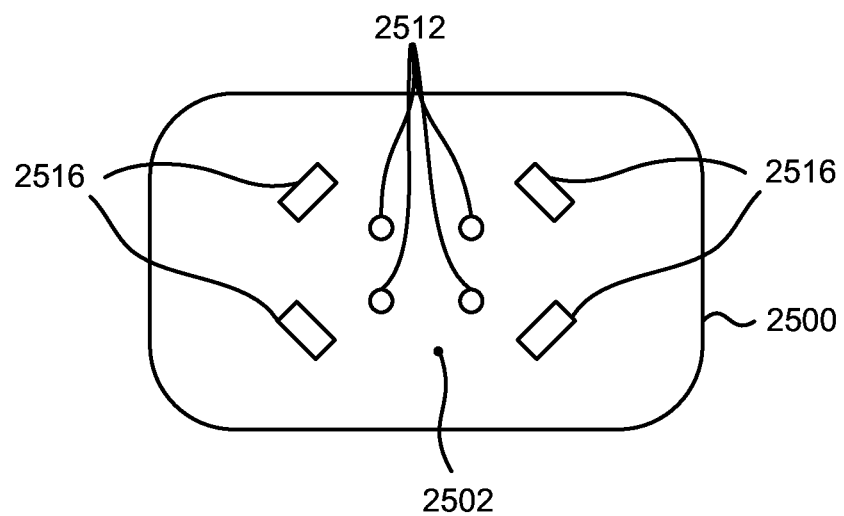
FIG. 15B illustrates a bottom view of the mouse-shaped barcode reader.

FIGS. 15A and 15B illustrate a perspective view and a bottom view of yet another exemplary barcode reader 2500 in accordance with the present disclosure. The barcode reader 2500 is a mouse-shaped barcode reader with charging contacts on a bottom surface (as illustrated in FIG. 15B). FIG. 14 illustrates yet another example of a docking station 2400 in accordance with an embodiment of the present disclosure that may be used with the mouse-shaped barcode reader 2500.

Figure 15C:
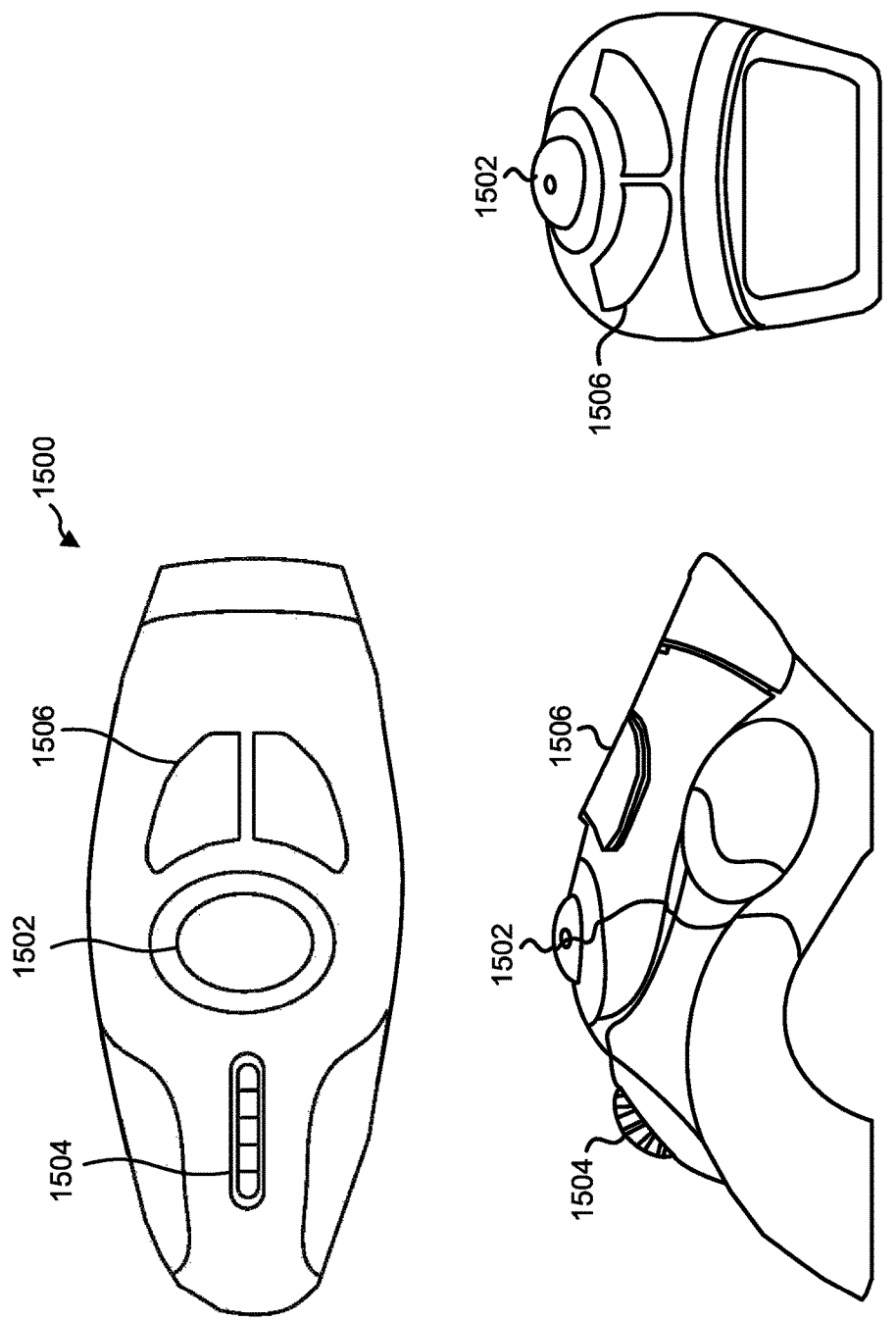
FIG. 15C illustrates top, side, and front views of an exemplary combined mouse barcode reader.

FIG. 15C illustrates top, side, and front views of an exemplary combined mouse barcode reader 1500. The combined mouse barcode reader 1500 may include a track ball 1502 and/or a roller wheel 1504 for scrolling a screen and moving a cursor as in a conventional computer mouse. The combined mouse barcode reader 1500 may have one or more push buttons 1506 (e.g., two push buttons). The push button(s) 1506 may be used to trigger capturing a barcode presented in a field of view of the camera included in the mouse barcode reader 1500. The combined mouse barcode reader 1500 may function as a handheld barcode reader and may be used on a flat surface like a traditional computer mouse. The combined mouse barcode reader 1500 may function both as a hand-held barcode reader and as a computer mouse.

The docking station 2400 shown in FIG. 14 is a wearable flat docking station 2400 which again may be configured as a wearable docking station sized to fit within a typical chest pocket of a shirt, or to be mounted in zone 2308 of shoulder belt 2306 or zone 2302 of a waste belt 2304, both as depicted in FIG. 12.

The docking station 2400 includes a mating surface 2402 and charging contacts 2412. The mating surface 2402 is a surface against which a barcode reader 2500 (shown in FIG. 15A) is positioned for charging. The charging contacts 2412 include at least one charging contact for power and at least one charging contact for ground. The charging contacts 2412 are coupled to charging contacts 2512 on the barcode reader 2500 when the barcode reader 2500 is positioned against the mating surface 2402.

The docking station 2400 and barcode reader 2500 may include a positioning structure. The positioning structure of the barcode reader 2500 may include a cavity cross section at a base end of the positioning structure adjacent to the mating surface 2111 which is larger than a cross section at a distal end of the positioning structure spaced away from the mating surface 2111 (into the interior of the barcode reader 2500) such that when the barcode reader 2500 is imprecisely aligned with the distal end with protrusions on the docking station 2400, the positioning structure may guide the barcode reader 2500 into precise alignment against the mating surface (e.g., the surface 2402) of the docking station (e.g., the docking station 2400).

The docking station 2400 may include a magnetic structure 2416 (e.g., magnets) for holding the barcode reader 2500 against the mating surface 2402. For example, the magnetic structure 2416 may include a first magnet with a north polarity directed towards the barcode reader 2500 when the barcode reader 2500 is positioned against the mating surface 2402, and a second magnet with a south polarity directed towards the barcode reader 2500 when the barcode reader 2500 is positioned against the mating surface 2402. Corresponding magnets within the barcode reader 2500, including a first magnet with a south polarity and a second magnet with a north polarity, may result in the barcode reader 2500 i) being attracted to and positioned against the mating surface 2402 of the docking station 2400 when a magnetic field of the first magnet of the barcode reader 2500 is attracted to a magnetic field of the first magnet of the docking station 2400 and a magnetic field of the second magnet of the barcode reader 2500 is attracted to a magnetic field of the second magnet of the docking station 2400, and ii) being repelled from being positioned against the mating surface 2402 of the docking station 2400 when the magnetic field of the first magnet of the barcode reader 2500 is repelled from the magnetic field of the second magnet of the docking station 2400 and the magnetic field of the second magnet of the barcode reader 2500 is repelled from the magnetic field of the first magnet of the docking station 2400.

The docking station 2400 may include a positioning structure for aligning the barcode reader 2500 against the mating surface 2402 when the barcode reader 2500 is positioned against the mating surface 2402. For example, the positioning structure may be configured to rotate the barcode reader 2500 into alignment against the mating surface 2402 when the barcode reader 2500 is attracted to the mating surface 2402 by the magnetic field of the first magnet of the barcode reader 2500 being attracted to the magnetic field of the first magnet of the docking station 2400 and the magnetic field of the second magnet of the barcode reader 2500 being attracted to the magnetic field of the second magnet of the docking station 2400.

The positioning structure may be configured to laterally displace the barcode reader 2500 into alignment against the mating surface 2402 when the barcode reader 2500 is attracted to the mating surface 2402 by the magnetic field of the first magnet of the barcode reader 2500 being attracted to the magnetic field of the first magnet of the docking station 2400 and the magnetic field of the second magnet of the barcode reader 2500 being attracted to the magnetic field of the second magnet of the docking station 2400.

The positioning structure may be a structure (e.g., a ridge) extending outward from the mating surface 2402 and configured to engage with an external housing of the barcode reader 2500. The positioning structure may extend outward from the mating surface 2402 to engage with a cavity or a recess formed in a housing of the barcode reader 2500.

Alternatively, the positioning structure may be a cavity extending into a housing of the docking station 2400 from the mating surface 2402 to engage with an external housing of the barcode reader 2500.

The docking station 2400 may include a battery (not shown) for charging the barcode reader 2500 docked in the docking station 2400. The docking station 2400 may include master charging contacts, a master charging circuit, and a device charging circuit, similar to the configuration shown in FIG. 7. The master charging contacts include at least one master charging contact for power and at least one master charging contact for ground. The master charging circuitry is coupled between the battery and the master charging contacts and configured to charge the battery when the master charging contacts are coupled to an external power source. The device charging circuitry is coupled between the battery and the charging contacts and configured to provide charging power from the battery to the barcode reader 2500 when the charging contacts 2412 are coupled to the charging contacts 2512 on the barcode reader 2500.

The mouse-shaped barcode reader 2500 includes a barcode reading unit 2510, a battery 2514 and charging contacts 2512 on the bottom surface 2502. The mouse-shaped barcode reader 2500 with a flat bottom surface 2502 can be docked in a flat docking station 2400 shown in FIG. 14. It should be noted that the shape of the barcode reader 2500 is provided as an example and the barcode reader 2500 may be in any shape.

The barcode reading unit 2510 is for reading a barcode presented in a field of view of the barcode reading unit 2510. The battery 2514 supplies operating power for the barcode reading unit 2510. The barcode reader 2500 has a flat bottom surface 2502 (i.e., a mating surface) configured to position against a corresponding mating surface 2402 of a docking station 2400 when the barcode reader 2500 is positioned on the docking station 2400 for charging.

The charging contacts 2512 include at least one charging contact for power and at least one charging contact for ground. The charging contacts 2512 are coupled to charging contacts 2412 on the docking station 2400 when the barcode reader 2500 is positioned against the mating surface 2402 of the docking station 2400.

The barcode reader 2500 may include a magnetic structure 2516 (e.g., magnets) for holding the barcode reader 2500 against the mating surface 2402 of the docking station 2400. The barcode reader 2500 may include a positioning structure for aligning the barcode reader 2500 against the mating surface 2402 of the docking station 2400 when the barcode reader 2500 is positioned against the mating surface 2402 of the docking station 2400. The magnetic structure and the positioning structure of the barcode reader 2500 are structures corresponding to the magnetic structure and the positioning structure of the docking station 2400. The positioning structure may be a periphery of a housing of the barcode reader 2500 to be engaged with an extension formed around an edge of the mating surface 2402 of the docking station 2400.

The barcode reader 2500 may include a radio frequency (RF) circuitry for sending image data or decoded data of a barcode to a remote host. The barcode reader 2500 may include a trigger button for triggering capturing of an image of a barcode. The barcode reader 2500 may include an indicator signal generator for generating a signal indicating a successful reading of a barcode. The barcode reader 2500 may be in a computer mouse shape, or in any other shape with a flat mating surface.

Figure 16:
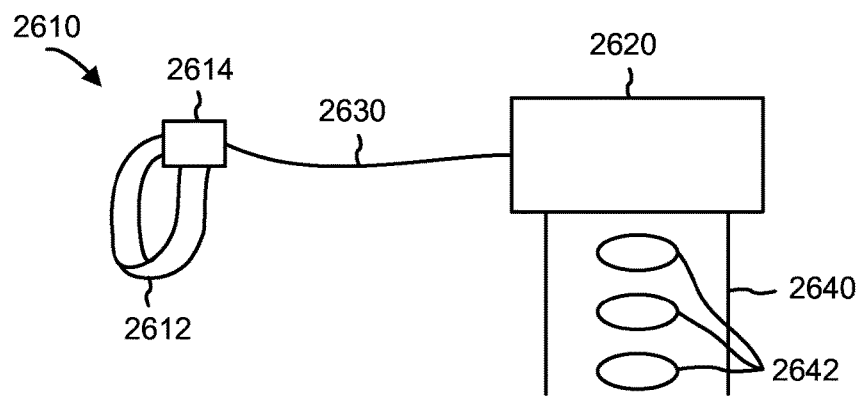
FIG. 16 illustrates a ring reader and a wrist watch connected by a wire in accordance with an exemplary embodiment.

FIG. 16 illustrates a ring reader and a wrist watch connected by a wire. The ring reader 2610 includes a ring-shaped body 2612 and a scan head 2614 included in the ring-shaped body 2612 for scanning a barcode in a field of view of the scan head 2614.

The wrist watch 2620 is in communication with the ring reader 2610 and configured to process data received from the ring reader 2610. The ring reader 2610 and the wrist watch 2620 may be connected via a wire connection 2630 for communicating data between the ring reader 2610 and the wrist watch 2620. Alternatively, a wireless connection may be established between the ring reader 2610 and the wrist watch 2620. The wrist watch 2620 may include a wireless interface for communicating with a host computer using a wireless protocol, such as IEEE 802.11 WiFi or Bluetooth.

The wrist watch 2620 includes a battery 2642 for providing operating power for the scan head 2614 through the wire connection 2630. The battery 2642 may be included in a band 2640 of the wrist watch 2620. The wire connection 2630 may be compatible with a Universal Serial Bus (USB) protocol.

Figure 17:
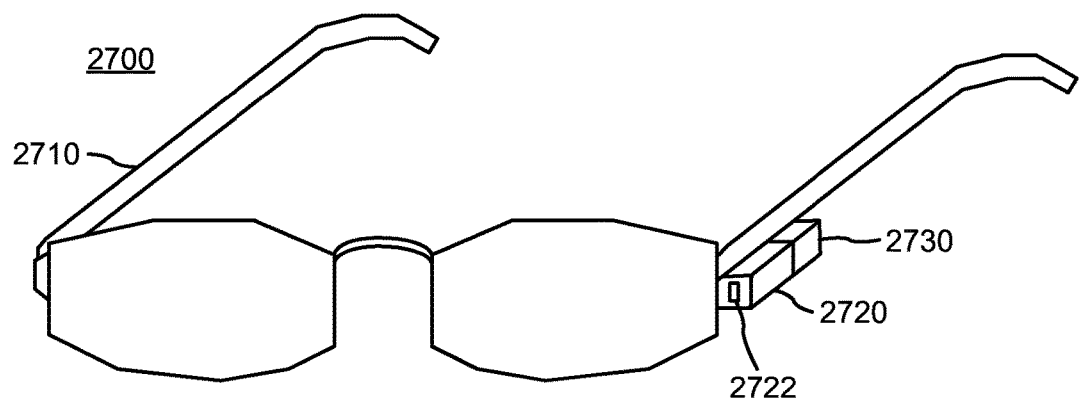
FIG. 17 illustrates an example of an eyeglass barcode reader.

FIG. 17 illustrates an example of an eyeglass barcode reader. The barcode reader 2700 includes an eyeglass frame 2710, a barcode reader 2720, and a battery 2730. The barcode reader 2720 includes a camera 2722 installed on the eyeglass frame for reading a barcode in a field of view of the camera 2722. The battery 2730 provides operating power for the barcode reader 2720. The barcode reader 2700 may include a pointing device for aiding a user to aim the camera at the barcode. The pointing device may be a laser. The barcode reader 2720 may be configured to read the barcode in response to a trigger signal. The barcode reader 2700 may include a power/data interface for sending data to a host computer and receiving power from a power source.

Figure 18A:
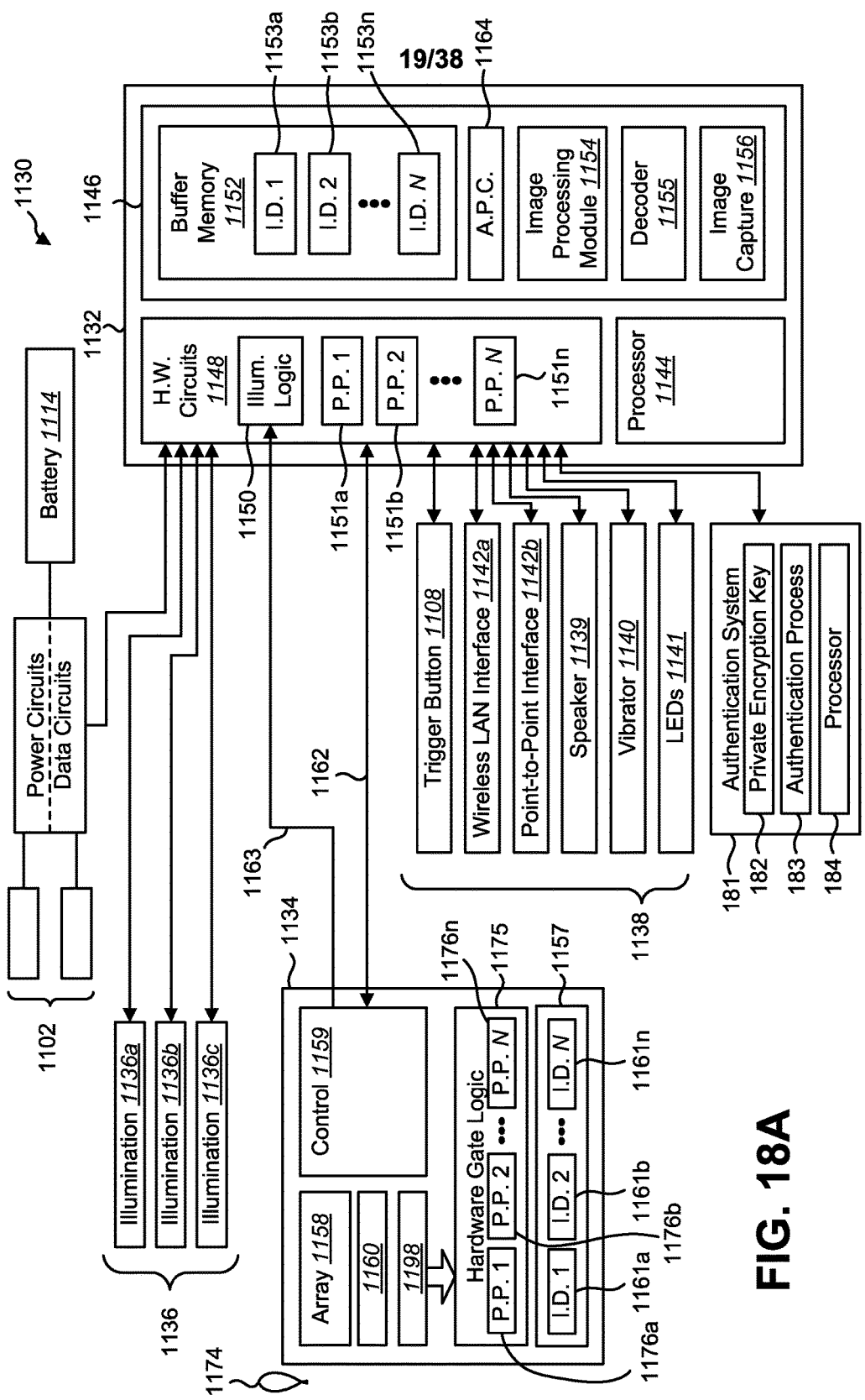
FIG. 18A is a block diagram of a barcode reader system which may be implemented in any of the embodiments of the barcode readers disclosed herein.

FIG. 18A is a block diagram of a barcode reader 1130 which may be implemented in any of the barcode readers 1100, 2500, 2610, and 2720. The barcode reader 1130 may include an image capture control and decode system 1132 in combination with an image sensor system package 1134, an illumination system 1136, and various input/output (I/O) peripheral systems 1138 in accordance with one embodiment of the present disclosure.

The image sensor system package 1134 and the image capture control and decode system 1132 may be included in two separate packages, each of which may include one or more silicon dies that may include: i) a processor; ii) hardware circuits including digital signal processing and/or gate logic, and iii) memory. The processor may be a general purpose single or multi-die microprocessor (e.g., an ARM), a special purpose microprocessor (e.g., a digital signal processor (DSP)), a microcontroller, a programmable gate array, etc. The processor may be referred to as a central processing unit (CPU). The memory may be any combination of non-volatile memory or storage and volatile memory or storage. The non-volatile memory may include a combination of read-only memory (ROM) and/or flash memory.

The illumination system 1136 may include a plurality of illumination sub-systems 1136a-c, each having different illumination characteristics. Some examples of different illumination characteristics include the angle of illumination with respect to an optical axis, the intensity of illumination, the wavelength of illumination, diffusion characteristics of the illumination, the illumination profile which may include the intensity of the illumination within a two dimensional plane spaced from the barcode reader 1130 or the three dimensional shape within the field of view at which illumination emitted by the illumination sub-system has a predetermined intensity, etc.

Figure 22:
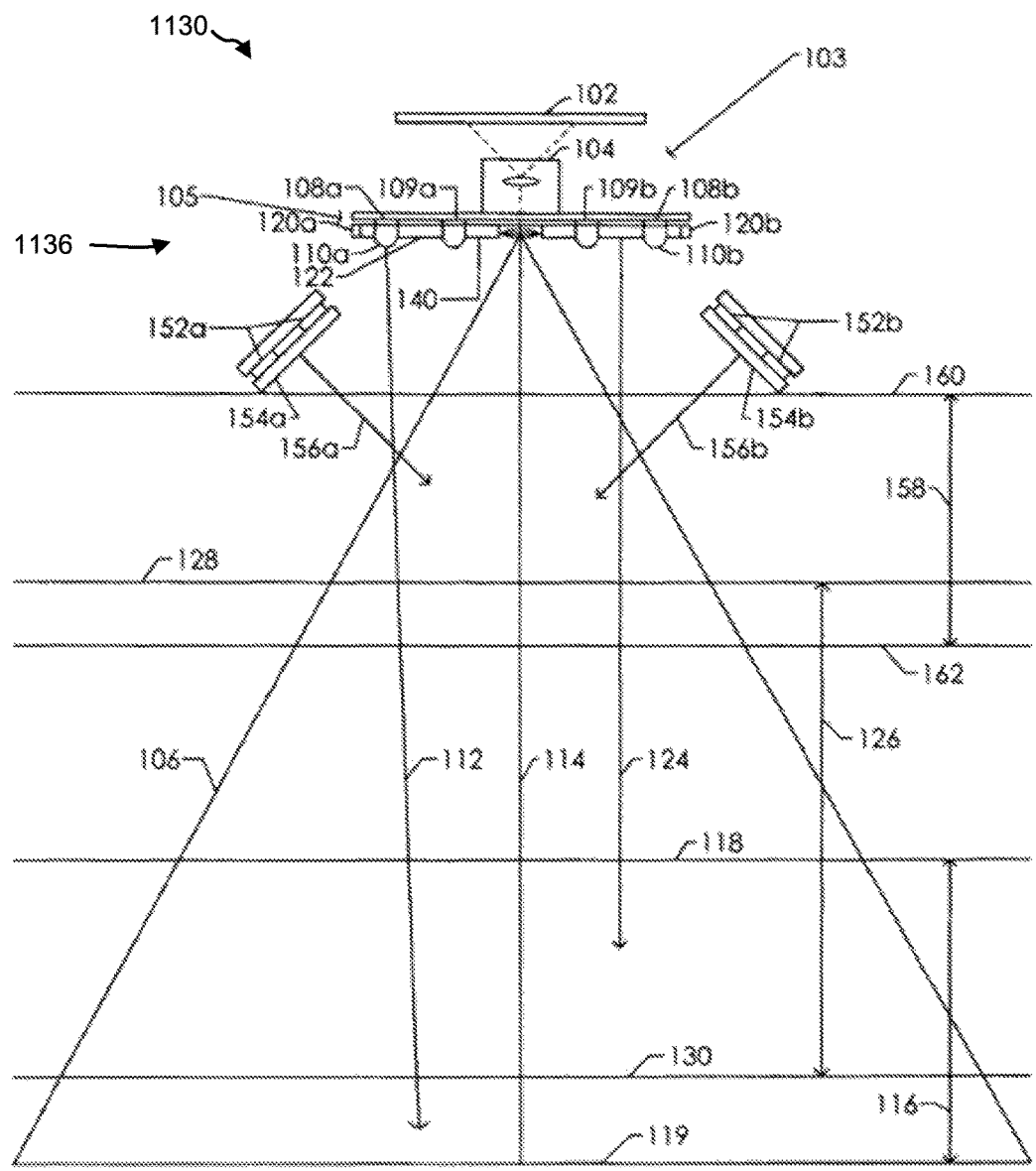
FIG. 22 is a top-down view of a barcode reader in accordance with one embodiment of the present disclosure.

The plurality of illumination sub-systems 1136a-c may include a direct bright field illumination system, for example, similar to the direct bright field illumination sub-system (e.g., the secondary light source 108) shown in FIG. 22, a diffuse bright field illumination sub-system, for example, similar to the diffuse bright field illumination sub-system 105 shown in FIG. 22, and a dark field illumination sub-system, for example, similar to the dark field illumination sub-system (e.g., the light source 152) shown in FIG. 22.

It should be noted that the number of illumination sub-systems 1136a-c shown in FIG. 18A and the characteristics of each illumination sub-system disclosed herein are provided only as an example. In an alternative configuration, a barcode reader may include more than three (or any number of) different illumination sub-systems, and the illumination sub-systems may provide illumination having different illumination characteristics (e.g., by changing the intensity, wavelength, angle, diffusion characteristics of the illumination, illumination profile characteristics or the like).

The I/O peripheral systems 1138 may include the trigger button 1108 which may be a switch. In addition, the barcode reader 1130 may have one or more output devices that convey information to a user. Such output devices may include the a speaker 1139, a vibration motor 1140, and/or one or more components that illuminate in a manner visible to a user, such as one or more LEDs 1141 which illuminate the good read indicator 1100 through a light pipe.

The I/O peripheral systems 18 may further include one or more communication interfaces 1142. The communication interfaces 1142 may include a wireless LAN interface 1142a and a point-to-point interface 1142b which may be a wireless point-to-point interface and/or a hardwired point-to-point interface coupled to the data portion of the power/data contacts 1112, 2512.

The wireless LAN interface 1142a may permit the barcode reader 1130 to be an addressable endpoint in a wireless local area network and communicate with a host device through the LAN using, for example, Transmission Control Protocol/Internet Protocol (TCP/IP) or the like.

The wireless point-to-point interface(s) 1142b may be, for example, a Bluetooth® interface to enable the barcode reader 1130 to establish a wireless point-to-point communication link with, and communicate over the wireless communication link with, a host device (i.e., a host computer).

The hardwired point-to-point interface(s) 1142b may comprise a Universal Asynchronous Receiver/Transmitter (UART) or a Universal Serial Bus (USB) in each case to enable the barcode reader 1130 to establish a point-to-point connection with a host device using a multi-conductor data interface through the data portion of the power/data contacts 1112, 2512.

The image capture control and decode system 1132 may include: i) a processor 1144; ii) a memory 1146; and iii) hardware circuits 1148 for coupling to, and driving operation of, each of the illumination system 1136, the I/O peripheral systems 1138, and the image sensor system package 1134.

The processor 1144, as described, may be a general purpose single or multi-die microprocessor (e.g., an ARM), a special purpose microprocessor (e.g., a digital signal processor (DSP)), a microcontroller, a programmable gate array, etc. The processor 1144 may be referred to as a central processing unit (CPU). Although just a single processor 1144 is shown in FIG. 18A, in an alternative configuration, a combination of processors (e.g., an ARM and DSP) may be used.

The hardware circuits 1148 provide the interface between the image capture control and decode system 1132 and each of the illumination system 1136, the I/O peripheral systems 1138, and the image sensor system package 1134. The hardware circuits 1148 may further include illumination logic 1150 and pre-processing circuits 1151a-n, each of which will be described in more detail herein.

The memory 1146, as described, may be any combination of non-volatile memory or storage and volatile memory or storage. The memory 1146 may include an image buffer 1157, an image processing module 1174, a decoder 1175, and an image capture module 1176. These components may be stored in any combination of volatile and non-volatile memory. Some modules may be stored in both volatile and non-volatile memory, for example, with permanent storage of the module in non-volatile memory and a temporary copy stored in volatile memory for execution by the processor 1144. In addition to, or as an alternative to, these modules, the memory 1146 may store any number of other modules including but not limited to those set forth in the patent applications incorporated by reference in this disclosure. A more detailed description of the image capture control and decode system 1132 is included herein.

The image sensor system package 1134 may include: i) a two-dimensional photo sensor array 1158 onto which illumination from the field of view of the barcode reader is focused by the optic system 1154; ii) hardware gate logic 1155 implementing one or more pre-processing circuits 1156a-n; iii) volatile memory or storage such as random access memory implementing an image buffer 1157; iv) hardware gate logic implementing wide bus logic 1198 for transferring each image frame captured by the photo sensor array 1158 to the hardware gate logic 1155 (or the image buffer 1157); and v) control circuitry 1159 which may include a combination of gate logic, volatile memory or storage, a processor executing code stored in the memory implementing control of the photo sensor array 1158 (image read-out), the wide bus logic 1198, the hardware gate logic 1155; the image buffer 1157, and transfer of image data records to the image capture control and decode system 1132.

The photo sensor array 1158 may comprise a two-dimensional rolling shutter array of pixels with each pixel comprising an active photosensitive region capable of measuring or quantifying the intensity of illumination incident on the pixel fabricated, for example, using known complementary metal oxide semiconductor (CMOS) sensor technology. Each pixel may be a photodiode which accumulates charge over the duration of an exposure period. Prior to commencement of the exposure period the photodiode may be coupled to ground to dissipate an accumulated charge and the exposure period for the pixel may commence when the photodiode is de-coupled from ground so that a charge accumulates in proportion to the intensity of illumination incident on the pixel. The charge on the photodiode continues to accumulate so long as illumination is incident on the photodiode. The exposure period ends when the accumulated charge is measured by an analog-to-digital (A/D) converter 1160.

In one embodiment, the photodiode may couple to the input of an A/D converter 1160 when the control circuitry 1159 generates a read signal and, upon coupling of the photodiode to the A/D converter 1160, the A/D converter 1160 generates a digital value representative of the accumulated charge at the time the photodiode is coupled to the A/D converter which is input to a register of the wide bus logic 1198 for transfer to the hardware gate logic 1155 (or the image buffer 1157).

In another embodiment, the photodiode may be coupled to the input of an A/D converter 1160 prior to the end of the exposure period. In this embodiment, the A/D converter 1160 may be continually making a digital value representative of the accumulating charge available at its output port with that digital value continually increasing as charge accumulates on the photodiode (i.e. periodically updating the digital value to represent the increasing voltage as charge accumulates on the photodiode). In this embodiment when the control circuitry 1159 generates a read signal the then current digital value (at the time of the read signal) is read or input to a register of the wide bus logic 1198 for transfer to the pre-processing circuits 1156a-n (or the image buffer 1157).

In order to improve sensitivity of the photo sensor array 1158, the pixels may not include a masked charge storage region associated with each photosensitive region for temporarily holding accumulated charge from the photodiode region prior to coupling the charge from the photodiode to the A/D converter 1160. Directly coupling the photosensitive region to the A/D converter 1160 means that there is no charge storage region separate from the photodiode on which charge is accumulating. Stated another way, in neither of the foregoing embodiments is the accumulated charge on the photodiode buffered, as an analog charge or otherwise, prior to being coupled to the A/D converter 1160. Stated in yet another way, in neither of the foregoing embodiments is accumulation of the charge stopped, or the accumulated charge otherwise made static (with no more accumulation) prior to being coupled to the A/D converter 1160.

More detail regarding the photo sensor array 1158 and its operation to capture frames of image data is described in more detail in U.S. patent application Ser. No. 14/717,112.

The term "image frame," as used herein, may be a full image frame, a binned image frame, a sub-sampled image frame, or a window of any of a full, binned, or sub-sampled image frame.

As used herein, the term "full image frame" refers to an image frame that is captured when an entire photo sensor array 1158 is exposed and read out. Thus, a full image frame may include pixels corresponding to all of the photo sensors in the photo sensor array 1158.

As used herein, the term "binned image frame" refers to an image frame that is captured by simultaneously combining the photodiodes for multiple adjacent pixels to a single A/C converter (effectively creating a single pixel with a larger photosensitive region comprising the photosensitive regions of the combined pixels, but an overall lower resolution for the image frame). Common binning may include combining groups of two adjacent pixels horizontally, groups of two adjacent pixels vertically, and two-by-two groups of pixels. The resolution values of the image capture parameter values for an image frame that is to be captured as a binned image frame will define the binning (how adjacent pixels are to be grouped).

As used herein the term "sub-sampled image frame" refers to an image frame that is captured at a lower resolution utilizing a pattern of fewer than all of the pixels applied across the full photo sensor, for example every second pixel or every fourth pixel. The used pixels are read out while the un-used pixels are not read out or the data is ignored. The resolution values of the image capture parameter values for an image frame that is to be captured as a sub-sampled image frame will define the sub-sampling ratio of pixels which are read and used versus un-used pixels.

As used herein the term "a window of an image frame" refers to a portion of a full image frame, a binned image frame or a sub-sampled image frame that is smaller than the full photo sensor array image, either by vertical cropping, horizontal cropping, or both. The portions of the pixels outside of the cropping may not be read-out. The image capture parameter values for an image frame that is to be captured as a windowed image frame (full, binned, or sub-sampled) will define the horizontal and vertical cropping, as applicable.

It should be appreciated that binning, subsampling, and windowing may be performed by the image sensor array 1158 at read-out such that the resulting image frame (full, binned, sub-sampled, and/or windowed) is the image frame input to the pre-processing circuits 1156a-n.

To enable digital values representative of illumination on pixels to be transferred very quickly from the A/D converters 1160 to the pre-processing circuits 1156a-n (or written directly to the image buffer 1157), the wide bus logic 1198 may transfer the digital intensity values from all A/D converters 1160 to the pre-processing circuits 1156a-n (or the image buffer 1157) in parallel (e.g. the same clocking cycles transfer all digital intensity values from all A/D converters 1160 to the pre-processing circuits 1156a-n (or the image buffer 1157) simultaneously).

Stated another way, the wide bus logic 1198 may include transfer logic modules, each implementing a channel for transfer of a digital intensity value from an A/D converter 1160 to the pre-processing circuits 1156a-n (or the image buffer 1157), with the quantity of transfer logic modules being equal to the quantity of A/D converters, and with each distinct transfer logic module being coupled to the output of one distinct A/D converter. Stated yet another way, the wide bus logic 1198 may implement a digital intensity value transfer bus (from the A/D converters 1160 to the pre-processing circuits 1156a-n (or the image buffer 1157)) that is as wide as the number of A/D converters 1160.

Alternatively, the width of the wide bus logic 1198 may be 50% of the number of A/D converters 1160, in which case it would take two bus cycles to transfer all digital intensity values from all A/D converters 1160 to the pre-processing circuits 1156a-n or to the image buffer 1157. Alternatively, the width of the wide bus logic 1198 may be 25% of the number of A/D converters 1160, in which case it would take four bus cycles to transfer all digital intensity values from all A/D converters 1160 to the pre-processing circuits 1156a-n or to the image buffer 1157. It should be noted that the width of the wide bus logic 1198 may be any percentage of the number of columns of the photo sensor array. However, if an entire row of pixels is to undergo a simultaneous exposure period utilizing a quantity of A/D converters equal to the number of pixels in the row, but the wide bus logic 1198 is not sufficient to transfer digital intensity values from all A/D converters 1160 simultaneously, the wide bus logic 1198 may include first-in-first-out (FIFO) buffers (one FIFO buffer for each A/D converter) for buffering digital intensity values prior to transfer to the pre-processing circuits 1156a-n or to the image buffer 1157.

The hardware gate logic 1155 includes multiple pre-processing circuits 1156a-n. The pre-processing circuits 1156a-n may perform operations such as convolution, binning, sub-sampling, cropping and other image processing functions on an image frame (full, binned, sub-sampled, and/or cropped) to generate one or more image data record 1161a-n, each of which is derived from the image frame or an image data record that was previously derived from the image frame.

Each pre-processing circuit 1156a-n may receive as input either: i) an image frame (full, binned, sub-sampled, and/or cropped) received directly from the photo sensor array 1158 by way of the wide bus logic 1198; or ii) an image data record 1161a-n from the image buffer 1157 which is the result of a different pre-processing circuit 1156a-n previously operating on an image frame (full, binned, sub-sampled, and/or cropped) received directly from the photo sensor array 1158 by way of the wide bus logic 1198.

It should be noted that one image frame (full, binned, sub-sampled, and/or cropped) may be input to multiple pre-processing circuits 1156a-n resulting in multiple image data records 1161a-n being written to the image buffer 1157 for the same frame of image data. Further, for a burst of multiple image frames (described herein), each image frame (full, binned, sub-sampled, and/or cropped) may be input to the same one or more pre-processing circuits 1156a-n or permutations of different image frames of the burst may be input to different subsets of pre-processing circuits 1156a-n, each subset including one or more pre-processing circuits 1156a-n.

It should also be noted that one of the pre-processing circuits 1156 may simply write the image frame (full, binned, sub-sampled, and/or cropped) to the image buffer 1157 as an image data record 1161 without performing substantive image processing (e.g. writing the intensity values received from the A/D converters 1160 for the image frame to the image buffer 1157).

Image processing functions that may be performed by any of the image pre-processing circuits 1156a-n and the image data records 1161a-n derived from each image frame (whether full, binned, sub-sampled, and/or windowed and/or cropped) include: i) transfer of the image frame or a window within an image frame (full, binned, cropped, or sub-sampled) as a resulting image data record 1161a-n to the image buffer 1157; ii) cropping of an image frame (full, binned, cropped, or sub-sampled) and transfer of the resulting image data record 1161a-n to the image buffer 1157; iii) binning an image frame (full, binned, cropped, or sub-sampled) and transfer of the resulting image data record 1161a-n to the image buffer 1157; iv) subsampling an image frame (full, binned, cropped, or sub-sampled) and transfer of the resulting image data record 1161a-n to the image buffer 1157; v) generating a rotation of an image frame (full, binned, cropped, or sub-sampled) and transfer of the resulting image data record 1161a-n to the image buffer 1157; vi) generating a convolution of an image frame (full, binned, cropped, or sub-sampled) and transfer of the resulting image data record 1161a-n to the image buffer 1157; and vii) generating a double convolution which is a second sequential convolution performed on the result of a previously performed convolution of an image frame (full, binned, cropped, or sub-sampled) and transfer of the resulting image data record 1161a-n to the image buffer 1157. Each sequential convolution utilizes a different distinct kernel. Each of these image processing operations is described in more detail herein.

The pre-processing circuits 1156a-n may be implemented in hardware gate logic 1155 to provide for image processing very quickly such that processing by a pre-processing circuit 1156a-n, and thereby generating and storing in the image buffer 1157 one or more image data records 1161a-n may be performed during a limited amount of time that the image frame is being read from the photo sensor array 1158 such that raw pixel data (i.e., digital intensity values from the A/D converters 1160 coupled to the image sensor array 1158) do not need to be stored in memory (other than simple FIFO buffers) prior to being processed by the pre-processing circuits 1156a-n.

The control circuitry 1159 may be any combination of hardware gate logic and/or a processor executing a code stored in a volatile or non-volatile memory. The control circuitry 1159 interfaces with the image capture control and decode system 1132, the pre-processing circuits 1156a-n, and the photo sensor array 1158.

In operation the control circuitry 1159 may receive, from the image capture control and decode system 1132 via a bus 1162, image capture parameter values for a burst of one or more image frames (full, binned, sub-sampled, and/or cropped) to be sequentially captured. As will be described in more detail herein, the image capture parameter values define, for the burst of one or more image frames to be captured by the photo sensor, a quantity of image frames to be sequentially captured (the burst of images) and, for each image within the burst: i) whether a full image frame, binned image frame, sub-sampled image frame, or a window of a full, binned, or sub-sampled image frame is to be captured; ii) the binning or subsampling resolution (vertically and horizontally) and/or window cropping, if applicable; iii) an exposure setting; iv) a gain setting; and v) an indication of a permutation of one or more pre-processing functions to apply to the image frame (full, binned, sub-sampled and/or windowed), including pre-processing functions that are to be applied to an image data record resulting from a previous pre-processing function being applied to the image frame (full, binned, sub-sampled, and/or windowed).

In further operation, after receiving the image capture parameter values, the control circuitry 1159 may, for each image frame to be captured, set image capture settings to the image capture parameter values for the image frame and, in response to a trigger signal from the image sensor system package 1134, drive the photo sensor array 1158 to sequentially capture each of one or more image frames of the burst in accordance with the image capture settings and without further trigger signal(s) from the image capture control and decode system 1132.

In more detail, the control circuitry 1159 adjusts the image capture settings between the exposure periods for each sequentially captured image frame such that each captured image frame within the burst of image frames is captured with image capture settings specifically defined for that image frame by the image capture control and decode system 1132. At least one of the multiple frames of image data may be captured with a distinct value of at least one image capture parameter.

Each captured image frame (full, binned, sub-sampled, and/or windowed) may, under control of the control circuitry 1159, be input to selected one or more pre-processing circuits 1156a-n in accordance with the image capture parameter values for purposes of performing the pre-processing functions previously described. Resulting image data records 1161a-n are written to the image buffer 1157.

Further, the control circuitry 1159 may, for selected image data records 1161a-n in the buffer memory 1152, drive selected other pre-processing circuits 1156a-n to receive the selected image data record 1161a-n and generate, and write to the image buffer 1157, an image data record 1161a-n which is derived therefrom.

Further yet, the control circuitry 1159 may, as requested by the image capture control and decode system 1132, provide certain image data records 1161a-n (or portions of certain image data records 11617a-n) to the image capture control and decode system 1132 for further processing and decoding.

In one embodiment, the image capture module 1176 of the image capture control and decode system 1132, when executed by the processor 1144 in conjunction with the hardware circuits 1148, controls image capture by: i) defining (or receiving from the decoder 1175) image capture parameter values for a burst of one or more image frames to be sequentially captured by the photo sensor array 1158 of the image sensor system package 1134 and the image processing to be performed on each image frame; ii) initiating the capture of the sequence of one or more image frames by the photo sensor array 1158 and the corresponding performance of the image processing thereon by the pre-processing circuits 1156a-n to generate image data records 1161a-n, each of which is a derivative of an image frame within the sequence of one or more image frames; and iii) controlling the illumination systems 1136a-c to illuminate the barcode within the field of view during capture of each frame of the sequence of one or more image frames. The image capture module 1176 may further define, or receive from the decoder an indication of, which of the image data records, or portions of the image data records, are to be provided to the decoder 1175 for decoding of the barcode.

As described, the image capture parameter values may define a quantity of image frames to be sequentially captured (the burst of images) and, for each image within the burst: i) whether a full image frame, binned image frame, sub-sampled image frame, or a window of a full, binned, or subsampled image frame is to be captured; ii) the binning or subsampling resolution (vertically and horizontally) and/or the windowing cropping for the image frame to be captured if applicable; iii) an exposure setting; iv) a gain setting, v) an indication of a permutation of one or more previously described pre-processing functions to apply to the image frame (full, binned, sub-sampled, and/or cropped) by the image pre-processing circuits 1156a-n within hardware circuits 1148 of the image sensor system package 1134, including pre-processing functions that are to be applied to an image data records 1161a-n resulting from a previous pre-processing function being applied to the image frame (full, binned, sub-sampled and/or cropped).

The exposure period may be the duration of time each pixel is exposed (i.e., the duration of time between the beginning of the exposure period and the end of the exposure period).

The gain setting may be a gain value implemented for ensuring that the pixel intensity values (or binned pixel intensity values) utilize the dynamic range of the A/D converters 1160.

Initiating the capture of the sequence of one or more image frames of a barcode within a field of view of the photo sensor array 1158 may include providing a single trigger signal to the control circuitry 1159 of the image sensor system package 1134 to initiate the capture of the sequence of one or more image frames. Such a single trigger signal may be provided after the image capture parameter values defining the sequence of image frames to be captured and pre-processing to be performed by pre-processing circuits 1156a-n within the image sensor system package 1134 have been provided to the control circuitry 1159 such that the control circuitry 1159 may autonomously capture the sequence of image frames and drive the pre-processing circuits 1156a-n to perform the applicable pre-processing in accordance with the image capture parameter values without further control having to be provided by the image capture control and decode system 1132.

Controlling the illumination systems 1136a-c to illuminate the barcode within the field of view during capture of each frame of the sequence of one or more image frames may comprise controlling illumination logic 1150 within hardware circuits 1148.

In more detail, the illumination sub-systems 1136a-c are coupled to the hardware circuits 1148 which providing power required for the light-emitting diodes (LEDs) or other illumination sources to generate illumination under control of illumination logic 1150. More specifically, for each image frame to be captured by the photo sensor array 1158, the image capture module 1176 provides illumination parameters to the illumination logic 1150 which control the illumination settings to be used for capture of the image frame. More specifically, the illumination parameters may define such illumination settings as: i) identifying which of at least one of the illumination sub-systems 1136*a-c* are to be activated for the exposure period in which the image frame is captured; and ii) the intensity of illumination to be generated by each of the illumination sub-systems 1136*a-c* that are to be activated. In certain exemplary embodiments the intensity may be defined as: i) a percentage from zero percent (0%) to one hundred percent (100%) representing the percent of a maximum illumination intensity that can be generated by the LEDs (or other illumination sources) of illumination sub-system; ii) pulse-width-modulation (PWM) parameters representing the percentage of time during the exposure period that maximum operating power is applied to the LEDs (or other illumination sources) of the illumination sub-system in a pulsing pattern; and iii) a percentage greater than one hundred percent (100%) representing a power level to be applied to the LEDs of an illumination sub-system if the LEDs are to be over-driven.

In certain embodiments, the illumination parameters may be provided to the illumination logic 1150 for one or more image frames within a burst of image frames to be captured by the photo sensor array 1158 by the image capture module 1176 writing the illumination parameters for each frame to a distinct register within the illumination logic 1150.

During capture of each image frame of one or more image frames within a burst of image frames, the illumination logic 1150 sets the illumination settings for the image frame to conform to the illumination parameters for the image frame by configuring power circuits of the hardware circuits 1148 to apply the applicable power to the applicable illumination sub-systems.

In one embodiment, the illumination logic is coupled to a flash signal 1163 generated by the control circuitry 1159 of the image sensor system package 1134. The flash signal 1163 is configured to generate a signal indicating a start of each exposure period and an end of each exposure period, for each image frame captured by the image sensor 1158 within a burst of one or more image frames. In this embodiment the illumination logic may, for each image frame: i) set the illumination settings for the image frame to conform to the illumination parameters for the image frame by configuring power circuits of the hardware circuits 1148 to apply the applicable power to the applicable illumination sub-systems; ii) apply the applicable power to the applicable illumination sub-system 1136*a-c* when the flash signal 1163 indicates start of the exposure period for the image frame; iii) deactivate the power to the illumination sub-systems 1136*a-c* when the flash signal 1163 indicates the end of the exposure period; and iv) repeat steps i-iii for the next image frame within the sequence utilizing the illumination parameters for that next image frame within the sequence. The illumination parameters may be considered image capture parameter values in addition to those image capture parameter values previously described.

The decoder 1175, when executed by the processor 1144, may: i) determine which of the one or more image data records 1161*a-n* (or windows within one or more image data records 1161*a-n*) may be transferred from the image buffer 1157 to the image capture control and decode system 1132; ii) determine a permutation of one or more pre-processing functions (performed by pre-processing circuits 1151*a-n*) to apply to each of the one of the image data records 1161*a-n* (or windows within one or more image data records 1161*a-n*) to generate, and write to the buffer memory 1152, image data records 1153*a-n* (each of which is also a derivative of the one or more image frames (whether full, binned, or sub-sampled) captured by the photo sensor array 1158; iii) determine a permutation of one or more pre-processing functions (performed by the image processing module 1174 when such code is executed by the processor 1144) to apply to each of the one of the image data records 1153*a-n* (or windows within one or more image data records 1153*a-n*) to generate, and write to the buffer memory 1152 additional (or replacement) image data records 1153*a-n* (each of which is also a derivative of the one or more image frames (full, binned, sub-sampled, and/or cropped) captured by the photo sensor array 1158; and iv) decode the barcode present within the field of view of the barcode reader and imaged within the one or more image frames (whether full, binned, or sub-sampled) captured by the photo sensor array 1158 and represented by at least a portion of one of the image data records 1153*a-n* derived from such an image frame.

Figure 18B:
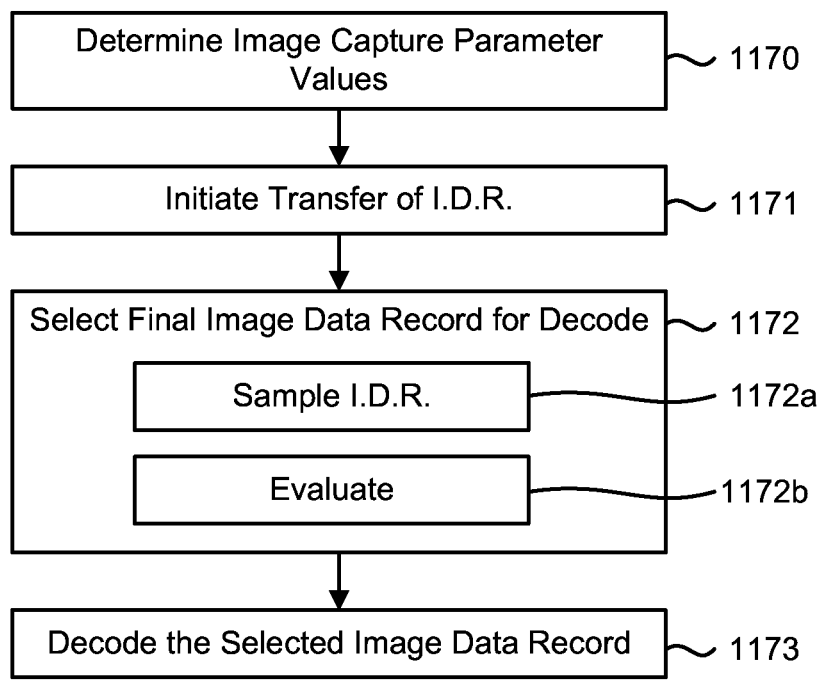
FIG. 18B depicts exemplary operation of the decoder in accordance with one embodiment.

Referring to FIG. 18B, exemplary operation of the decoder 1175 is depicted in accordance with one embodiment. Step 1170 represents the decoder 1175 and/or the image capture module 1176 determining the image capture parameter values for a burst of one or more image frames as previously described.

Step 1171 represents transferring one or more image data records 1161*a-n* (or portions of one or more image data records 1161*a-n*) from the image buffer 1157 to the image capture control and decode system 1132 and establishing which, if any, pre-processing functions are to be performed by image pre-processing circuits 1151*a-n* and/or the image processing module 1174.

Step 1172 represents selecting a final image data record 1153 for decoding, which may include sampling final image data records 1153*a-n* at step 1172*a* and evaluating the sample image data records 1153*a-n* at step 1172*b*.

Step 1173 represents decoding the selected image data record 1153. This operation may include, based on the resulting image data records 1153*a-n* meeting or failing to meet certain criteria: i) driving image pre-processing circuits 1151*a-n* or the processing module 1174 to perform additional image processing operations, as previously described on one or more of the image data records 1153*a-n* within the buffer memory 1152 (or on a window of, a binning of, or a sub-sampling of each of one or more image data records 1153*a-n*) and write resulting additional, or replacement, image data records 1153*a-n* to the buffer memory 1152; ii) driving the transfer of one or more additional image data records 1161*a-n* (full, windowed, binned, or sub-sampled) to the image capture control and decode system 1132 (without obtaining an additional burst of one or more image frames) and, optionally driving performance of additional pre-processing operations on the additional image data records 1161*a-n* by the pre-processing circuits 1151*a-n* or the image processing module 1174; and/or iii) driving capture of one or more additional bursts of image frames (whether full, windowed, binned or sub-sampled), resulting in one or more additional image data records 1161*a-n* being written to the image buffer 1157, and then driving transfer of one or more of the additional image data records 1161*a-n* (full, windowed, binned or sub-sampled), but not necessarily all of the additional image data records 1161*a-n* in the image buffer 1157, to the image capture control and decode system 1132 and, optionally driving performance of additional pre-processing operations on the additional image data records 1161*a-n* by the pre-processing circuits 1151*a-n* or the image processing module 1174. This aspect of the operation may be repeated until at least one of the image data records 1153*a-n* is decodable by the processor 1144 operating the decoder 1175.

The pre-processing circuits 1151*a-n*, similar to pre-processing circuits 1156*a-n*, may be implemented within hardware circuits 1148. The pre-processing circuits 1151*a-n* may perform operations such as convolution, binning, sub-sampling and other image processing functions on image data records 1161*a-n* (each of which is provided by the image sensor system package 1134 via the bus 1162 and each of which is, or is a derivative of, an image frame (full, binned, sub-sampled, and/or cropped) captured by the photo sensor array 1158) to generate, and write to the buffer memory 1152, one or more image data record 1153*a-n*.

Each pre-processing circuit 1151*a-n* may receive as input either: i) an image data record 1161*a-n* (or a window of, a binning of, or a sub-sampling of, an image data record 1161*a-n*) directly from the image sensor system package 1134 by way of the bus 1162; or ii) an image data record 1153*a-n* from the buffer memory 1152 which is the result of a different pre-processing circuit 1151*a-n* previously operating on an image data record 1161*a-n* (or a window of, a binning of, or a sub-sampling of, an image data record 1161*a-n*) received from the image sensor system package 1134 by way of the bus 1162.

It should be noted that one image data record 1161*a-n* (or a window of, a binning of, or a sub-sampling of, an image data record 1161*a-n*) may be input to multiple pre-processing circuits 1151*a-n*, resulting in multiple image data records 1153*a-n* being written to the buffer memory 1152 for the same image data record 1161*a-n* (or a window of, a binning of, or a sub-sampling of, an image data record 1161*a-n*).

Further, for a burst of multiple image frames the image data record 1161*a-n* (or a window of, a binning of, or a sub-sampling of, an image data record 1161*a-n*) received and processed by the pre-processing circuits 1151*a-n* may represent different image frames within the burst captured by the photo sensor array 1158. The image data records 1161*a-n* (or a window of, a binning of, or a sub-sampling of, an image data record 1161*a-n*) received and processed by the pre-processing circuits 1151*a-n* may be the result of applying the same pre-processing functions by pre-processing circuits 1156*a-n* to each of multiple image frames within the burst.

Each image data record 1161*a-n* (or a window of, a binning of, or a sub-sampling of, an image data record 1161*a-n*) received may be input to the same one or more pre-processing circuits 1151*a-n* or may be input to different subsets of pre-processing circuits 1151*a-n*, each subset including one or more pre-processing circuits 1151*a-n*.

It should also be noted that one of the pre-processing circuits 1151*a-n* may simply write the image data record 1161*a-n* (which may be an image frame captured by the image sensor array 1158 (full, binned, sub-sampled, and/or cropped) without previous processing by pre-processing circuits 1156*a-n*) to the buffer memory 1152 without performing substantive image processing.

Again, operations performed by, and derivatives of the frame of image data produced by, the pre-processing circuits 1151*a-n* may include: i) transfer of the image data record 1161*a-n* (or a window, binning, or sub-sampling of the image data record 1161*a-n*) to the buffer memory 1152 as an image data record 1153*a-n* without substantive processing; ii) binning of an image data record 1161*a-n* (or a window or sub-sampling of the image data record 1161*a-n*) and writing the result to the buffer memory 1152 as an image data record 1153*a-n*; iii) subsampling of an image data record 1161*a-n* (or a window, binning, or sub-sampling of the image data record 1161*a-n*) and writing the result to the buffer memory 1152 as an image data record 1153*a-n*; iv) generating a rotation of an image data record 1161*a-n* (or a window of, a binning of, or sub-sampling of the image data record 1161*a-n*) and writing the result to the buffer memory 1152 as an image data record 1153*a-n*; v) generating a convolution of an image data record 1161*a-n* (or a window or sub-sampling of the image data record 1161*a-n*) and writing the result to the buffer memory 1152 as an image data record 1153*a-n*; and vi); generating a double convolution, which is a second sequential convolution performed on the result of a previously performed convolution, of an image data record 1161*a-n* (or a window or sub-sampling of the image data record 1161*a-n*) and writing the result to the buffer memory 1152 as an image data record 1153*a-n*. Each sequential convolution utilizes a different distinct kernel.

The pre-processing circuits 1151*a-n* may be implemented in hardware circuits 1148 to provide for image processing very quickly such that processing by a pre-processing circuit 1151*a-n*, and thereby generating and storing in the buffer memory 1152 one or more image data records 1153*a-n*, may be performed during the limited amount of time that the image data records 1161*a-n* are being transferred to the image capture control and decode system 1132 via the bus 1162 without requiring storage of the transferred image data records 1161*a-n* in memory prior to pre-processing by pre-processing circuits 1151*a-n*.

The image processing module 1174, when executed by the processor 1144 may perform similar pre-processing functions as performed by the pre-processing circuits 1156*a-n* and pre-processing circuits 1151*a-n*.

In more detail, the image processing module 1174 may perform operations such as convolution, binning, sub-sampling and other image processing functions on image data records 1153*a-n* (each of which is has been previously written to the buffer memory 1152 and each of which is, or is a derivative of, an image frame (full, binned, sub-sampled, and/or cropped) captured by the photo sensor array 1158) to generate, and write to the buffer memory 1152, one or more additional, or replacement, image data record 1153*a-n*.

The image processing module 1174 may receive as input an image data record 1153*a-n* (or a window of, a binning of, or a sub-sampling of, an image data record 1153*a-n*) from the buffer memory 1152.

It should be noted that one image data record 1153*a-n* (or a window of, a binning of, or a sub-sampling of, an image data record 1153*a-n*) may be input to multiple pre-processing functions of the image processing module 1174 resulting in multiple additional, or replacement, image data records 1153*a-n* being written to the buffer memory 1152 for the same image data record 1153*a-n* (or a window of, a binning of, or a sub-sampling of, an image data record 1153*a-n*).

Further, for a burst of multiple image frames, the image data record 1153*a-n* (or a window of, a binning of, or a sub-sampling of, an image data record 1153*a-n*) received and processed by the image processing module 1174 may represent different image frames within the burst captured by the photo sensor array 1158. The image data records 1153*a-n* (or a window of, a binning of, or a sub-sampling of, an image data record 1153*a-n*) received and processed by the image processing module 1174 may be the result of applying the same pre-processing functions to each of multiple image frames within the burst.

Each image data record 1153a-n (or a window of, a binning of, or a sub-sampling of, an image data record 1153a-n) may be input to the same one or more pre-processing functions of the image processing module 1174 or may be input to different subsets of pre-processing functions of image processing module 1174, each subset including one or more pre-processing functions.

Again, operations performed by, and derivatives of the frame of image data produced by, the image processing module 1174 may include: i) binning of an image data record 1153a-n (or a window or sub-sampling of the image data record 1153a-n) and writing the result to the buffer memory 1152 as an additional, or replacement, image data record 1153a-n; ii) subsampling of an image data record 1153a-n (or a window, binning, or sub-sampling of the image data record 1153a-n) and writing the result to the buffer memory 1152 as an additional, or replacement, image data record 1153a-n; iii) generating a rotation of an image data record 1153a-n (or a window of, a binning of, or sub-sampling of the image data record 1153a-n) and writing the result to the buffer memory 1152 as an additional, or replacement, image data record 1153a-n; iv) generating a convolution of an image data record 1153a-n (or a window or sub-sampling of the image data record 1153a-n) and writing the result to the buffer memory 1152 as an additional, or replacement, image data record 1153a-n; and v); generating a double convolution, which is a second sequential convolution performed on the result of a previously performed convolution, of an image data record 1153a-n (or a window or sub-sampling of the image data record 1153a-n) and writing the result to the buffer memory 1152 as an additional, or replacement, image data record 1153a-n. Again, each sequential convolution utilizes a different distinct kernel.

Further, as previously discussed, the decoder may additionally, prior to the capture of the burst one or more image frames by the photo sensor array 1158, based on analysis of image data records 1153a-n derived from one or more previous bursts of one or more image frames (full, binned, sub-sampled, and/or cropped) define any permutation of, or all of, the image capture parameter values previously discussed for the burst (or next burst) of one or more image frames.

Again, such image capture parameter values define a quantity of image frames to be sequentially captured (the burst of images) and, for each image within the burst: i) whether a full image frame, binned image frame, or sub-sampled image frame is to be captured; ii) the binning or subsampling resolution (vertically and horizontally) for the image frame to be captured if applicable; iii) an exposure setting; iv) a gain setting; and v) an indication of a permutation of one or more pre-processing functions to apply to the image frame (full, binned, or sub-sampled), including pre-processing functions that are to be applied to an image data record resulting from a previous pre-processing function being applied to the image frame (whether full, binned, or sub-sampled).

The image capture parameter values may be provided directly by the decoder 1175 to the control circuitry 1159 of the image sensor system package 1134 via the bus 1162 or may be provided to the image capture module 1176 which in turn provides the image capture parameter values to the control circuitry 1159 of the image sensor system package 1134 via the bus 1162.

As discussed, the image sensor system package 1134 and the image capture control and decode system 1132 may be included in two separate packages communicating over the interface 1162.

Figure 18C:
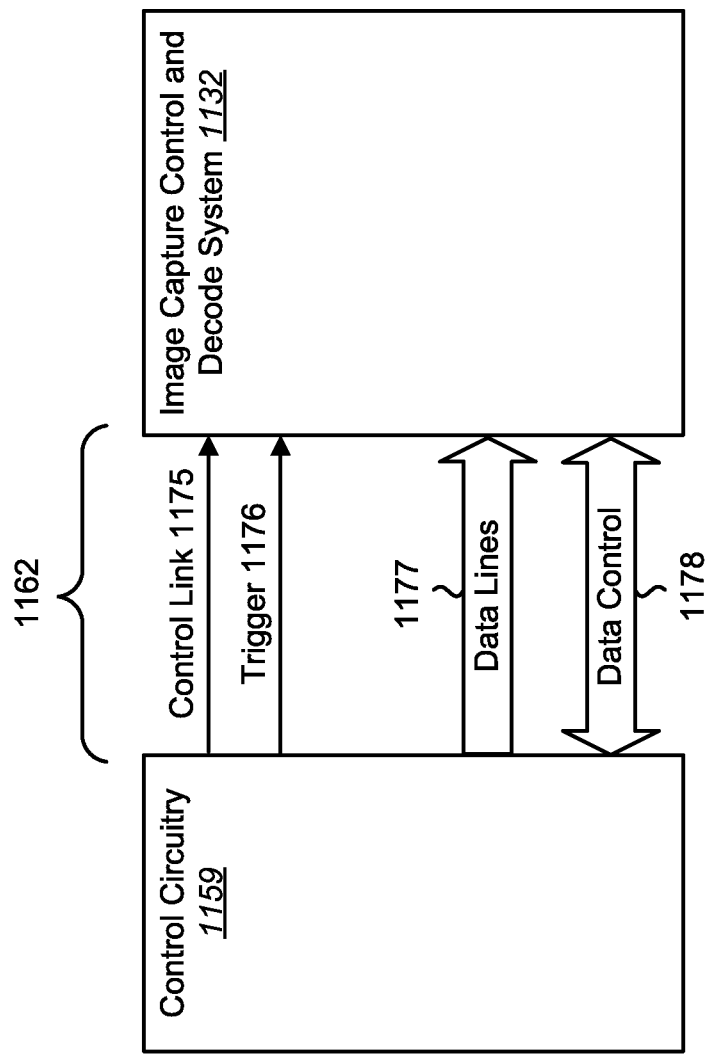
FIG. 18C shows the interface between the image sensor system package and the image capture control and decode system.

FIG. 18C shows the interface 1162 between the image sensor system package 1134 and the image capture control and decode system 1132. The interface 1162 may comprise a control link 1175 that may be a two-way serial control channel enabling the image capture control and decode system 1132 to: i) set parameters (e.g., the quantity of images to be captured in a burst, exposure period for each frame, gain setting for each frame, resolution setting for each frame, or the like); ii) select which image pre-processing circuits 1156a-n are to be applied to each captured frame, thereby determining the characteristics of the image data records 1161a-n written to the image buffer 1157; and iii) select image data records 1161 for transfer to the image capture control and decode system 1132.

The interface 1162 may further include a trigger signal 1176 controlled by the image capture control and decode system 1132 to initiate autonomous capture of a burst of one or more image frames and subsequent image pre-processing and writing of image data records 1161a-n to the image buffer 11573.

The interface 1162 may further include a flash signal 1163 which is output by the image sensor system package 1134 to signal the start of each exposure period and the end of each exposure period. The image capture control and decode system 1132 may control the illumination system 1136 based on the flash signal 1163. More particularly, the image capture control and decode system 1132 may activate the selected illumination system(s) 1136a-n at the selected intensities during the exposure of each applicable frame based on the flash signal 1163 indicating start of the exposure period. The illumination system 1136 may be configured to deactivate the exposure illumination when the flash signal 1163 indicates end of the exposure period activate the targeting illumination during the time period between exposure periods of sequential frames.

The interface 1162 may further include data lines 1177 that may be parallel or serial and that provide for the transfer of image data records 1161 from the image sensor system package 1134 to the image capture control and decode system 1132.

The interface 1162 may further include data control signals 1178 which may be signals to indicate the time each pixel value is valid on a data line, and indicate location of the pixel within the image array represented by the image data records (e.g., horizontal blanking, vertical blanking).

It should be appreciated that the barcode image is captured, processed, and stored in the first package (i.e., the image sensor system package 1134) at a much faster speed and may then be transferred to the second package (the image capture control and decode system 1132) for decoding at a slower speed. The image buffer 1157 may be large enough to hold an entire frame of image data (in combination with image data records 1161a-n derived from the frame of image data), and the entire frame of image data and/or combinations of one or more image data records 1161a-n may be read-out of the image buffer 1157 after the entire frame of image data is put into the image buffer 1157.

In one embodiment, instead of transferring all frames of image data captured in a burst, a subset of the multiple frames of image data generated in a burst may be transferred to the image capture control and decode system 1132 at a speed commensurate with transfer by the interface 1162 at the second or slower speed.

Figure 18D:
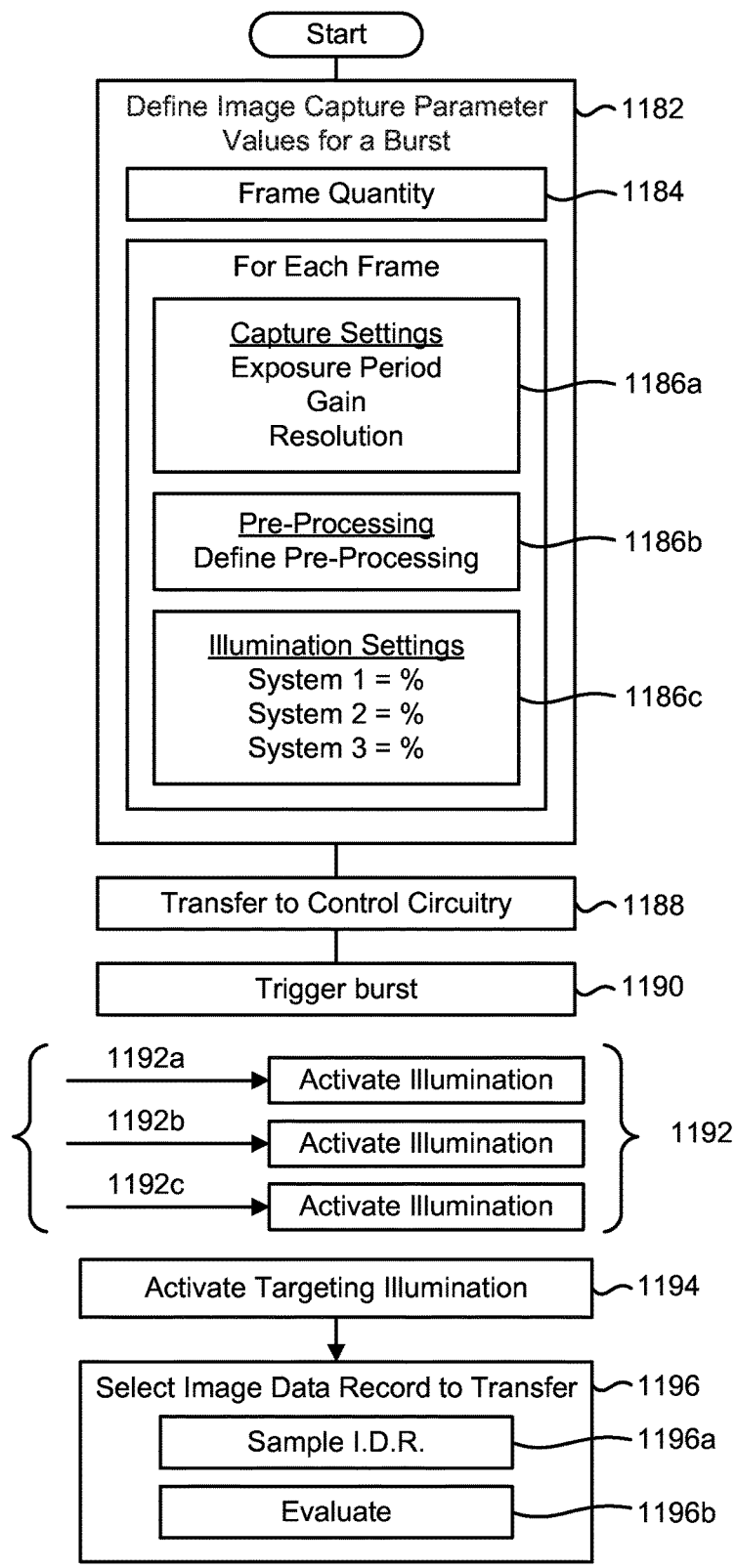
FIG. 18D represents an exemplary operation of certain components of the barcode reader in accordance with one embodiment of the present disclosure.

Referring to FIG. 18D in conjunction with FIGS. 18A-18C, an exemplary operation of certain components of the barcode reader 1130 are represented in accordance with an embodiment of the present invention.

Step 1182 represents defining image capture parameter values for a burst of image frames to capture. In more detail, defining the image capture parameter values may comprise the image capture module 1176 or the decoder 1175 defining the quantity of image frames to capture (full, binned, subsampled, and/or windowed) in sequence at sub-step 1184 and for each frame in the sequence, defining: i) image capture parameter values for the image frame such as the exposure period, gain settings, and/or resolution settings (if capturing a binned or sub-sampled image frame) at sub-step 1186*a*; ii) the image processing functions to which the image frame will be subject by pre-processing circuits 1156*a-n* for purposes of defining the image data records 1161*a-n* to be written to the image buffer 1157 at sub-step 1186*b*; and/or iii) the illumination settings for the image frame at sub-step 1186*c*.

The illumination settings may be defined as a combination of: i) identifying which illumination sub-systems 1136*a-c* are to be used for capturing the image frame, and ii) for each illumination sub-system 1136*a-c*, the percentage of full intensity at which the illumination is to be activated.

More specifically, the status of each illumination subsystem 1136*a*, 1136*b*, 1136*c* (i.e., active or non-active and, if active, the intensity level) may be different for each image frame captured. For example, when two sequential frames are captured, the first frame may be captured with illumination sub-system 1136*a* active while the second frame may be captured with illumination sub-system 1136*b* active.

Further, the selection of image capture parameter values, including the non-active and active illumination sub-systems 1136*a*, 1136*b*, 1136*c* for capturing images, may be based on characteristics of the image data records 1161*a-n* in the image buffer 1157 or image data records 1153*a-n* in the buffer memory 1152 from previously captured image frames.

Step 1188 represents: i) transferring the image capture parameter values for the image capture burst to the control circuitry 1159 of the image sensor system package 1134 utilizing the bi-directional data control link 1178 of the interface 1162; and ii) configuring the illumination logic to drive the applicable illumination sub-system 1136*a-c* in accordance with the illumination parameters during an exposure time for capture of each image frame. It should be appreciated that image capture parameter values transferred to the control circuitry 1159 do not need to include parameter values related to illumination when illumination is controlled by the hardware gate logic 1155 within the image sensor system package 1134. However, in an embodiment wherein the illumination logic 1150 controlling illumination sub-systems 1136*a-n* is within the image sensor system package 1134 (not shown on FIG. 18A) then the illumination parameter values would be transferred to the control circuitry 1159.

Step 1190 represents driving the single trigger signal to the control circuitry 1159 to initiate capture of the burst of one or more image frames, and subsequent image preprocessing and writing of image data records 1161*a-n* to the image buffer 1157 which, as discussed may be without further control by the image sensor system package 1134.

Step 1192 represents the illumination logic 1150 receiving from the control circuitry 1159 of the image sensor system package 1134, for each image frame of the burst, a flash signal 1192*a-c* indicative of the exposure period commencement and termination for the image frame and activating the illumination system 1136 in accordance with the illumination settings applicable to that image frame as defined at step 1186*c*.

Step 1194 represents activating targeting illumination after capturing the burst of image frames for purposes of projecting a targeting pattern of illumination into the field of view to assist the operator of the barcode reader in maintaining the desired barcode within the field of view of the barcode reader in case an additional burst of one or more image frames is required. After the barcode within the field of view 106 has been decoded the targeting illumination may be deactivated.

Step 1196 represents selecting which image data records 1161*a-n* (or selected portions or windows within each image data record 1161*a-n*) are to be transferred from the image buffer 1157 to the image capture control and decode system 1132. More specifically, the decoder 1175 or the image capture module 1176 may obtain portions (e.g., samples) of one or more image data records 1161*a-n* at sub-step 1196*a* and evaluate each for the quality of the image of the barcode within the image data record at sub-step 1196*b* to select one or more image data records 1161*a-n*, but fewer than all image data records 1161*a-n*, to transfer from the image buffer 1157 to the image capture control and decode system 1132 for decoding.

The image data records 1161*a-n* being transferred may have the best quality image of the barcode or other characteristics of the image of the barcode which are likely to result in a decodable barcode image. For example, the quality of an image of a barcode may be measured in terms of the contrast between light cells and dark cells within the barcode. A barcode image having relatively high contrast between dark cells and light cells may be considered to have higher quality than a barcode image having relatively low contrast between dark cells and light cells.

The superior contrast profile may mean at least one of: (i) greater maximum amplitude between the portions of the image within the subset that are dark marks of the barcode and the portions of the image within the subset that are light marks of the barcode; and (ii) more distinct transitions between portions of the image within the subset that are dark marks of the barcode and the portions of the image within the subset that are light marks of the barcode.

The terms "dark cells" and "light cells" are used herein because barcodes have traditionally been printed with ink. This gives barcodes the appearance of having dark cells (the portion that is printed with ink) and light cells (the unprinted substrate background, typically white). However, with direct part mark technology, ink is not always used and other techniques (e.g., laser/chemical etching and/or dot peening) may be used instead. Such techniques may be utilized to create a barcode by causing different portions of a substrate to have different reflective characteristics. When these different portions of the substrate are imaged, the resulting barcode image may have the appearance of including dark cells and light cells. Therefore, as used herein, the terms "dark cells" and "light cells" should be interpreted as applying to barcodes that are printed with ink as well as barcodes that are created using other technologies.

The contrast between the dark cells and the light cells in a barcode may be a function of illumination. Ideally, it is desirable to provide illumination that is consistent across the barcode and of intensity such that the exposure of the image yields both dark cells and light cells that are within the dynamic range of the photo sensor array 1158. This yields better contrast than any of the following: (i) a dimly lit barcode; (ii) a brightly lit barcode wherein the image is washed out beyond the dynamic range of the photo sensor array 1158; (iii) an unevenly lit barcode with bright washed out spots; or (iv) a barcode illuminated with illumination that is not compatible with the reflectivity characteristic(s) of the cells of the barcode. An example of (iv) is that illumination directed from the sides of the field of view yields a higher contrast image of a barcode formed by etching technology than does illumination parallel to the optical axis.

If the quality of a window of images is measured in terms of contrast, determining the selected illumination system configuration may include determining which window image of the plurality of window images has the highest contrast between light and dark cells of the barcode, and determining which configuration of the plurality of illumination systems 1136a-c was activated when the window image having the highest contrast was captured.

In one embodiment, each of the image data records 1161a-n which are transferred to the image capture control and decode system 1132 may be written to the image buffer 1157 as image data records 1153a-n without further image processing. In another embodiment, the image pre-processing circuits 1151a-n may perform image processing and writing of resulting image data records 1153a-n to the buffer memory 1152 as previously discussed.

Also, as previously discussed, one of the pre-processing circuits 1156a-n may simply write input data as an image data record 1161a-n to the image buffer 1157 without additional substantive processing.

As such, the structure depicted in FIG. 18A enables an image frame, as captured by the photo sensor array 1158, to be written as an image data record 1161 to image buffer 1157 without substantive processing then subsequently transferred to the image capture control and decode system 1132 where it either: i) undergoes image pre-processing by one or more pre-processing circuits 1151a-n, resulting in one or more image data records 1153a-n being written to the image buffer 1157 as a result of such pre-processing; or ii) is written to the image buffer 1157 as an image data record 1153a-n without pre-processing by either the pre-processing circuits 1161a-n or the pre-processing circuits 1151a-n.

The structure depicted in FIG. 18A also enables an image frame, as captured by the photo sensor array 1158, to undergo image pre-processing utilizing one or more pre-processing circuits 1161a-n and to be written to the image buffer 1157 as one or more image data records 1161a-n and then have one or more of the image data records 1161a-n transferred to the image capture control and decode system 1132 where the transferred image data records 1161a-n are: i) written to the image buffer 1152 as image data records 1153a-n without further pre-processing; or ii) subjected to further pre-processing by image pre-processing circuits 1151a-n, resulting in writing of image data records 1153a-n to the image buffer 1152.

Further, as discussed, the image processing module 1174 may undertake processing of one or more image data records 1153a-n to modify the image data records and/or generate additional, or replacement, image data records from one or more image data records 1153a-n. As such, any image data record 1153a-n may be processed by the image processing module 1174 prior to being subjected to decoding, whether it is: i) representative of the image frame captured by the photo sensor array 1158 without substantive processing by either the pre-processing circuits 1156a-n or the pre-processing circuits 1151a-n; ii) pre-processed by one of the pre-processing circuits 1156a-n but without further substantive pre-processing by one of the pre-processing circuits 1151a-n; iii) not substantively processed by one of the pre-processing circuits 1156a-n but substantively pre-processed by one of the pre-processing circuits 1151a-n; or iv) substantively pre-processed by both one of the pre-processing circuits 1156a-n and one of the pre-processing circuits 1151a-n.

Examples of pre-processing will be explained hereafter. The following examples of pre-processing may be: i) performed by the pre-processing circuits 1156a-n on a frame of image data received from the photo sensor array 1158 to generate image data records 1161a-n, which are the image frame or a derivative of the image frame, to be written to the image buffer 1157; and ii) performed by the pre-processing circuits 1151a-n and/or the image processing module 1174 (executed by the processor 1144) on an image data record 1161a-n transferred from the image buffer 11573 to the image capture control and decode system 1132 for generating an image data record 1153a-n which may be the original image frame or a derivative of the original image frame.

In one embodiment, no image processing may be performed such that the image data record may be the image frame (whether full, windowed, binned, or sub-sampled) without substantive processing.

In another embodiment, portions of the image frame may be cropped horizontally or vertically such that the image data record may be a windowed portion of the image frame (whether full, binned or sub-sampled).

In another embodiment, the image data record may be a lower resolution frame of the original image data. One of the pre-processing circuits may bin, or average, two or more pixel intensity values to generate a single intensity value representative of a theoretical pixel that encompasses the size of all of the pixels that provided values that were binned or averaged. Multiple image data records can be generated from the same frame of image data at different resolutions.

In another embodiment, binarization may be performed. The binarization may involve comparing the intensity value of each pixel, or the intensity value resulting from the binning of a group of pixels, to a threshold. If it is greater than (or equal to) the threshold, the intensity value may be converted to a first binary value, and if it is less than (or equal to) the threshold, the intensity value may be converted to a second binary value. The threshold may be common across all pixels (or binned pixel groupings) or may be different for different pixels (or binned pixel groupings). The threshold value applied to any pixel (or binned pixel groupings) may be dynamic (e.g., the threshold value may be calculated based on the intensity values previously operated on during the binarization process).

In another embodiment, a minimum/maximum processing technique utilizing a 3×3 kernel may be applied to any array of pixel intensity values or any array of binned or subsampled array of intensity values. It may be applied across the entire frame of image data (or an image data record) or to only a cropped section of the frame of image data (or an image data record). Of the 9 intensity values of each 3×3 kernel, the maximum intensity value or the minimum intensity value is determined and written to the image data record in substitution for the intensity value of the center cell of the kernel.

In another embodiment, convolution kernel masking may be performed. In this image processing technique, a kernel mask, such as the 3×3 kernel mask.

In another embodiment, a rotation may be performed on an array of pixel values. More specifically, each intensity value for selected columns of the array (e.g. 3, 5, 7) may be extracted and used for intensity values of adjacent rows within an image data record. The selected columns may be adjacent columns or may be a fraction of the columns, evenly spaced, across all or a portion of the array. The array may be the image data (full, binned, sub-sampled, and/or windowed).

It should be appreciated that using one or more of the above processing techniques, image data records can be generated from the original image frame or image data records that have already been generated from the original image frame. Multiple processing techniques may be applied to the same frame of image data (or image data record) to result in different image data records derived therefrom, and the processing techniques may be applied in any order. Each of the above preprocessing techniques is described in more detail in U.S. patent application Ser. No. 14/717,112.

Sets of image data records may be generated from one or more image frames captured in a single sequence or in multiple sequences, and may be generated by a combination of the pre-processing circuits 1156a-n of the image sensor system package 1134, pre-processing circuits 1151a-n of the image capture control and decode system 1132, and/or the processor 1144 of the image capture control and decode system 1132 executing the image processing module 1174. For example, an image data record may be a frame of image data which may be an array of pixel intensity values, each pixel intensity value representing the intensity of illumination accumulating on the photo sensor pixel over the exposure period. Different image data records may each be a frame of image data captured using a different exposure period, using a different gain setting, or using a different exposure illumination active during a different exposure period, each as described in more detail in U.S. patent application Ser. No. 14/717,122.

In one embodiment, communication of decoded data obtained from an image of a barcode with a host computer may require that a barcode reader 1130: i) authenticate itself to the host computer as a trusted accessory; and ii) communicate using a communication protocol that is operable after the barcode reader 1130 has authenticated to the host computer as a trusted accessory (i.e., after obtaining status of a trusted accessory or device to the host computer). More specifically, at least one of the host computer and the barcode reader 1130 may not communicate using the communication protocol until mutual authentication of the barcode reader 1130 and the host computer as a trusted entity is successfully completed.

In this embodiment, the barcode reader 1130 may further include accessory protocol control code 1164 and an authentication system 181. The accessory protocol control code 1164 may be stored in the memory 1146 and executed by the processor 1144. The accessory protocol control code 1164, when executed by the processor 1144, enables communication with an operating system of the host computer and provision of the decoded data of the barcode image to an application operating on the host computer using an accessory communication protocol. The accessory protocol control code 1164 may implement a communication protocol specific to the host computer when communicating with the host computer.

Referring to FIG. 18A, the authentication system 181 may be included within a combination of the hardware circuits 1148 and memory 1146 (including a code executed by the processor 1144) or may be a separate package which is part of the I/O peripheral systems 1138 and coupled to the hardware circuits 1148 and including its own processor 184 (e.g. a co-processor). The authentication system 181 may include a processor 184 and a memory for storing a private encryption key 182 and an authentication process 183 for execution by the processor 184. The authentication system 181 is configured to receive an authentication challenge from a host computer (e.g., a remote device), subject the authentication challenge to an authentication algorithm to obtain an authentication response, and send the authentication response in response to the authentication challenge to the host computer. The authentication response identifies the barcode reader 1130 as a trusted accessory to the host computer.

Figure 19A:
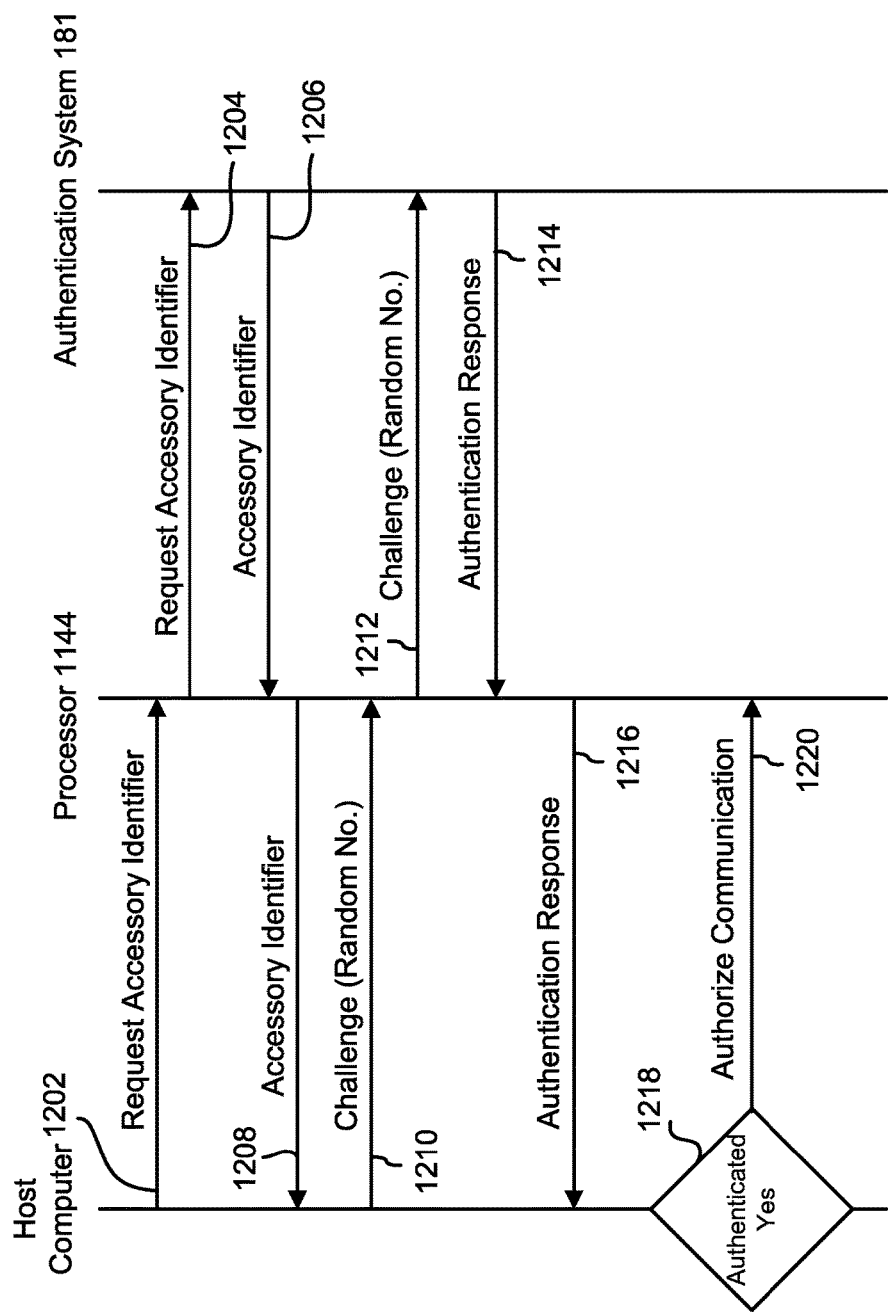
FIG. 19A is a ladder diagram representing an authentication procedure for authenticating a barcode reader to a host computer as a trusted accessory in accordance with one embodiment.

FIG. 19A is a ladder diagram representing an authentication procedure for authenticating a barcode reader 1130 to a host computer as a trusted accessory in accordance with one embodiment. The host computer and the barcode reader 1130 utilizing the authentication system 181 establish mutual authentication using an authentication protocol. Any authentication protocol that is currently available or that will be developed in the future may be used for this purpose. An example authentication procedure will be explained with reference to FIG. 19A but it should be noted that the procedure shown in FIG. 19A is provided as an example, and any other authentication procedure may be performed to establish a mutual authentication between the barcode reader 1130 and the host computer. The host computer sends a request for an accessory identification at step 1202. This request may be sent when a communication link is first established between the barcode reader 1130 and the host computer, which may be at: i) a connection of the point-to-point interface (e.g., a UART, USB, or similar connection) utilizing the power/data contacts; ii) a formation of a wireless point-to-point link (e.g., a formation of a Bluetooth (IEEE 802.15), Wi-Fi Direct, or a similar link); or iii) a formation of a TCP/IP connection over a Wi-Fi (IEEE 802.11) and/or Ethernet or other IP enabled network; or iv) a similar initial connection.

In response to the request, the processor 1144 of the barcode reader 1130 may query the authentication system 181 for an accessory identifier at step 1204. The accessory identifier may be generated by the authentication system 181 and/or may be a digital certificate.

The authentication system 181 may then return the accessory identifier to the processor 1144 of the barcode reader 1130 at step 1206. Communication between the processor 1144 and the authentication system 181 (which may be a co-processor) may be performed by way of Inter-Integrated Circuit (I2C) communication over an internal bus component of the hardware circuits 1148.

The processor 1144 of the barcode reader 1130 may then return the accessory identifier to the host computer over a communication link at step 1208.

After validating the accessory identifier, the host computer may send an identification challenge to the processor 1144 of the barcode reader 1130 over the communication link at step 1210. The identification challenge may be a random number encrypted with a public encryption key of the digital certificate.

The processor 1144 may then present the authentication challenge to the authentication system 181 via an internal bus at step 1212.

The authentication system 181 may then generate and return an authentication challenge response to the processor 1144 via the internal bus at step 1214. Step 1214 may include decrypting the authentication challenge using its private encryption key 182 and an authentication process 183 (e.g., a predetermined encryption/decryption algorithm) to recover the random number and return the random number to the host computer. The authentication challenge response may be encrypted using the public key of the host private/public key pair.

The processor 1144 may then provide the authentication challenge response to the host computer via the communication link at step 1216.

The host computer may then determine at step 1218 whether the barcode reader 1130 is a trusted accessory based on the authentication challenge response (i.e., whether the random number returned by the barcode reader 1130 matches the original random number provided by the host computer).

If the barcode reader 1130 has properly authenticated as a trusted accessory, the host computer may authorize communication with the barcode reader 1130 over the communication link at step 1220.

Figure 19B:
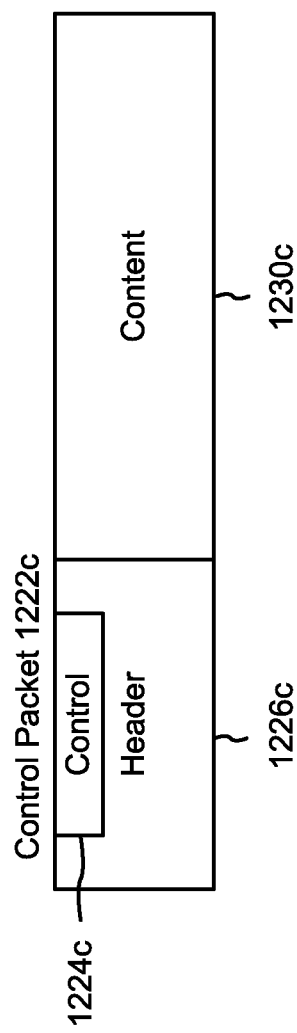
FIGS. 19B and 19C depict example packet formats for communication between a barcode reader and a host computer.
Figure 19C:
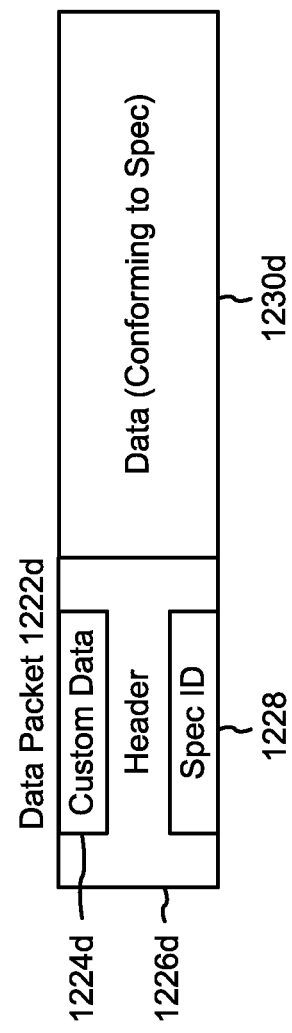

FIGS. 19B and 19C depict example packet formats for communication between a barcode reader 1130 and a host computer. The barcode reader 1130 and the host computer may exchange data packets 1222*d* and control packets 1222*c* over a communication link in accordance with a communication protocol. The communication of packets may follow authentication between the barcode reader 1130 and the host computer as a trusted accessory. The communication protocol (i.e., the accessory protocol code) used between the barcode reader 1130 and the host computer may be a non-proprietary communication protocol or a proprietary communication protocol (such as the iPod® Accessory Protocol (iAP or iAP2) or the like). When communicating using a communication protocol (either proprietary or non-proprietary), the decoded image data may be encapsulated in a data frame. For example, the encapsulation of the decoded image data in a data frame may be in conformity with iAP or iAP2.

The communication protocol implemented between the processor 1144 of the barcode reader 1130 executing the accessory protocol control code 1164 and the processor of the host computer define a packet format for control packets 1222*c* and data packets 1222*d*. A packet 1222*c*, 1222*d* may include a header 1226*c*, 1226*d* and control packet content/ data 1230*c*, 1230*d*, respectively. The header 1226*c*, 1226*d* may include a control/data designation 1224*c*, 1224*d*, respectively, which identifies whether the packet is a control packet 1222*c* or a data packet 1222*d*. The header 1226*d* of a data packet 1222*d* may also include a specification ID 1228, which is a unique identifier that is assigned to the barcode reader 1130 and that identifies the type of specifications of data 1230*d* included in the packet 1222*d* (i.e., the specifications to which the data 1230*d* will conform).

If the control/data designation 1224*c*, 1224*d* of a packet provided by the barcode reader 1130 to the host computer indicates that the packet is a control packet (control/data designation 1224*c*), the packet is delivered to the operating system of the host computer. If the control/data designation 1224*c*, 1224*d* of a packet provided by the barcode reader 1130 to the host computer indicates that the packet is a data packet (control/data designation 1224*d*), the specification ID 1228 identifies the type of specifications of data 1230*d* included in the packet 1222*d* (i.e., the specifications to which the data 1230*d* will conform), and the host computer (more specifically, the operating system of the host computer) delivers the data packet 1222*d* to an application operating on the host computer based on predefined criteria. The predefined criteria may be that the application running on the processor of the host computer is identified as an application designated to accept data packets with the assigned specification ID 1228 and is capable of processing the data 1230*d* conforming with the specifications associated with the assigned specification ID 1228.

If the proprietary communication protocol is iAP2, the specification ID 1228 is assigned by Apple to the model of the barcode reader 1130 when the barcode reader is certified as a made-for-iPhone, -iPod, -iPad, or similar device and the specification to which data 1230*d* is provided by the model of the barcode reader 1130 conform.

The same applies to the packets transmitted from the host computer to the barcode reader 1130. When a packet 1222*c*, 1222*d* is communicated from the host computer to the barcode reader 1130 over the wireless communication link, control packets 1222*c* may be used by the accessory protocol control code 1164 and data packets 1222*d* may be used by other portions of the software or firmware in the barcode reader 1130. For example, the applications running on the host computer may send configuration commands to the barcode reader 1130. From the perspective of the accessory protocol code, those commands are just data, and other portions of the barcode reader 1130 that use that data may recognize it as configuration commands.

As an alternative to including the authentication system 181 within the barcode reader 1130, the barcode reader 1130 may still include the accessory protocol control code 1164; however, the authentication system 181 may be within an accessory which attaches to the barcode reader 1130 such as the docking stations 1300, 1400, 1600, 2100, 2000, and 2400.

Figure 20A:
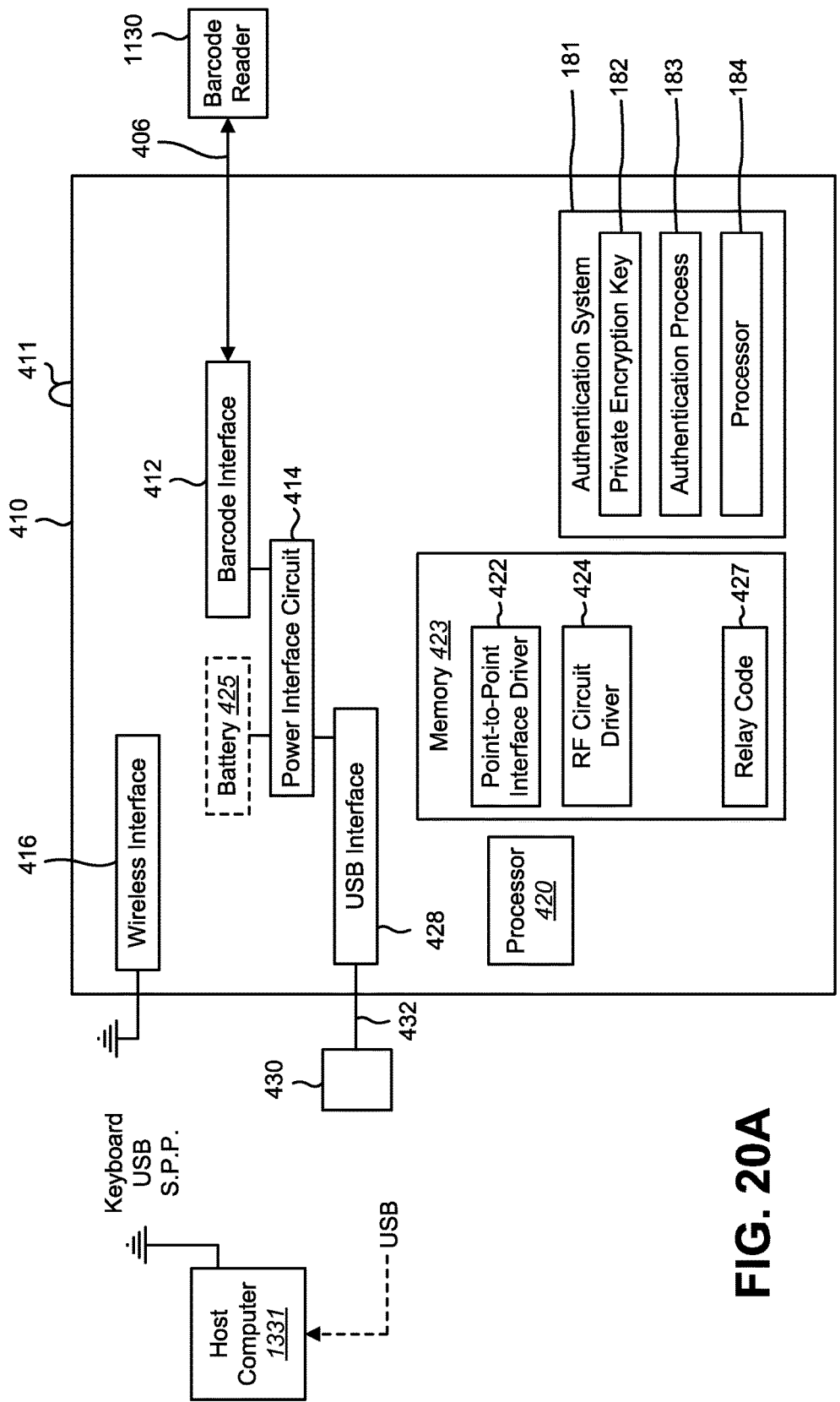
FIGS. 20A and 20B depict exemplary operation of the barcode reader, the docking station, and the host computer.

FIG. 20A depicts a first embodiment of circuitry 410 which may be implemented in any of the docking stations referenced above. FIG. 20A depicts the barcode reader 1130 being coupled to the circuitry 410 of the docking station via a connection 406 which may be the connection between the power/data contacts of the barcode reader 1130 and the power data contacts of the docking station.

The circuitry 410 includes a first power data interface (barcode interface) 412, a second power/data interface (USB interface) 428, and a wireless interface 416. The circuitry 410 may also include a processor 420, memory 423, the authentication system 181, and power interface circuits 414. The memory 423 may include a point-to-point interface driver for point-to-point communications between the barcode reader/the host computer and the circuitry 400, a relay code 427 for relaying data between the barcode reader/the host computer and the circuitry 400, and an RF circuit driver for wireless communication between the barcode reader/ host computer and the circuitry 400.

The first power/data interface (barcode interface) 412 may provide power and serial communication between the circuitry 410 and the barcode reader 1130 through the power/ data contacts of the docking station coupled to the power data contacts of the barcode reader 1130.

The second power/data interface 428 may be, for example, a USB interface (operating as a USB non-host) for coupling to: i) a power source; or ii) a mating USB port of the host computer (operating as a USB host) via a multi-conductor cable 432 and a connector 430.

The docking station may optionally include a battery 425 to provide charging power to the barcode reader 1130 as well as operating systems within the docking station when the docking station itself is battery-powered and not coupled to a power source by the second power/data interface 428.

The wireless interface 416 may be, for example, a Bluetooth® interface for communicating with a Bluetooth® of the host computer utilizing any communication mode supported by Bluetooth® including a keyboard mode, a USB mode, and a Serial Port Profile (SPP) mode. Any other wireless local area network (WLAN) interface may also be used.

In operation, the circuitry 410 may operate in both a command mode and a pass through mode. When in a command mode, the processor 420 executing firmware within the circuitry 410 receives and processes information sent by the barcode reader 1130, including providing responses to requests from the barcode reader 1130. When in a pass through mode, the processor 420 executing firmware within the circuitry 410 passes the information (e.g., data frames) received from the barcode reader 1130 to the host computer by one of the second power/data interface 428 or the wireless interface 416. Passing the information received from the barcode reader 1130 to the host computer may include converting the information from the serial port profile format as received by the first power/data interface 412 to the applicable one of: i) a keyboard format for wireless transmission to the host computer via the wireless interface 416; ii) a serial port profile format for transmission to the host computer via the wireless interface 416; or iii) a USB format for wired or wireless transmission to the host computer via the second power/data interface 428 or the wireless interface 416.

In either the command mode or the pass through mode, the processor 420 executing firmware within the circuitry 410 may pass information (e.g., data frames) received from the host computer to the barcode reader 1130. Passing the information received from the host computer to the barcode reader 1130 may include converting the information from the serial port profile, keyboard, or USB format as received by the circuitry 410 to the serial port profile format used for transmission to the barcode reader 1130 via the first power/data interface 412.

Figure 20B:
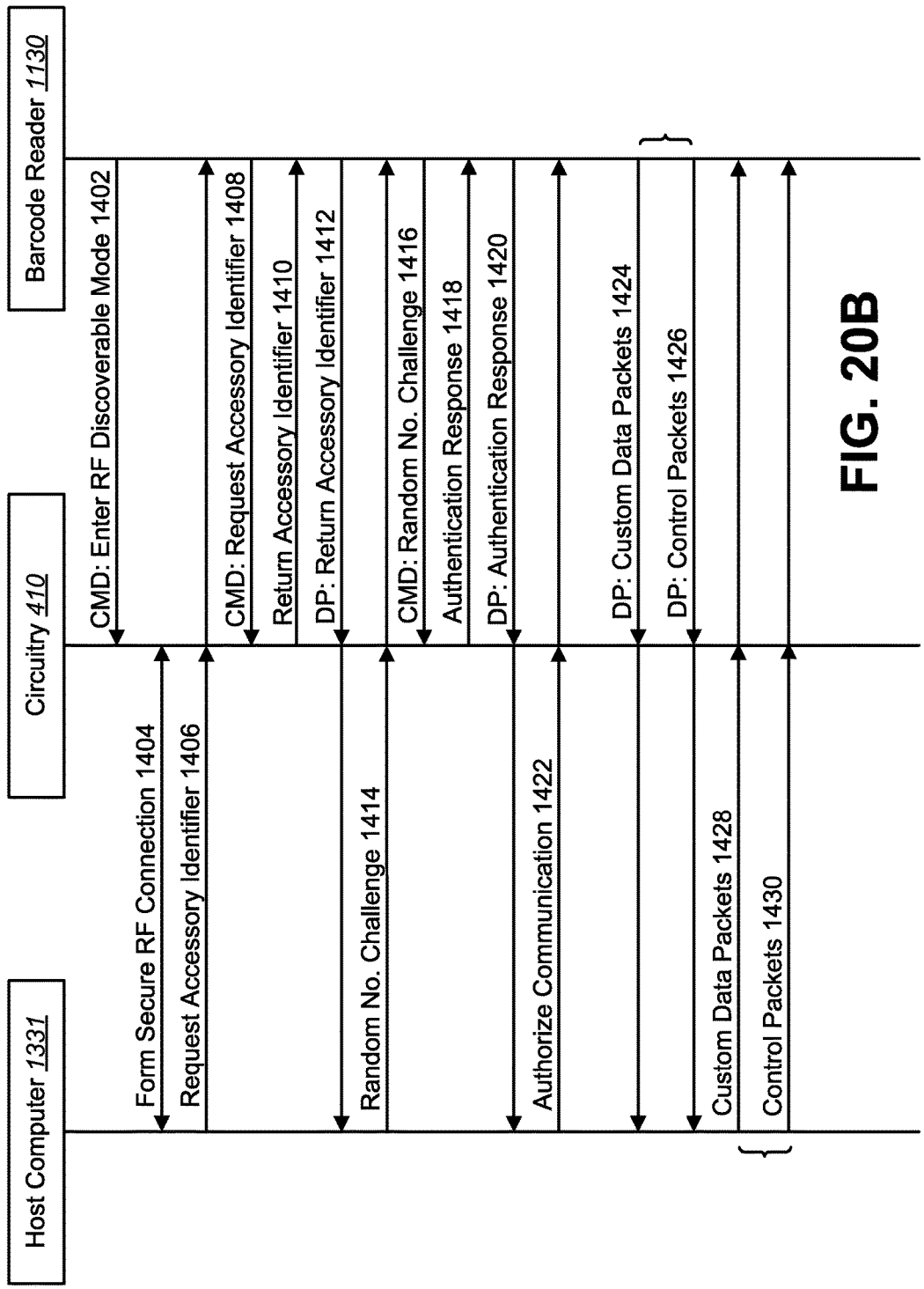

Referring to FIG. 20B in conjunction with FIG. 20A, step 1402 represents the barcode reader 1130 utilizing a command mode to direct the circuitry 410 (e.g., the RF circuit drivers 424 and the wireless interface 416) to enter a discoverable mode. In response thereto, the processor 420 executing the applicable firmware places the circuitry 410 (e.g., the RF circuit drivers 424 and the wireless interface 416) into a discoverable mode.

When in a discoverable mode the host computer 1331 may initiate formation of a secure RF connection (e.g., a Bluetooth pairing) between the RF systems of the host computer 1331 and the circuitry 410 at step 1404. The paring may be performed in response to a user of the host computer 1331 selecting the circuitry 410 for pairing. Upon completion of pairing, the processor 420, executing firmware of the circuitry 410 may, for example, illuminate an indicator light 411 to signal that a secure wireless communication connection has been established between the circuitry 410 and the host computer 1331. Alternatively, the processor 420 may activate generation of other signals, such as audible signals or vibrations to signal establishment of the secure wireless communication connection.

Steps 1406 through 1422 represent an authentication process of the externally powered barcode reader 1130 to the host computer as a trusted accessory. In general, the authentication of the barcode reader 1130 to the host computer utilizes the steps described in FIG. 19A with the exception that steps performed by the authentication system 181 within the barcode reader 1130 are performed by the authentication system 181 within the docking station.

Step 1406 represents the host computer sending a request for an accessory identifier to the circuitry 410. This request may be sent when a communication link is first established between the circuitry 410 and the host computer. The processor 420 of the circuitry 410 forwards all communications received from the host computer 1331 to the externally powered barcode reader 1130. Therefore, the request for the accessory identifier is forwarded to the barcode reader 1130.

In one embodiment, the accessory identifier may be generated by the barcode reader 1130 or may be a digital certificate stored within the memory of the barcode reader 1130. Alternatively, in another embodiment, the accessory identifier may be generated by the circuitry 410 or may be a digital certificate stored by the circuitry 410.

Steps 1408 and 1410 are steps utilized when the accessory identifier is generated by the circuitry 410 or is a digital certificate stored by the circuitry 410. More particularly, step 1408 represents the barcode reader 1130 using a command mode to direct the circuitry 410 to provide its accessory identifier to the barcode reader 1130. In response thereto, the processor 420 of the circuitry 410 executing the applicable firmware may query the authentication system 181 for an accessory identifier. As discussed, the accessory identifier may be generated by the authentication system 181 and/or may be a digital certificate. The authentication system 181 may then return the accessory identifier to the processor 420. Communication between the processor 420 and the authentication system 181 (which may be a coprocessor) may be performed by way of I2C communication over an internal bus.

Step 1410 represents the processor 420 of the circuitry 410 returning the accessory identifier to the barcode reader 1130. Step 1412 represents the barcode reader 1130 using a pass through mode to return the accessory identifier to the host computer through the circuitry 410. As discussed, in the pass through mode the processor 420 of the circuitry 410 forwards the communication received from the barcode reader 1130 to the host computer.

After validating the accessory identifier, the host computer may send an authentication challenge to the circuitry 410 at step 1414. The authentication challenge may be a random number encrypted with a public encryption key of the digital certificate. As discussed, the processor 420 of the circuitry 410 passes the authentication challenge received from the host computer to the barcode reader 1130.

Step 1416 represents the barcode reader 1130 utilizing a command mode to provide the authentication challenge to the processor 420 of the circuitry 410 and to direct the processor 420 to return an authentication response. In response thereto the processor 420 of the circuitry 410 presents the authentication challenge to the authentication system 418, obtains an authentication response from the authentication system 418, and provides the authentication response back to the barcode reader 1130 at step 1418.

After receiving the authentication response from the circuitry 410, the barcode reader 1130 returns the authentication response to the host computer through the circuitry 410 using a pass through mode at step 1420. When the authentication response is sent using a pass through mode, the processor 420 of the circuitry 410 receiving the authentication response forwards it to the host computer.

If the barcode reader 1130 has properly authenticated as a trusted accessory, the host computer may authorize communication with the barcode reader 1130 at step 1422. Again, the processor 420 of the interface system passes the authorization to the barcode reader 1130.

After authentication the barcode reader 1130 is capable of communicating with the host computer via the circuitry 410 using a pass through mode. After authentication, the ready state may be indicated to a user by the circuitry 410 or by the barcode reader 1130. The circuitry 410 may send a message to the barcode reader 1130 (via the first power/data interface 412 and the connector 404) confirming completion of authentication, and the barcode reader 1130 may generate a signal (for example illumination of an indicator light, generation of an audible signal, or activation of a vibration motor) to notify the user of completion of authentication and the ready state. Alternatively, the circuitry 410 may generate a signal (for example illumination of an indicator light, generation of an audible signal, or activation of a vibration motor within a housing portion of the docking station) to notify the user of completion of authentication and the ready state.

Step 1424 represents the barcode reader 1130 providing decoded data to the host computer via the circuitry 410 using a pass through mode. The barcode reader 1130 may package the decoded data as a data packet, as described with respect to FIG. 19C. The packaging includes formatting and/or supplementing the decoded data so that it conforms to the specification ID 1228 and adding a header to the data which includes identification of the packet as a custom data packet and the specification ID 1228.

Step 1426 represents the barcode reader 1130 sending control packets to the host computer via the circuitry 410 using a pass through mode. Step 1428 represents the host computer sending custom data packets to the barcode reader 1130 via the circuitry 410. Step 1430 represents the host computer 1331 sending control packets to the barcode reader 1130 via the circuitry 410. A control or configuration application operating on the host computer 1331 may generate configuration control commands for the barcode reader 1130 and send them to the barcode reader 1130 via the circuitry 410.

The host computer 1331 packages the control or configuration commands as custom data packets as previously described. This may include, as described with respect to FIG. 19C, formatting and/or supplementing the control or configuration commands so that they conform to the specification ID 1228 and adding a header to the data which includes identification of the packet as a custom data packet and the specification ID 1228. Even though a configuration or control command may be a control command to the barcode reader 1130, it is data for purposes of the protocol communications between the circuitry 410 and the host computer.

Figure 21A:
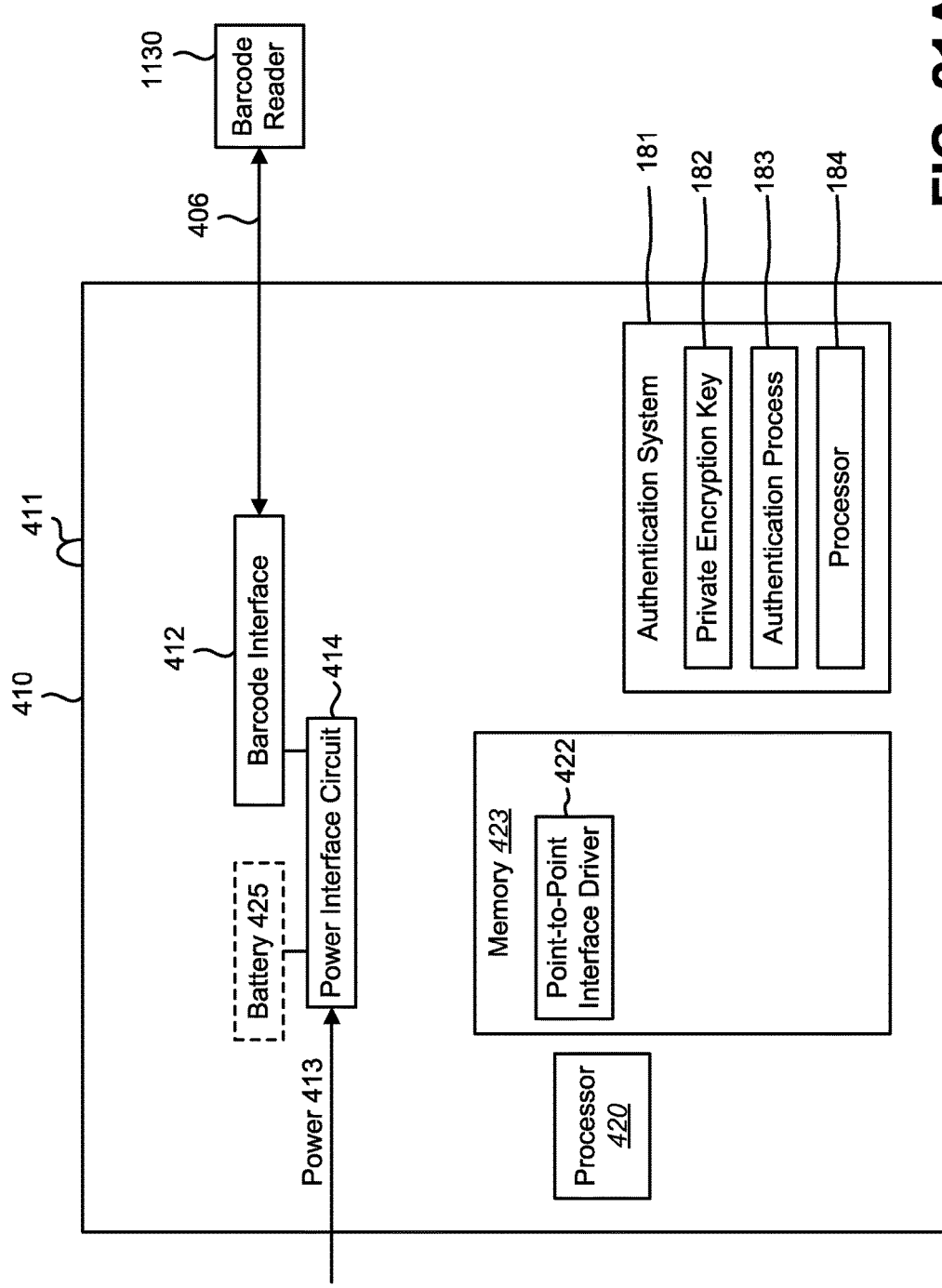
FIGS. 21A and 21B depict another exemplary operation of the barcode reader, the docking station, and the host computer.

FIG. 21A depicts a second embodiment of circuitry 410 which may be implemented in any of the docking stations described above. FIG. 21A depicts the barcode reader 1130 being coupled to the circuitry 410 of the docking station via a connection 406 which may be the connection between the power/data contacts of the barcode reader and the power data contacts of the docking station.

The circuitry 410 includes a power data interface (barcode interface) 412 and a power interface 413. The circuitry 410 may also include a processor 420, memory 423, the authentication system 181, and power interface circuits 414.

The power/data interface (barcode interface) 412 may provide power and serial communication between the circuitry 410 and the barcode reader 1130 through the power/data contacts of the docking station coupled to the power data contacts of the barcode reader 1130.

The power interface 413 provides power to the power interface 413 for providing charging power to the barcode reader 1130 as well as operating systems within the docking station. The docking station may optionally include battery 425 to provide charging power to the barcode reader 1130 as well as operating systems within the docking station when the docking station itself is battery-powered and not coupled to a power source by the power interface 413.

In operation, the processor 420 executing firmware within the circuitry 410 receives and processes information sent by the barcode reader 1130, including providing responses to requests from the barcode reader 1130.

Figure 21B:
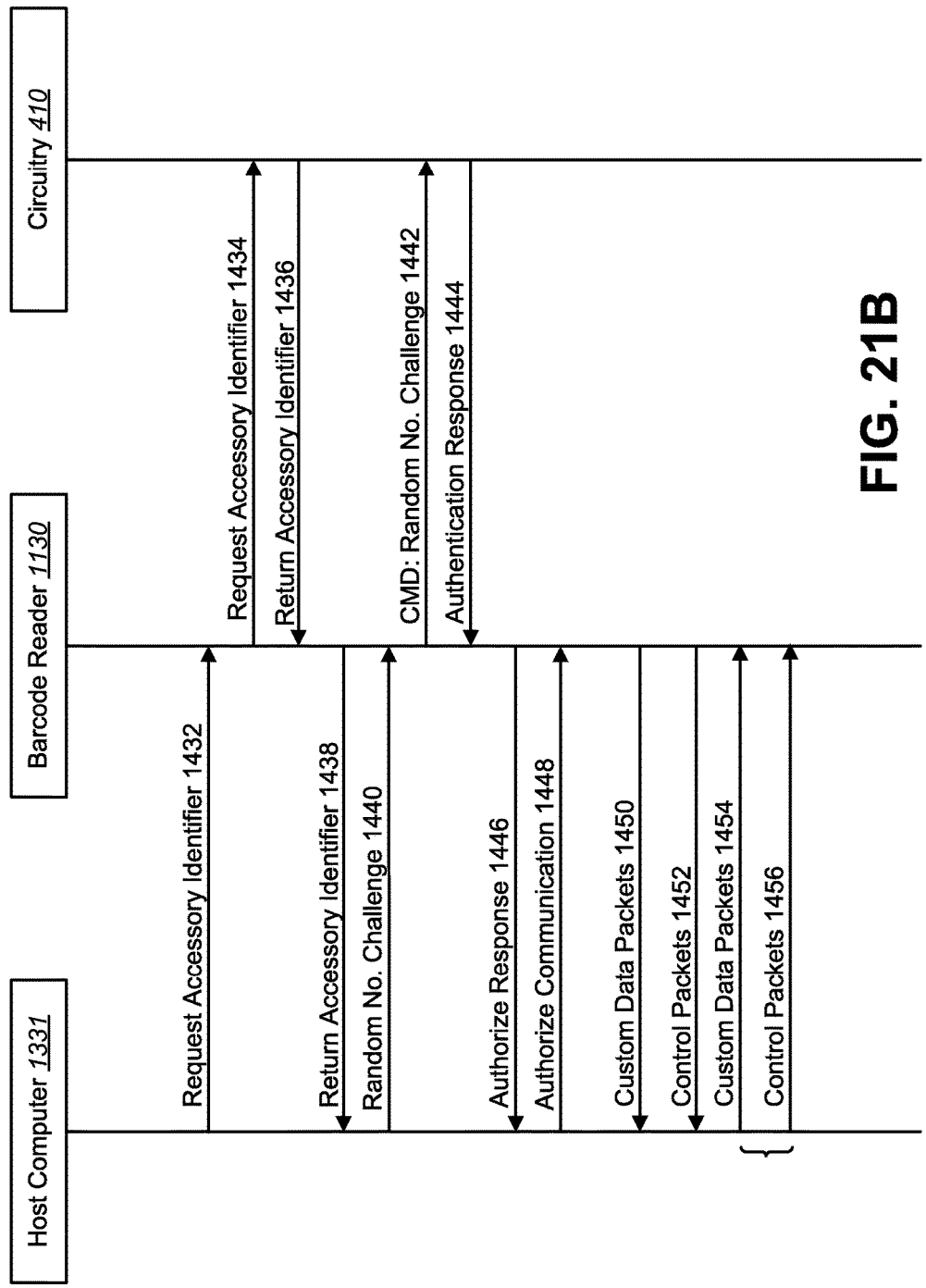

Referring to FIG. 21B in conjunction with FIG. 21A, steps 1432 through 1448 represent an authentication process of the barcode reader 1130 to the host computer 1331 as a trusted accessory to facilitate communication between the barcode reader 1130 and the host computer 1331 utilizing the wireless LAN interface 1142a or the wireless point-to-point interface 1142b of the barcode reader 1130.

In general, the authentication of the barcode reader 1130 to the host computer 1331 utilizes the steps described in FIG. 19A with the exception that steps performed by the authentication system 181 within the barcode reader 1130 are performed by the authentication system 181 within the docking station.

Step 1432 represents the host computer 1331 sending a request for an accessory identifier to the barcode reader 1130. This request may be sent when a communication link is first established between the barcode reader 1130 and the host computer 1331 via wireless LAN or wireless point-to-point communication.

In one embodiment, the accessory identifier may be generated by the barcode reader 1130 or may be a digital certificate stored within the memory of the barcode reader 1130. Alternatively, in another embodiment, the accessory identifier may be generated by the circuitry 410 or may be a digital certificate stored by the circuitry 410.

Steps 1434 and 1436 are steps utilized when the accessory identifier is generated by the circuitry 410 or is a digital certificate stored by the circuitry 410. More particularly, step 1434 represents the barcode reader 1130 directing the circuitry 410 to provide its accessory identifier to the barcode reader 1130. In response thereto, the processor 420 of the circuitry 410 executing the applicable firmware may query the authentication system 181 for an accessory identifier. As discussed, the accessory identifier may be generated by the authentication system 181 and/or may be a digital certificate. The authentication system 181 may then return the accessory identifier to the processor 420. Communication between the processor 420 and the authentication system 181 (which may be a coprocessor) may be performed by way of I2C communication over an internal bus.

Step 1436 represents the processor 420 of the circuitry 410 returning the accessory identifier to the barcode reader 1130. Step 1438 represents the barcode reader 1130 returning the accessory identifier to the host computer 1331 via its wireless LAN interface or wireless point-to-point interface with the host computer.

After validating the accessory identifier, the host computer 1331 may send an authentication challenge to barcode reader 1130 at step 1440. The authentication challenge may be a random number encrypted with a public encryption key of the digital certificate.

Step 1442 represents the barcode reader 1130 providing the authentication challenge to the processor 420 of the circuitry 410 and directing the processor 420 to return an authentication response. In response thereto the processor 420 of the circuitry 410 presents the authentication challenge to the authentication system 181, obtains an authentication response from the authentication system 181, and provides the authentication response back to the barcode reader 1130 at step 1444.

After receiving the authentication response from the circuitry 410, the barcode reader 1130 returns the authentication response to the host computer 1331 via its wireless LAN or wireless point-to-point connection with the host computer at step 1446.

If the barcode reader 1130 has properly authenticated as a trusted accessory, the host computer 1331 may authorize communication with the barcode reader 1130 at step 1448.

After authentication the barcode reader 1130 is capable of communicating with the host computer 1331 via its wireless LAN or wireless point-to-point communication connection with the host computer 1331. After authentication, the ready state may be indicated to a user by the barcode reader 1130.

Step 1450 represents the barcode reader 1130 providing decoded data to the host computer 1331. The barcode reader 1130 may package the decoded data as a custom data packet, as described with respect to FIG. 19C. The packaging includes formatting and/or supplementing the decoded data so that it conforms to the specification ID 1228 and adding a header to the data which includes identification of the packet as a custom data packet and the specification ID 1228.

Step 1452 represents the barcode reader 1130 sending control packets to the host computer 1331. Step 1454 represents the host computer 1331 sending custom data packets to the barcode reader 1130. Step 1456 represents the host computer 1331 sending control packets to the barcode reader 1130. In step 1456, a control or configuration application operating on the host computer 1331 may generate control or configuration commands for the barcode reader 1130 and send them to the barcode reader 1130.

The host computer 1331 may package the control or configuration commands as custom data packets as previously described. This may include, as described with respect to FIG. 19C, formatting and/or supplementing the control or configuration commands so that they conform to the specification ID 1228 and adding a header to the data which includes identification of the packet as a custom data packet and the specification ID 1228.

FIG. 22 is a top-down view of certain optic components of the barcode reader 1130 in accordance with the present disclosure. The components include a camera 103 and the illumination system 1136. The camera 103 is configured to capture an image of a barcode within a field of view 106 of the camera 103. The field of view 106 of the camera 103 is directed along an optical axis 114 of the camera 103. The camera 103 may include the photo sensor array 102 and a lens 104 that focuses illumination reflected from objects (e.g., a barcode) within the field of view 106 onto the photo sensor array 102. The optical axis of the camera 103 may be the optical axis of the lens 104. The camera 103 may be located near a center of the optical substrate 122 in one or more of the vertical dimension and the horizontal dimension.

The illumination system 1136 is configured to illuminate the barcode while the camera 103 captures an image of the barcode. The illumination system 1136 may include one or more illumination systems 1136a-c in FIG. 18A.

Referring to both FIGS. 18A and 22, the illumination system 1136a may be a diffuse illumination system which includes an optical substrate 122. Light introduced into the optical substrate by at least one light source propagates between a front major surface 140 and a back major surface 138 in a direction traverse to the optical axis 114 of the camera 103. Light is mixed by total internal reflection as it travels within the optical substrate 122, and one or more extraction features included in the optical substrate 122 allow light to be removed from the optical substrate 122 in a directed intensity pattern. By allowing the light to mix as it propagates within the optical substrate 122, the propagating light loses any structure imparted onto it by the one or more light sources.

The optical substrate 122 has a front major surface 140 and a back major surface 138 arranged generally perpendicular to the optical axis 114. Light is introduced from the at least one light source 120 between the front major surface 140 and the back major surface 138 (also illustrated in FIGS. 23A-23E and 24A-24C). The introduced light is transferred by total internal reflection through the optical substrate 122 between the front major surface 140 and the back major surface 138 in a direction transverse to the optical axis 114. For example, in FIG. 22, light propagates through the optical substrate 122 in a direction generally perpendicular to the optical axis 114. In an alternative embodiment depicted in the cross sectional views of the optical substrate 122 of FIGS. 24B and 24C, the at least one light source 120 introduces light into the optical substrate 122 through the back major surface 138. In this example, the optical substrate 122 has a chamfered surface 125 that reflects light in direction 191 through total internal reflection towards the optical axis 114.

Figure 23A:
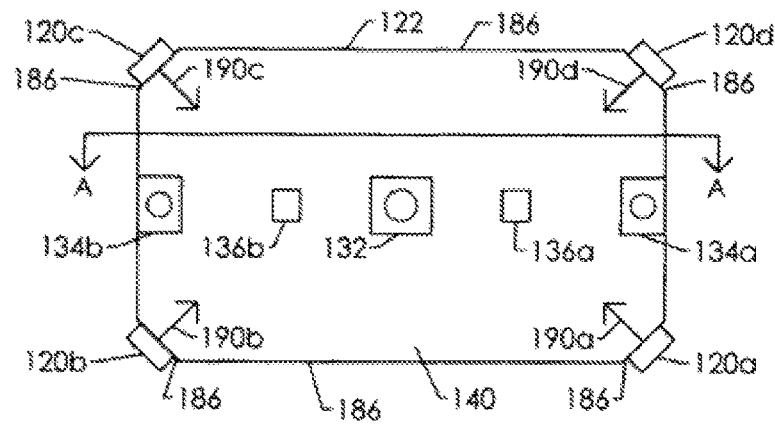
FIGS. 23A-23E are front views of an optical substrate within the barcode reader shown in FIG. 1 in accordance with different embodiments of the present disclosure.

As shown in the front view of the optical substrate 122 in FIG. 23A, and in the cross sectional views of the optical substrate 122 in FIGS. 24A and 24D-24F, the at least one light source 120 may be positioned adjacent an edge 186 of the optical substrate 122. In this configuration, as shown in FIG. 23A, light may exit the at least one light source 120 through a single light-emitting surface (light leaving the light-emitting surface is represented by arrows 190a-d).

Figure 23B:
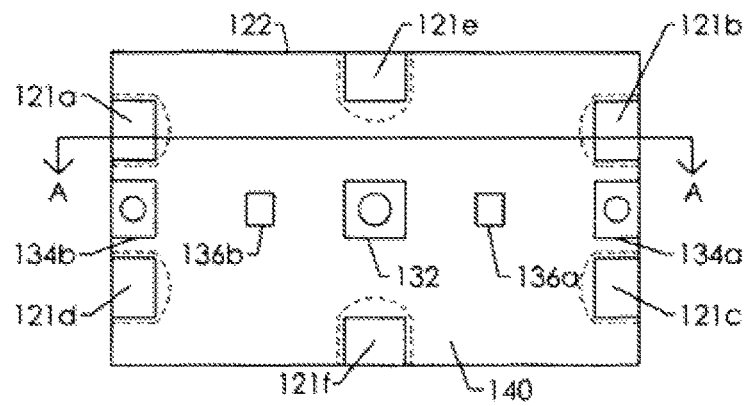
Figure 24A:
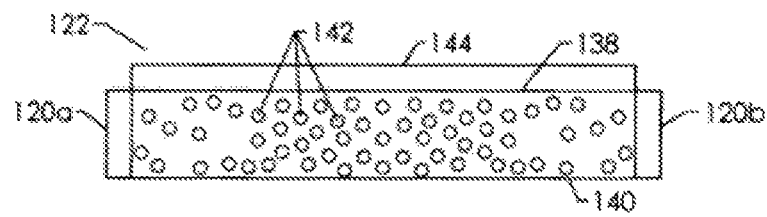
FIGS. 24A-24F illustrate cross-sectional views of the optical substrate, taken along line A-A in FIGS. 23A-23C in accordance with different embodiments of the present disclosure.
Figure 24B:
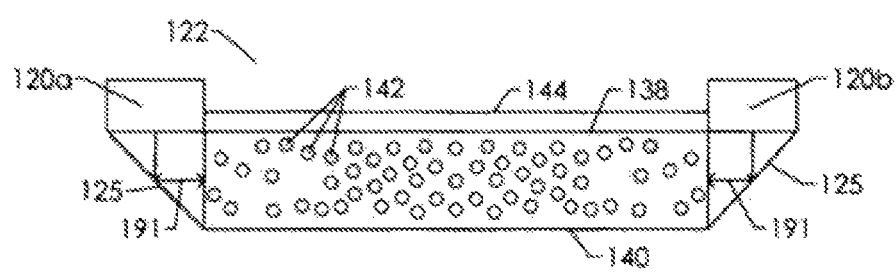
Figure 24C:
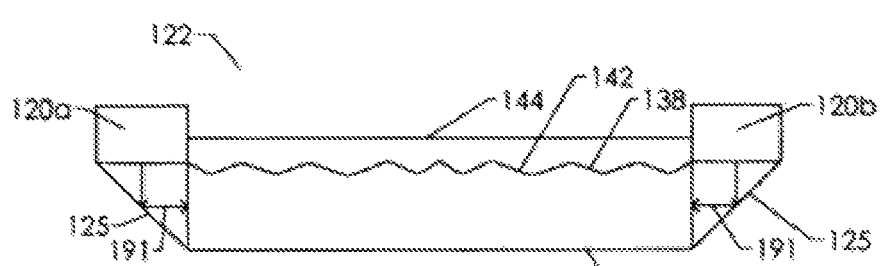

Alternatively, as shown in FIG. 23B and FIGS. 24B and 24C, the at least one light source 120 may be positioned on the back major surface 138 at locations 121a-f. In this configuration light may exit the at least one light source 120 through a single light-emitting surface and be reflected from the chamfered surface 125 and directed towards the optical axis in direction 191.

Figure 23C:
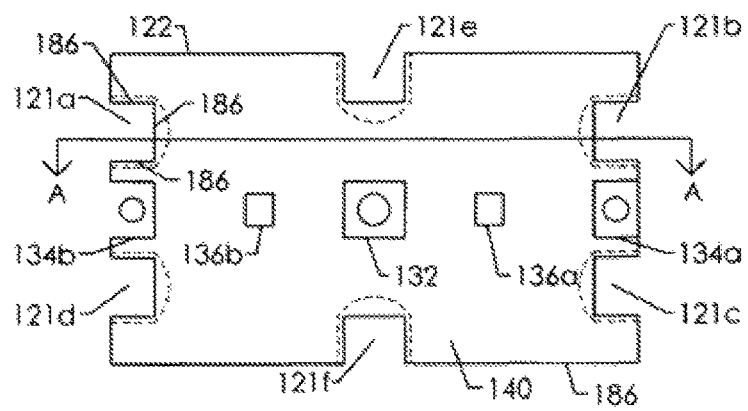

Alternatively, as shown in FIG. 23C, the at least one light source 120 may be positioned in locations 121a-f (which is a recess in the optical substrate 122). In this example, the at least one light source 120 may emit light from multiple light-emitting surfaces and the light from all of the light-emitting surfaces may enter the optical substrate 122.

Figure 23D:
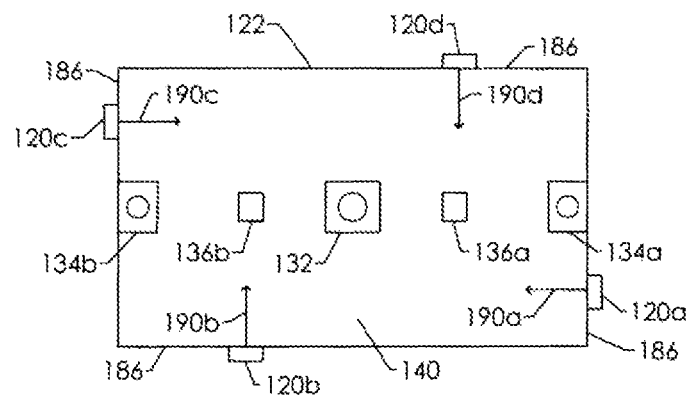

Referring to FIG. 23D, the at least one light source 120 may be reduced to four (4) light sources, each of which is arranged on one exterior edge of the optical substrate 122 at a location that is not centered on the edge. For example, light source 120a may be on a side edge lower than the center while light source 120c may be on the opposing side higher than the center. Light source 120d may be on the top edge to the right of center while light source 120b may be on the bottom edge to the left of center.

Referring to FIGS. 22 and 23A, the one or more light sources 120 may comprise multiple light-emitting diodes (LEDs). As will be understood by one of ordinary skill in the art, the one or more light sources 120 may comprise any suitable light-emitting device. Further, the multiple light sources 120 may emit illumination with different characteristics. For example, a portion of the light sources 120 may be white LEDs while another portion may be red LEDs, or LEDs of another color.

As shown in FIG. 22, the optical substrate 122 may comprise a substantially flat plate. For example, the optical substrate 122 may comprise a clear and colorless acrylic substrate which may be made from any other material suitable for transferring light by total internal reflection. The optical substrate 122 may be positioned within the barcode reader 1130 so that a front major surface 140 and a back major surface 138 of the optical substrate 122 are located in a plane that is substantially perpendicular to the optical axis 114. In one embodiment, "substantially perpendicular" means within five degrees of perpendicular while in an alternative embodiment substantially perpendicular means within 15 or 20 degrees of perpendicular.

The light emitted from the optical substrate 122 may have different characteristics depending on the characteristics of the optical substrate 122. For example, the optical substrate 122 may utilize refraction, diffusion, prismatic effect, and/or total internal reflection to direct more diffuse bright field illumination 124 into the field of view 106. Depending on the properties of the optical substrate 122 and the at least one light source 120, the illumination system may be referred to as a diffuse bright field illumination system. The diffuse bright field illumination system may also be called a mid-field illumination system or a medium field illumination system.

In one embodiment, the light emitted from the optical substrate 122 may be emitted substantially parallel to the optical axis 114. For example, light may be emitted within 10 degrees of parallel to the optical axis 114. Illumination having a smaller angle spread around the optical axis 114 may be referred to herein as diffuse bright field illumination 124.

Figure 25A:
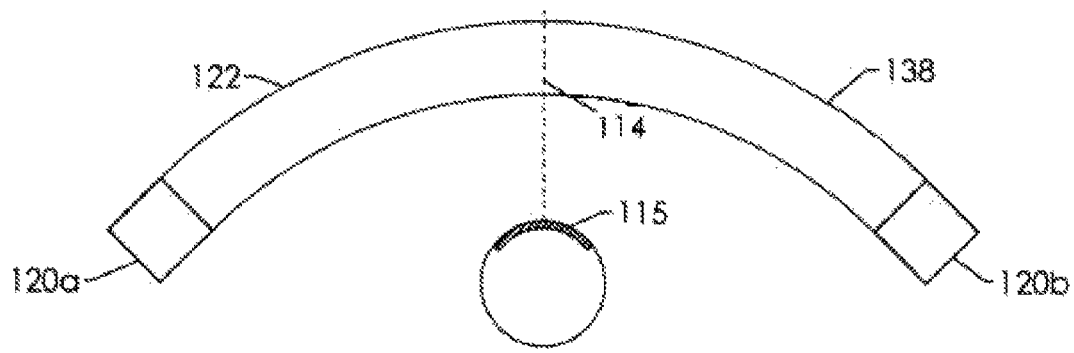
FIGS. 25A-25C are cross-sectional views of the optical substrate in accordance with alternative embodiments.
Figure 25B:
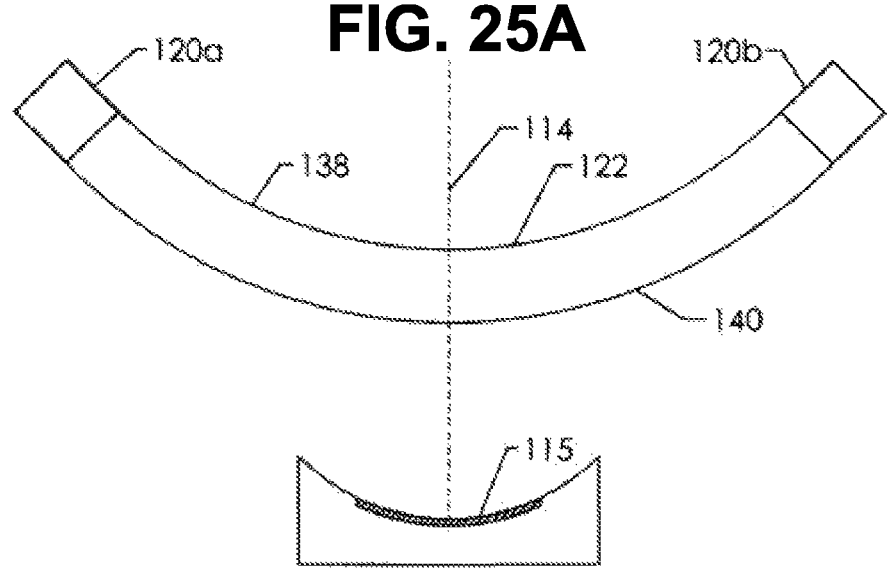
Figure 25C:
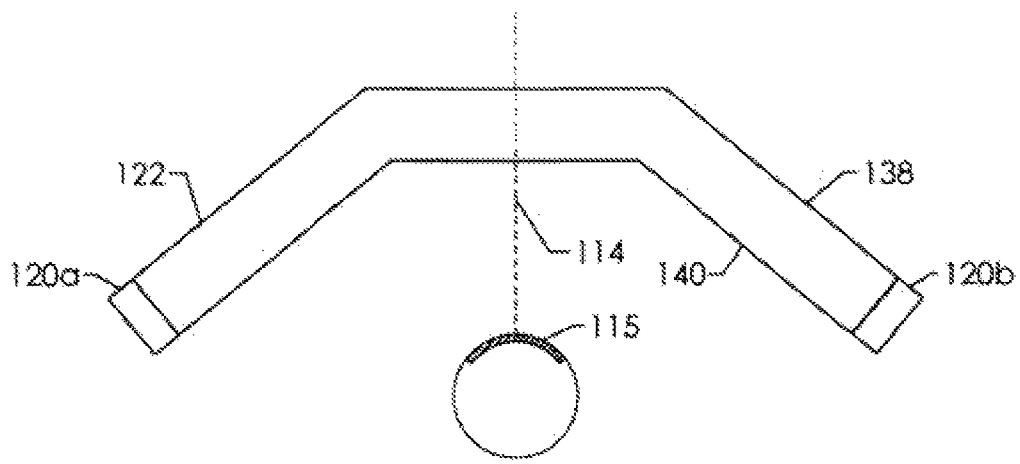

Alternatively, referring to FIGS. 25A to 25C, the optical substrate 122 may be shaped such that the shape of the front major surface 140 and/or the back major surface 138 is concave, convex, parabolic, or some combination thereof. For example, as shown in FIG. 25A, the optical substrate 122 has a generally concave front major surface 140 and a convex back major surface 138, while in FIG. 25B, the optical substrate 122 has a generally convex front major surface 140 and a concave back major surface 138. The shape of at least one of the front major surface and the back major surface need not be symmetrical, but may be asymmetrical about a plane perpendicular to the optical axis 114. In FIG. 25C, the front major surface 140 may include three generally planar sections with the central section being generally perpendicular to the optical axis 114 and two generally planar sections adjacent to, and on opposing sides, of the central section being at an angle relative to the optical axis 114. In one embodiment the angle may be no greater than 45 degrees. In this embodiment the back major surface 138 may also include corresponding sections with the central section being generally perpendicular to the optical axis 114 and two generally planar sections adjacent to, and on opposing sides of, the central section, the central section being at an angle relative to the optical axis 114. In one embodiment, the angle of the two opposing sides of the back major surface 138 may be the same angle as the two opposing sides of the front major surface 140. In another embodiment the angle may be different.

The light emitted by the configurations shown FIGS. 25A-25C may be emitted at different angles relative to the optical axis 114 compared to the illumination system 105 depicted in FIG. 22. The illumination system 105 with these configurations is a diffuse bright field illumination system providing uniform illumination for barcodes applied to a concave/convex surface.

In embodiments in which the illumination system 105 emits diffuse light, the illumination may be optimal for reading a barcode that has a reflective surface that is located in a near zone 158 and/or a center zone 126 of the field of view 106. The center zone 126 may begin at a center zone starting boundary 128 and end at a center zone ending boundary 130. The center zone starting boundary 128 is closer to the barcode reader 1130 than to a far zone starting boundary 118. For example, the center zone starting boundary 128 may be located approximately 25 mm away from the barcode reader 1130. The center zone ending boundary 130 may be located within the far zone 116. Thus, the center zone 126 and the far zone 116 may overlap.

As discussed, the optical substrate 122 may be positioned between the one or more light sources 120. For example, as shown in FIGS. 22 and 23A, the one or more light sources 120 may be located along an edge 186 of the optical substrate 122 that is located between the front major surface 140 and the back major surface 138. The one or more light sources 120 introduce light into the edge 186 of the optical substrate. In FIG. 22, light is introduced from the one or more light sources 120 into the optical substrate 122 in a direction generally perpendicular to the optical axis 114 and generally towards the optical axis 114.

For example, as shown in FIG. 24B the one or more light sources 120 may be located along an edge of the back major surface 138 of the optical substrate 122 with the chamfered surface 125 reflecting illumination in a direction between the front major surface 140 and the back major surface 138 in a direction generally perpendicular to the optical axis 114 and generally towards the optical axis 114.

Figure 23E:
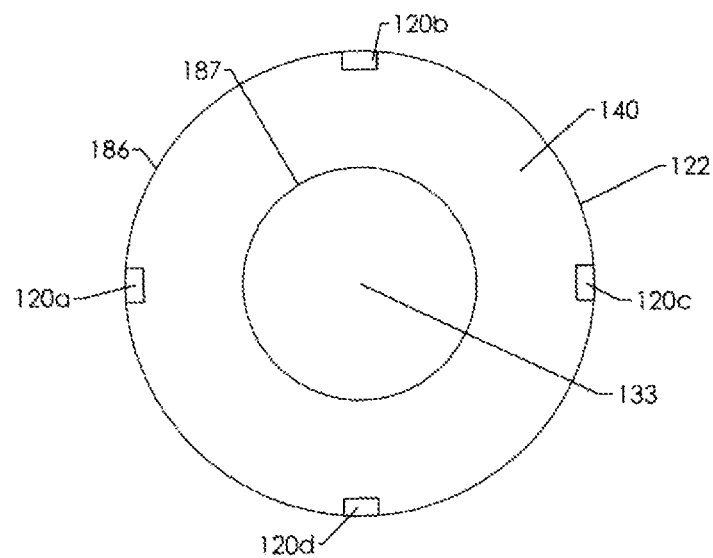

The center of the optical substrate 122 may include an opening 133 (as shown in FIG. 23E) or an aperture 132 (as shown in FIGS. 23A-23D) through which objects (such as a barcode) within the field of view 106 may be visible to the lens 104 and the photo sensor array 102. As shown in FIGS. 23A, 23B, and 23C, the aperture may be rectangular and of sufficient size such that the optical substrate 122 is not within the field of view 106 of the camera 103. As shown in FIG. 23E, the optical substrate 122 may have an approximately annular shape where the center opening 133 of the annular optical substrate 122 is circular and of sufficient size such that the optical substrate 122 is not within the field of view 106 of the camera 103.

With continued reference to FIG. 23E, the optical substrate 122 may have an annular shape that includes an outer edge 186 and an inner edge 187. In the depicted embodiment multiple light sources 120a-d are positioned on the back major surface 138 of the optical substrate 122 and may input light into the optical substrate 122 through the back major surface 138. For example, the light sources 120a-d may be positioned as shown in FIG. 24B or FIG. 24C. In FIGS. 24B and 24C, the light sources 120a-d input light through the back major surface 138 in a direction approximately parallel to the optical axis 114. After entering the optical substrate 122, the light is reflected by a chamfered surface 125 of the outer edge 186. The chamfered surface 125 is configured to reflect light onto a path relatively perpendicular to the optical axis 114. In another embodiment (not shown) in which the optical substrate has an annular shape, light enters the optical substrate 122 through the outside edge 186 in a direction approximately perpendicular to the optical axis 114.

To prevent the optical substrate 122 from functioning simply as a light pipe or light guide, the optical substrate 122 may include one or more extraction features 142 configured to extract light from the optical substrate 122 and into the field of view 106. The extraction features 142 may introduce a variation in the index of refraction (i.e., a location of a non-uniform index of refraction) of the optical substrate 122. Each extraction feature 142 functions to disrupt the total internal reflection of the propagating light that is incident on the extraction feature 142.

As described above with respect to FIGS. 23A and 23D, the illumination in a direction 190a-d directed into the edge 186 of the optical substrate 122 generally propagates through the optical substrate 122 due to total internal reflection. Any illumination in a direction 190a-d that is incident on the one or more extraction features 142 may be diffused with a first portion being diffused at an angle such that the illumination continues propagating within the optical substrate 122 (based on total internal reflection) and a second portion that may be diffused at an angle (i.e., an escape angle) that overcomes total internal reflection, "escapes" the surface, and is directed into the field of view 106.

The extraction of illumination through the front major surface introduced by the extraction features 142 may comprise at least one of: i) one or more particles within the optical substrate 122, ii) a planar surface within the optical substrate 122, iii) a variation in the surface topography of the back major surface 138, and iv) a variation in the surface topography of the front major surface 140. For example, in FIGS. 24A and 24B, the optical substrate 122 is embedded with extraction features 142 (particles in this example) having an index of refraction greater or less than the optical substrate 122. As light travels from the edge 186 of the optical substrate 122 through total internal reflection towards a center of the optical substrate 122, the particles disrupt the total internal reflection of the light, causing a portion of the propagating light to exit through the front major surface 140.

The extraction features 142 may be configured to extract light in a defined intensity profile over the front major surface 140, such as a uniform intensity profile, and/or a defined light ray angle distribution. In FIG. 24A, the one or more extraction features 142 are distributed non-uniformly throughout the optical substrate 122. In this example, the one or more extraction features 142 are distributed throughout the optical substrate such that light is uniformly emitted from the front major surface 140 of the optical substrate 122. For example, the extraction features 142 may be spread throughout the optical substrate 122 in concentrations that increase with distance from the at least one light source 120.

Alternatively, in FIG. 24B, the one or more extraction features 142 may be distributed uniformly or non-uniformly throughout the optical substrate. In this example, the one or more extraction features are distributed throughout the optical substrate such that light is not uniformly emitted from the front major surface 140 of the optical substrate 122. Instead the light is emitted from the front major surface 140 in a desired intensity pattern. While not shown, the one or more extraction features 142 may be distributed in alternative patterns that result in the light being emitted from the front major surface 140 of the optical substrate 122 having a more structured appearance (i.e., a non-uniform intensity pattern).

Figure 24D:
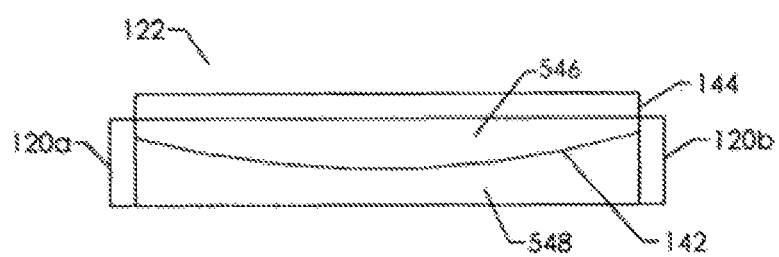
Figure 24E:
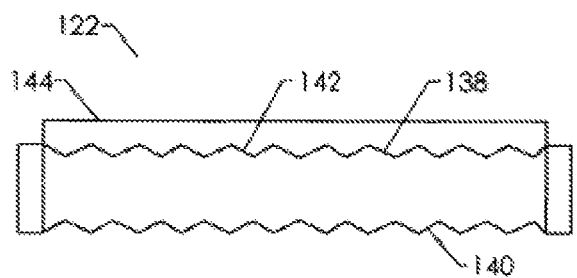

As shown in FIGS. 24C and 24E, the extraction features 142 may also comprise a surface variation in the topography of at least one of the front major surface 140 and the back major surface 138. In the depicted embodiment of FIG. 24C, the one or more extraction features 142 comprise variations in the back major surface 138 of the optical substrate 122. In this example, the front major surface 140 of the optical substrate 122 is smooth and planar, while the back major surface 138 includes topography of convex and concave indentations and protrusions. In the depicted embodiment of FIG. 24E, both the back major surface 138 and the front major surface 140 include extraction features 142 comprising convex and concave indentations and protrusions. These embodiments are configured to result in a homogenous output of light from the front major surface 140.

The convex and concave indentations and protrusions may be: i) extraction features 142 with specific optical properties, such as micro lenses formed by, for example, molding or laser cutting; or ii) extraction features 142 with no specific optic properties (i.e., random) such as a roughened surface formed by any of a textured tool or sanding of the surface after molding. Further, the shape, density, or other optical properties of the extraction features 142 may increase with distance from the light source 120a-d in order to produce uniform illumination from the optical substrate.

Figure 24F:
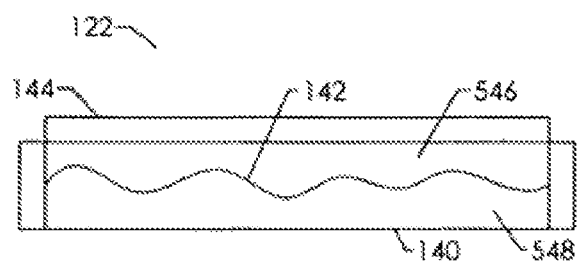

Turning to FIGS. 24D and 24F, the one or more extraction features 142 comprise a surface within the optical substrate 122. In this embodiment, the optical substrate 122 may be made of two different materials 546, 548. These materials 546, 548 may have different indices of refraction, and they may be in contact with one another. In FIG. 24D, the contact is along a surface forming the one or more extraction features 142. In FIG. 24F the contact is along a surface of convex and concave shapes, either patterned or random. Refraction at the one or more extraction features 142 directs illumination towards the front major surface 140 of the optical substrate 122 at an angle where the illumination exits the front major surface 140 towards the field of view 106. As a variation to these embodiments, the materials 546, 548 may have the same index of refraction, but a material with a different index of refraction may be sandwiched between the materials 546, 548 at the non-planar contact surface.

As will be understood by one of ordinary skill in the art, the optical substrate 122 and the extraction features 142 are not limited to these described embodiments. Other embodiments of the optical substrate 122 including extraction features 142 are also within the scope of the present disclosure.

In all of these embodiments, to further increase the quantity of illumination exiting through the front major surface 140, a reflective backing 144 may be applied to the back major surface 138. The reflective backing 144 may be applied uniformly such that it covers the entire back major surface 138. The reflective backing 144 reduces the amount of light that escapes through the back major surface 138 by reflecting light back inward into the optical substrate 122. In another embodiment, a cladding film (not shown) having an index of refraction less than the index of refraction of the optical substrate 122 is adjacent the back major surface 138. The cladding film reduces the amount of light that escapes by reflecting light inward through total internal reflection. Similarly, all edges and surfaces of the optical substrate 122 (except for the edges 186 where the one or more light sources 120a-d project illumination into the optical substrate 122) may also be coated with a reflective backing 144.

Depending on the properties of the illumination system 105, the light emitted by the illumination system 105 from the one or more light sources 120 may not be sufficiently bright to provide optimal illumination for reading a barcode that is located farther away from the barcode reader 1130 than the center zone ending boundary 130. For this reason, as shown in FIG. 22, the illumination system may comprise at least one secondary light source 108. The at least one secondary light source 108 may be referred to as a direct bright field illumination system or a far field illumination system. Light from the at least one secondary light source 108 that is emitted by the illumination system 105 may converge at a point on the optical axis 114 that is different from the point along the optical axis 114 that light from the at least one light source 120 converges. For example, the light may be emitted by the illumination system 105 at an angle closer to parallel to the optical axis 114, for example at a convergence angle of approximately 70 degrees, than the light from the at least one light source 120 that is emitted by the illumination system 105.

The at least one secondary light source 108a-b may comprise one or more LEDs, which may be positioned behind refracting and/or diffusing optics 110a-b. The one or more secondary light sources 108a-b may direct illumination 112 into the field of view 106 substantially parallel to the optical axis 114 but with a slight convergence angle. For example, the one or more secondary light sources 108a-b may direct illumination into the field of view 106 at an angle from 0-30 degrees from the optical axis 114. This illumination 112 may be referred to herein as direct bright field illumination 112 or far field illumination. As indicated above, the optical axis 114 is a line originating from the center of the focusing lens 104 and extending outward into the center of the field of view 106.

Light emitted by the illumination system from the at least one secondary light source may be better suited for reading a barcode with a diffuse surface such as a paper label. Light emitted by the illumination system from the at least one secondary light source may also be optimal for reading a barcode that is located in a far zone 116 of the field of view 106, i.e., an area of the field of view 106 that is relatively far away from the barcode reader 1130. In other words, light from the at least one secondary light source may have a sufficient intensity to illuminate a barcode that is located within the far zone 116. The far zone 116 may begin at a far zone starting boundary 118 and end at a far zone ending boundary 119. In one implementation, the far zone starting boundary 118 may be located about 75 mm away from the barcode reader 1130. The bright field illumination 112 may not be sufficiently diffuse to provide optimal illumination for reading a barcode that has a reflective surface. For longer range reading, the illumination system may additionally comprise a focus lens associated with the at least one secondary light source in order to provide illumination for reading a barcode that is located farther away from the barcode reader 1130 than the far zone ending boundary 119.

The optical substrate 122 may further include apertures 134a-b that permit the direct bright field illumination 112 (from the at least one secondary light source 108a-b) to be directed into the field of view 106 without being affected by the optical substrate 122. Further yet, the optical substrate 122 may include apertures 136a-b that permit targeting illumination from targeting light sources 109a-b (as shown in FIG. 22) mounted behind the optical substrate 122 to be projected into the field of view 106 without being affected by the optical substrate 122.

The secondary light source may include secondary light sources 108a, 108b. Secondary light sources 108a, 108b may be behind tertiary light sources 152a-b (discussed herein) which are behind diffusors 154a, 154b. The secondary light sources 108a, 108b may be in front of the tertiary light sources 152a, 152b. The secondary light sources may also be positioned in front of the light sources 120a, 120b but behind the tertiary light sources 152a-b.

The surfaces of the apertures 132, 134a-b, 136a-b within the optical substrate 122 may be coated with an opaque reflective material (not shown). This material may cause illumination within the optical substrate 122 that is incident on the surface of a particular aperture to be reflected back into the optical substrate 122 regardless of its angle of incidence. Reflecting illumination back into the optical substrate 122 prevents illumination from exiting the optical substrate 122 through the surface of any aperture at an angle where it would illuminate the region behind the optical substrate 122, such as directly illuminating the lens 104 and degrading the quality of the image of an object within the field of view 106.

Referring again to FIG. 22, the illumination system 105 may also include at least one tertiary light source 152. Light from the at least one tertiary light source 152 may be emitted by the illumination system 105 at an angle closer to perpendicular to the optical axis 114 than the light from either of the at least one light source 120 or the at least one secondary light source 108 that is emitted by the illumination system 105. The at least one tertiary light source 152 may comprise multiple LEDs. Additional optics (e.g., diffusers) may also be associated with the at least one tertiary light source 152 to direct illumination to the field of view 106. The additional optics may utilize refraction, diffusion, prismatic effect, and/or total internal reflection to direct illumination 156a-b into the field of view 106.

The at least one tertiary light source 152 may be referred to as a dark field illumination system or a near field illumination system. Light emitted by the illumination system from the at least one tertiary light source may be referred to herein as dark field illumination 156a-b. Light from the at least one tertiary light source may be emitted by the illumination system (i.e., the dark field illumination 156a-b) at an angle no more than 45 degrees from a plane perpendicular to the optical axis 114.

The dark field illumination 156a-b may be optimal for reading a barcode that is located within a near zone 158 of the field of view 106. The near zone 158 may begin at a near zone starting boundary 160 and may end at a near zone ending boundary 162. The near zone starting boundary 160 may be closer to the barcode reader 1130 than to the center zone starting boundary 128. The near zone starting boundary 160 may correspond to the face of the barcode reader 1130. The near zone ending boundary 162 may be within the center zone 126. Thus, the near zone 158 and the center zone 126 may overlap. However, the dark field illumination 156a-b may not be sufficiently bright to provide optimal illumination for reading a barcode that is located farther away from the barcode reader 1130 than from the near zone ending boundary 162.

In the embodiment shown in FIG. 22, the at least one tertiary light source 152a-b is mounted on circuit boards. The optics (e.g., diffusers) 154a-b may comprise lenses, gratings, or diffusion material that diffuses the dark field illumination 156a-b from the at least one tertiary light source 152.

Figure 26:
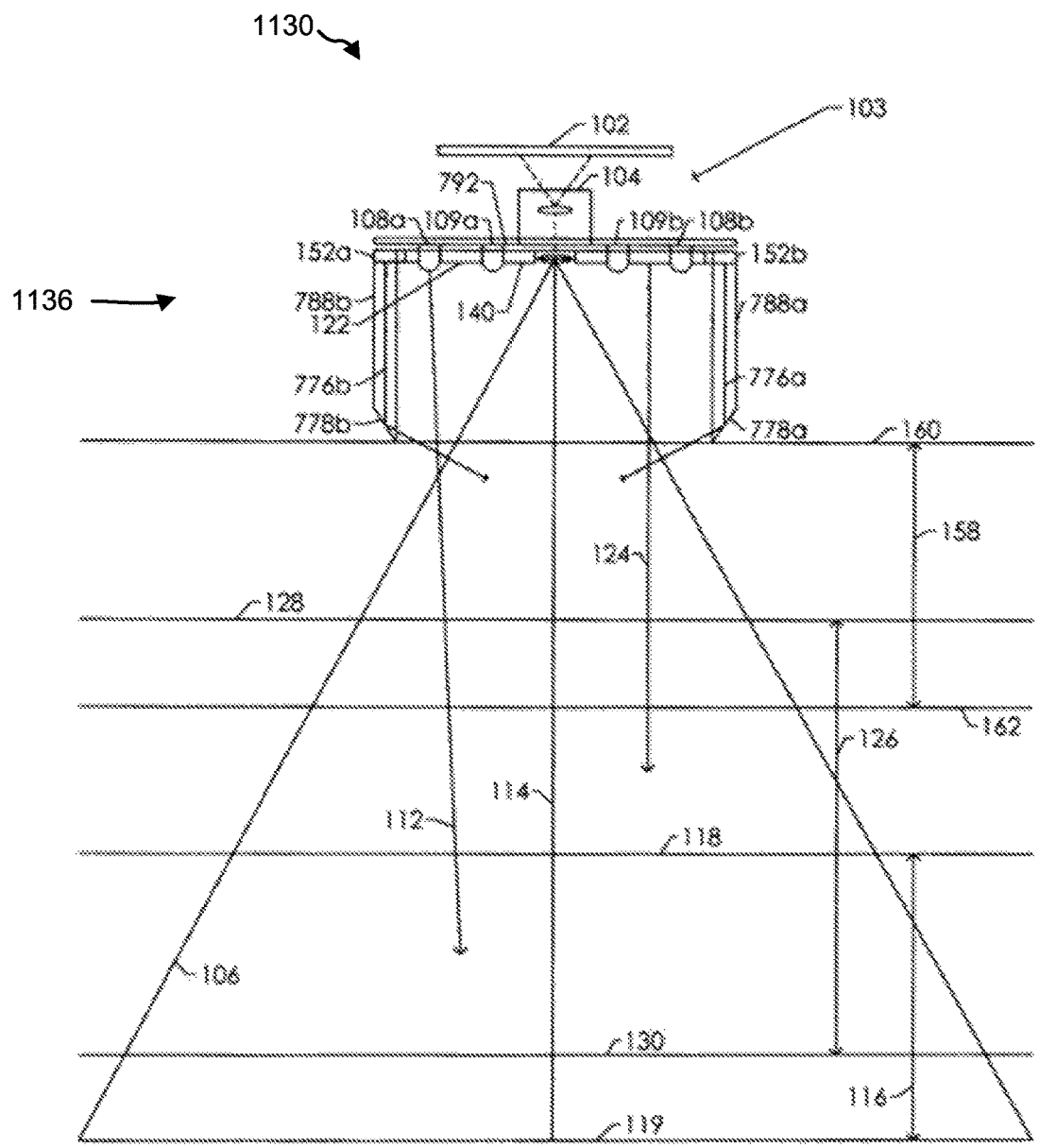
FIG. 26 is a top-down view of a barcode reader in accordance with another embodiment of the present disclosure.

With reference to FIG. 26, an alternative embodiment of the barcode reader 1130 is depicted. In this embodiment, the at least one tertiary light source 152a-b is mounted on a circuit board 792 that is substantially perpendicular to the optical axis 114. Illumination 776a-b from the at least one tertiary light sources 152a-b is directed substantially parallel to the optical axis 114 toward prism optics 778a-b. More specifically, the at least one tertiary light source 152a-b may project illumination 776a-b into light pipes 788a-b, which use total internal reflection to propagate the illumination 776a-b toward the prism optics 778a-b. The prism optics 778a-b are used to re-direct the illumination 776a-b toward the field of view 106 at the desired angle.

The light pipes 788a-b may comprise chamfered ends. These chamfered ends may serve as the prism optics 778a-b that re-direct the illumination 776a-b toward the field of view 106. Each of the chamfered ends may be angled such that total internal reflection redirects the illumination 776a-b at a non-zero angle (e.g., 45 degrees) relative to the plane that is perpendicular to the optical axis 114. The illumination 776a-b may exit the light pipes 788a-b through the side facing the optical axis 114. It should be appreciated that the light pipes 788a-b are shown in cross section and may be on each side of the camera (i.e., all four sides, left, right, top, bottom) or may even form an annular ring around the field of view of the camera.

Figure 27:
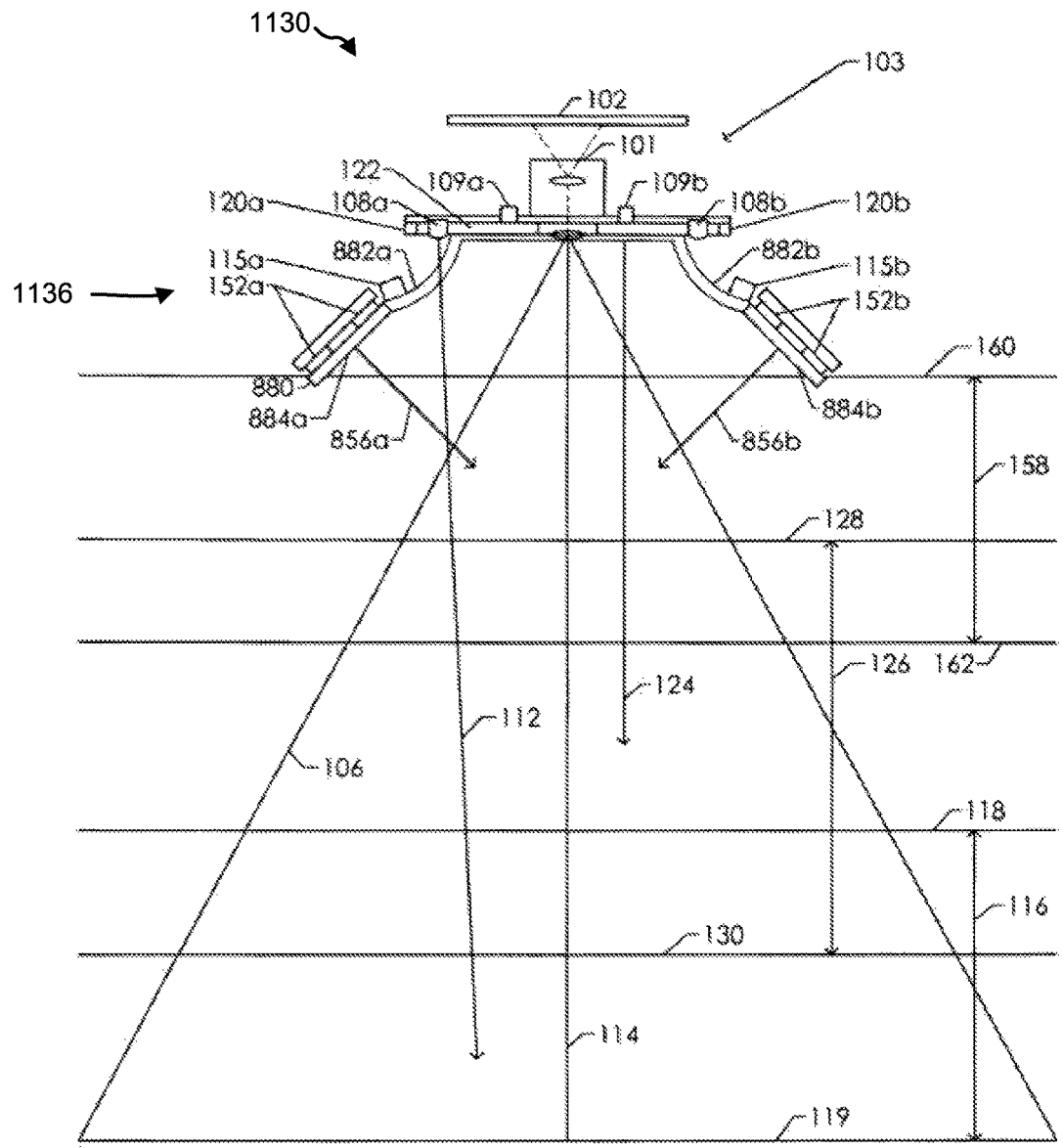
FIG. 27 is a top-down view of a barcode reader in accordance with another embodiment of the present disclosure.

Turning to FIG. 27, another embodiment of the barcode reader 1130 is shown. In this embodiment, the optical substrate 880 forms a protective window over optical substrate 122 and replaces the optics 110a-b and 154a-b of FIG. 22. In this example, the at least one tertiary light source 152 comprises LEDs positioned behind diffusion regions 884a-b of the optical substrate 880. The diffusion regions 884a-b diffuse direct dark field illumination 856a-b from the tertiary light source 152a-b into the field of view 106. The curved regions 882a-b provide structural support for the diffusion regions 884a-b as well as focus the illumination projected from secondary light sources 108a, 108b or secondary illumination sources 115a, 115b.

Figure 28:
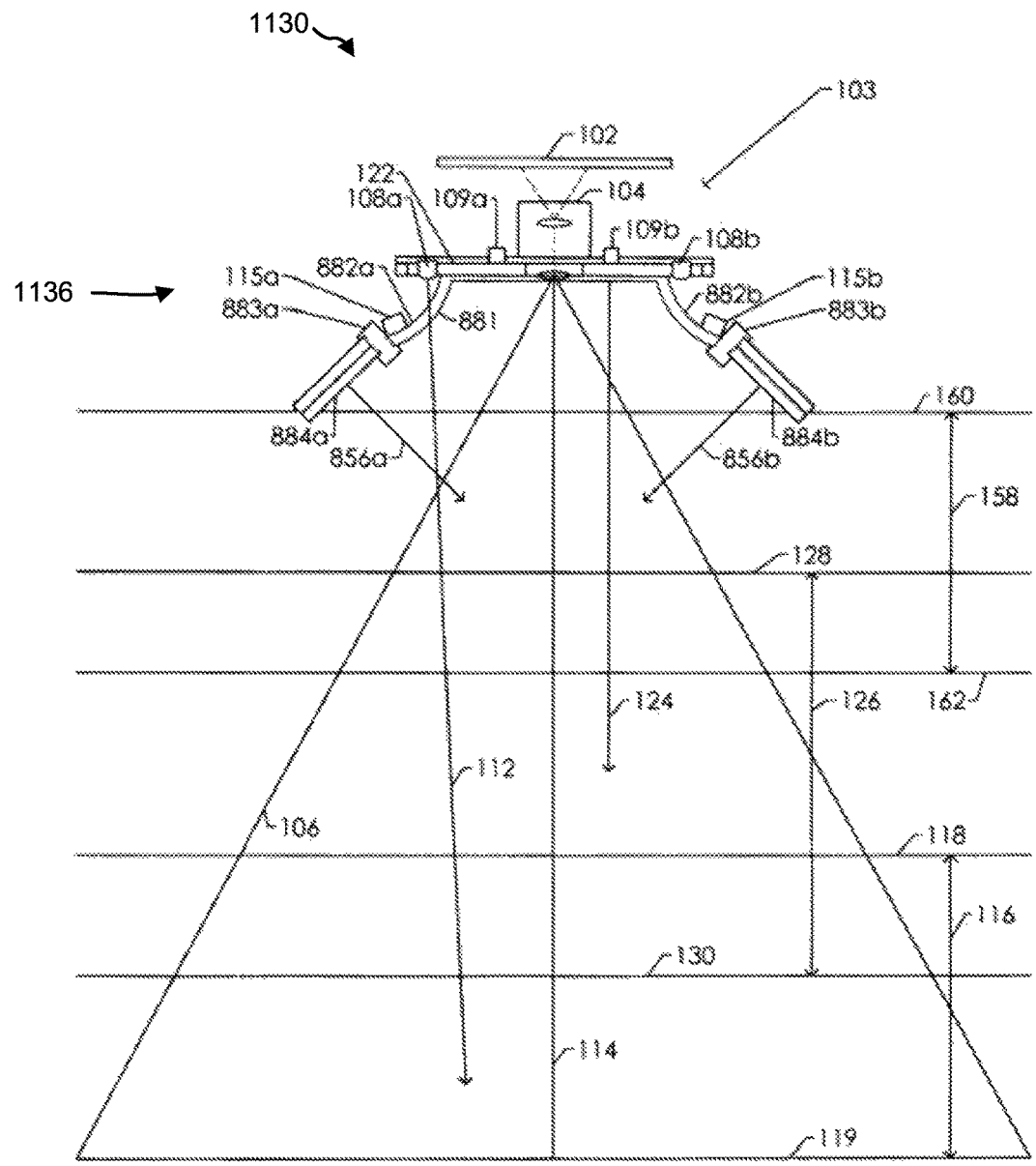
FIG. 28 is a top-down view of a barcode reader in accordance with another embodiment of the present disclosure.

Turning to FIG. 28, another embodiment of the barcode reader 1130 is shown. In this embodiment, the optical substrate 881 forms a protective window over optical substrate 122 and replaces the optics 110a-b of FIG. 22.

Figure 29A:
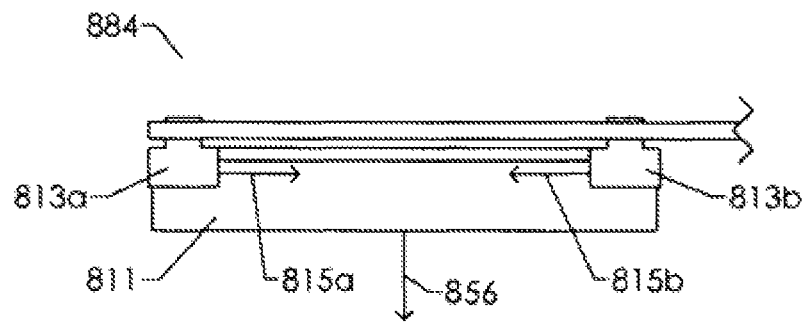
FIGS. 29A-29B are cross-sectional views of tertiary light sources illuminating the optical substrate in accordance with some embodiments of the present disclosure.

As shown in FIG. 29A, the diffusion region 884 may include an optical substrate 811 into which illumination 815a-b is projected by two side fire illuminators 813a-b. The illumination 815a-b is internally reflected within the optical substrate 811 and extracted as dark field illumination 856 from the optical substrate 811. The optical substrate 811 may have any of the same characteristics and extraction features as the optical substrate 122 previously described with respect to FIGS. 22, 23A-23D, 24A-24F, and 25A-25C as well as reflective coatings such that the illumination 815a-b propagates between a front major surface 140 and a back major surface 138 of the optical substrate 811 and is extracted through the front major surface as dark field illumination 856.

Figure 29B:
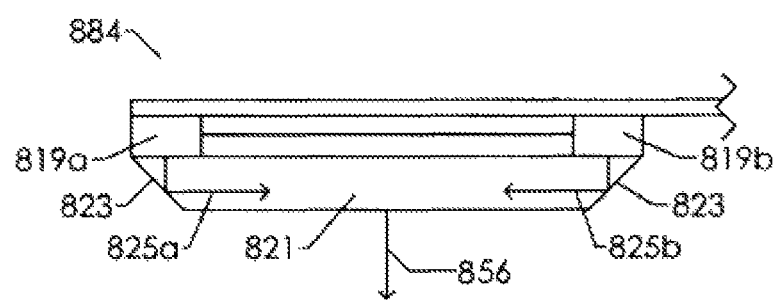

As shown in FIG. 29B, the diffusion region 884 may include an optical substrate 821 into which illumination 825a-b is projected through the back major surface by two illuminators 819a-b. The illumination 825a-b is reflected from chamfered surfaces 823 such that it propagates between the front major surface and the back major surface and is extracted as dark field illumination 856 from the optical substrate 821. As with optical substrate 811, the optical substrate 821 may have any of the same characteristics and extraction features as the optical substrate 122 previously described with respect to FIGS. 22, 23A-D, 24A-F, and 25A-C as well as reflective coatings such that the illumination 825a-b propagates between a front major surface 140 and a back major surface 138 of the optical substrate 821 and is extracted through the front major surface as dark field illumination 856.

The diffusion regions 884a-b direct dark field illumination 856a-b from the LEDs into the field of view 106. The curved regions 882a-b provide structural support for and focus the illumination projected from secondary light sources 108a, 108b or secondary illumination sources 115a, 115b. Posts 883a and 883b (shown in FIG. 28) provide structural support for the dark field illumination systems (i.e., diffusion regions 884a-b) and prevent illumination from entering into the curved regions 882a-b.

The previous discussion has been directed to a barcode reader that includes three different light sources: at least one secondary light source (a bright field illumination system positioned as any of: i) closer to (i.e., in front of) the field of view than to the tertiary light sources, ii) behind the tertiary light sources but in front of the diffuse bright field illumination sources; or iii) behind the diffuse bright field illumination sources and the optical substrate 122, at least one light source (i.e., a diffuse bright field illumination system), and at least one tertiary light source (i.e., a dark field illumination system).

It should also be appreciated that each of these illumination sources may generate illumination with different characteristics. For example, the diffuse bright field illumination may be white LEDs (i.e., illumination with intensity across a wide spectrum of wave lengths) while the tertiary light source and the secondary light source may be red LEDs (i.e., intensity at 660 nm).

These three illumination systems can be independently operated such that a barcode can be read with the illumination system that provides the best illumination for reading the barcode. The discussion that follows includes some examples of how this may be accomplished. Although some of these examples involve only two different illumination systems, those examples may be extended to barcode readers that include three (or more) different illumination systems.

As used herein, the phrase "substantially parallel" means within five degrees of parallel. In another embodiment, substantially parallel means within 15 degrees of parallel. In another embodiment, substantially parallel means within 20 degrees of parallel.

As used herein, the phrase "substantially perpendicular" means within five degrees of perpendicular. In another embodiment, substantially perpendicular means within 15 degrees of perpendicular. In another embodiment, substantially perpendicular means within 20 degrees of perpendicular.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

One or more of the features, functions, procedures, operations, components, elements, structures, etc., described in connection with any one of the configurations described herein may be combined with one or more of the functions, procedures, operations, components, elements, structures, etc., described in connection with any of the other configurations described herein, where compatible.

In more detail, any of the features, functions, procedures, operations, components, elements, and structures, described with respect to any of the barcode readers 1100, 2500, or FIG. 18A may be utilized with any other barcode readers. Similarly any of the features, functions, procedures, operations, components, elements, and structures, described with respect to any of the docking stations 1300, 1400, 1600, 2100, 2000 may be utilized with any other docking station.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A docking station for charging a stylus-shaped barcode reader, the docking station comprising:
a mating surface against which the stylus-shaped barcode reader is positioned for charging;
a plurality of charging contacts including at least one charging contact for power and at least one charging contact for ground, wherein the charging contacts are coupled to mating contacts on the barcode reader when the barcode reader is positioned against the mating surface;
a magnetic structure for holding the barcode reader against the mating surface; and
a positioning structure for aligning the barcode reader against the mating surface when the barcode reader is positioned against the mating surface, wherein at least a portion of the barcode reader comprises an elongated, cylindrical housing, and wherein the positioning structure is shaped to hold the elongated, cylindrical housing of the barcode reader.

2. The docking station of claim 1, wherein the positioning structure includes a cross section at a base end of the positioning structure adjacent to the mating surface which is larger than a cross section at a distal end of the positioning structure spaced away from the mating surface such that when the barcode reader is imprecisely aligned with the distal end, the positioning structure guides the barcode reader into precise alignment with the base end when the barcode reader is positioned against the mating surface.

3. The docking station of claim 1, wherein the magnetic structure includes:
a first magnet with a north polarity directed towards the barcode reader when the barcode reader is positioned against the mating surface; and
a second magnet with a south polarity directed towards the barcode reader when the barcode reader is positioned against the mating surface,
wherein corresponding magnets within the barcode reader, including a first magnet with a south polarity and a second magnet with a north polarity, result in the barcode reader:
being attracted to and positioned against the mating surface of the docking station when a magnetic field of the first magnet of the barcode reader is attracted to a magnetic field of the first magnet of the docking station and a magnetic field of the second magnet of the barcode reader is attracted to a magnetic field of the second magnet of the docking station; and
being repelled from being positioned against the mating surface of the docking station when the magnetic field of the first magnet of the barcode reader is repelled from the magnetic field of the second magnet of the docking station and the magnetic field of the second magnet of the barcode reader is repelled from the magnetic field of the first magnet of the barcode reader.

4. The docking station of claim 3, wherein the positioning structure is configured to rotate the barcode reader into alignment against the mating surface when the barcode reader is attracted to the mating surface by the magnetic field of the first magnet of the barcode reader being attracted to the magnetic field of the first magnet of the docking station and the magnetic field of the second magnet of the barcode reader being attracted to the magnetic field of the second magnet of the docking station.

5. The docking station of claim 3, wherein the positioning structure is configured to laterally displace the barcode reader into alignment against the mating surface when the barcode reader is attracted to the mating surface by the magnetic field of the first magnet of the barcode reader being attracted to the magnetic field of the first magnet of the docking station and the magnetic field of the second magnet of the barcode reader being attracted to the magnetic field of the second magnet of the docking station.

6. The docking station of claim 1, wherein the positioning structure extends outward from the mating surface and is configured to engage with an external housing of the barcode reader.

7. The docking station of claim 1, wherein the positioning structure extends outward from the mating surface and is configured to engage with a cavity or a recess formed in a housing of the barcode reader.

8. The docking station of claim 1, wherein the positioning structure is a cavity extending into a housing of the docking station from the mating surface.

9. The docking station of claim 1, further comprising:
a base for placement of the docking station on a horizontal surface, wherein the barcode reader is positioned on top of the docking station when the docking station is positioned on the horizontal surface.

10. The docking station of claim 1, further comprising:
a base for securing the docking station to a vertical surface, wherein the mating surface is generally vertical when the base is secured to the vertical surface, and a shape of the mating surface or the positioning structure is adapted to support a weight of the barcode reader when the barcode reader is held against the mating surface by the magnetic structure.

11. The docking station of claim 1, further comprising:
an attachment feature for securing the docking station to an individual.

12. The docking station of claim 11, wherein the attachment feature is one of a waist belt, a shoulder belt, a flexible band, or a flexible strap.

13. The docking station of claim 11, wherein the attachment feature is one of a clip, a safety pin and clasp combination, or a flange for being sewn into an article of clothing.

14. The docking station of claim 1, further comprising:
a battery;
at least two master charging contacts including at least one master charging contact for power and at least one master charging contact for ground;
a master charging circuitry coupled between the battery and the at least two master charging contacts and configured to charge the battery when the master charging contacts are coupled to a power source; and
a barcode reader charging circuitry coupled between the battery and the at least two charging contacts and configured to provide charging power from the battery to the barcode reader when the charging contacts are coupled to the mating contacts on the barcode reader.

15. The docking station of claim 14, wherein the magnetic structure includes:

a first magnet with a north polarity directed towards the barcode reader when the barcode reader is positioned against the mating surface; and a second magnet with a south polarity directed towards the barcode reader when the barcode reader is positioned against the mating surface, wherein corresponding magnets within the barcode reader, including a first magnet with a south polarity and a second magnet with a north polarity, result in the barcode reader:

i) being attracted to and positioned against the mating surface of the docking station when a magnetic field of the first magnet of the barcode reader is attracted to a magnetic field of the first magnet of the docking station and a magnetic field of the second magnet of the barcode reader is attracted to a magnetic field of the second magnet of the docking station; and ii) being repelled from being positioned against the mating surface of the docking station when the magnetic field of the first magnet of the barcode reader is repelled from the magnetic field of the second magnet of the docking station and the magnetic field of the second magnet of the barcode reader is repelled from the magnetic field of the first magnet of the barcode reader.

16. The docking station of claim 15, wherein the positioning structure is configured to rotate the barcode reader into alignment against the mating surface when the barcode reader is attracted to the mating surface by the magnetic field of the first magnet of the barcode reader being attracted to the magnetic field of the first magnet of the docking station and the magnetic field of the second magnet of the barcode reader being attracted to the magnetic field of the second magnet of the docking station.

17. The docking station of claim 15, wherein the positioning structure is configured to laterally displace the barcode reader into alignment against the mating surface when the barcode reader is attracted to the mating surface by the magnetic field of the first magnet of the barcode reader being attracted to the magnetic field of the first magnet of the docking station and the magnetic field of the second magnet of the barcode reader being attracted to the magnetic field of the second magnet of the docking station.

18. The docking station of claim 14, wherein the positioning structure extends outward from the mating surface and is configured to engage with an external housing of the barcode reader.

19. The docking station of claim 14, wherein the positioning structure extends outward from the mating surface and is configured to engage with a cavity or a recess formed in a housing of the barcode reader.

20. The docking station of claim 14, wherein the positioning structure is a cavity extending into a housing of the docking station from the mating surface.

21. The docking station of claim 14, further comprising:
a base for placement of the docking station on a horizontal surface, wherein the barcode reader is positioned on top of the docking station when the docking station is positioned on the horizontal surface.

22. The docking station of claim 14, further comprising:
a base for securing the docking station to a vertical surface, wherein the mating surface is generally vertical when the base is secured to the vertical surface, and a shape of the mating surface or the positioning structure is adapted to support a weight of the barcode reader when the barcode reader is held against the mating surface by the magnetic structure.

23. The docking station of claim 14, further comprising:
an attachment feature for securing the docking station to an individual.

24. The docking station of claim 23, wherein the attachment feature is one of a waist belt, a shoulder belt, a flexible band, or a flexible strap.

25. The docking station of claim 23, wherein the attachment feature is one of a clip, a safety pin and clasp combination, or a flange for being sewn into an article of clothing.

26. A docking station for charging a stylus-shaped barcode reader, the docking station comprising:

a plurality of charging contacts including at least one charging contact for power and at least one charging contact for ground;

a docking surface including a positioning structure shaped to hold an elongated, cylindrical portion of a housing of the stylus-shaped barcode reader, the positioning structure being configured to position mating contacts on the barcode reader with the charging contacts when the portion of the housing of the barcode reader having the elongated, cylindrical shape is positioned adjacent to the docking surface; and a magnetic structure configured to secure the elongated, cylindrical portion of the housing of the barcode reader in a position adjacent to the docking surface.

27. The docking station of claim 26, wherein the positioning structure includes a cross section at a base end of the positioning structure adjacent to the docking surface which is larger than a cross section at a distal end of the positioning structure spaced away from the docking surface such that when the barcode reader is imprecisely aligned with the distal end, the positioning structure guides the barcode reader into precise alignment with the base end when the barcode reader is positioned against the docking surface.

28. The docking station of claim 26, wherein the magnetic structure includes:

a first magnet with a north polarity directed towards the barcode reader when the barcode reader is positioned against the docking surface; and a second magnet with a south polarity directed towards the barcode reader when the barcode reader is positioned against the docking surface, wherein corresponding magnets within the barcode reader, including a first magnet of the barcode reader with a south polarity and a second magnet of the barcode reader with a north polarity, result in the barcode reader:

i) being attracted to and positioned against the docking surface of the docking station when a magnetic field of the first magnet of the barcode reader is attracted to a magnetic field of the first magnet of the docking station and a magnetic field of the second magnet of the barcode reader is attracted to a magnetic field of the second magnet of the docking station; and ii) being repelled from being positioned against the docking surface of the docking station when the magnetic field of the first magnet of the barcode reader is repelled from the magnetic field of the second magnet of the docking station and the magnetic field of the second magnet of the barcode reader is repelled from the magnetic field of the first magnet of the barcode reader.

29. The docking station of claim 28, wherein the positioning structure is configured to rotate the barcode reader into alignment against the docking surface when the barcode reader is attracted to the docking surface by the magnetic field of the first magnet of the barcode reader being attracted to the magnetic field of the first magnet of the docking station and the magnetic field of the second magnet of the barcode reader being attracted to the magnetic field of the second magnet of the docking station.

30. The docking station of claim 28, wherein the positioning structure is configured to laterally displace the barcode reader into alignment against the docking surface when the barcode reader is attracted to the docking surface by the magnetic field of the first magnet of the barcode reader being attracted to the magnetic field of the first magnet of the docking station and the magnetic field of the second magnet of the barcode reader being attracted to the magnetic field of the second magnet of the docking station.

31. The docking station of claim 26, wherein the positioning structure extends outward from the docking surface and is configured to engage with an external housing of the barcode reader.

32. The docking station of claim 26, wherein the positioning structure extends outward from the docking surface and is configured to engage with a cavity or a recess formed in the housing of the barcode reader.

33. The docking station of claim 26, wherein the positioning structure is a cavity extending into a housing of the docking station from the docking surface.

34. The docking station of claim 26, further comprising:
a base for placement of the docking station on a horizontal surface, wherein the barcode reader is positioned on top of the docking station when the docking station is positioned on the horizontal surface.

35. The docking station of claim 26, further comprising:
a base for securing the docking station to a vertical surface, wherein the docking surface is generally vertical when the base is secured to the vertical surface, and a shape of the docking surface or the positioning structure is adapted to support a weight of the barcode reader when the barcode reader is held against the docking surface by the magnetic structure.

36. The docking station of claim 26, further comprising:
an attachment feature for securing the docking station to an individual.

37. The docking station of claim 36, wherein the attachment feature is one of a waist belt, a shoulder belt, a flexible band, or a flexible strap.

38. The docking station of claim 36, wherein the attachment feature is one of a clip, a safety pin and clasp combination, or a flange for being sewn into an article of clothing.

39. The docking station of claim 26, further comprising:
a battery;
at least two master charging contacts including at least one master charging contact for power and at least one master charging contact for ground;
a master charging circuitry coupled between the battery and the at least two master charging contacts and configured to charge the battery when the master charging contacts are coupled to a power source; and
a barcode reader charging circuitry coupled between the battery and the at least two charging contacts and configured to provide charging power from the battery to the barcode reader when the charging contacts are coupled to the mating contacts on the barcode reader.

* * * * *